US012601839B2

(12) United States Patent
Jang et al.

(10) Patent No.: US 12,601,839 B2
(45) Date of Patent: Apr. 14, 2026

(54) REAL-TIME MOTION CAPTURE SYSTEM USING SINGLE LiDAR DEVICE

(71) Applicant: MOVIN Inc., Daejeon (KR)

(72) Inventors: Deok Kyeong Jang, Seongnam-si (KR); Deok Yun Jang, Seongnam-si (KR); Dongseok Yang, Seoul (KR); Byeoli Choi, Daejeon (KR); Donghoon Shin, Gwangju (KR)

(73) Assignee: MOVIN Inc., Daejeon (KR)

( * ) Notice: Subject to any disclaimer, the term of this patent is extended or adjusted under 35 U.S.C. 154(b) by 0 days.

(21) Appl. No.: 18/935,945

(22) Filed: Nov. 4, 2024

(65) Prior Publication Data

US 2025/0383447 A1     Dec. 18, 2025

(30) Foreign Application Priority Data

Jun. 17, 2024   (KR) ........................ 10-2024-0078212
Nov. 4, 2024    (KR) ........................ 10-2024-0154585
Nov. 4, 2024    (KR) ........................ 10-2024-0154586

(51) Int. Cl.
| | |
|---|---|
| *G01S 17/58* | (2006.01) |
| *B60W 60/00* | (2020.01) |
| *G01S 17/89* | (2020.01) |
| *G06F 3/01* | (2006.01) |
| *G06T 7/11* | (2017.01) |
| *G06T 7/246* | (2017.01) |
| *G06V 40/20* | (2022.01) |

(52) U.S. Cl.
CPC .............. *G01S 17/58* (2013.01); *G01S 17/89* (2013.01); *G06T 7/246* (2017.01); *G06T 2207/10028* (2013.01); *G06T 2207/20081* (2013.01)

(58) Field of Classification Search
CPC ......... G01S 17/58; G01S 17/89; G06T 7/246; G06T 2207/10028; G06T 2207/20081; G06T 7/11; G06F 3/017; G06V 40/20; B60W 60/001
USPC .......................................................... 702/159
See application file for complete search history.

(56) References Cited

U.S. PATENT DOCUMENTS

| | | | |
|---|---|---|---|
| 2022/0036579 A1 | 2/2022 | Liang et al. | |
| 2022/0387246 A1* | 12/2022 | Wu ........................ | G05D 1/617 |
| 2023/0273315 A1* | 8/2023 | Wen ........................ | G01S 17/89 |
| | | | 356/28.5 |
| 2023/0273318 A1* | 8/2023 | Wang ........................ | G06N 3/09 |
| | | | 702/152 |

(Continued)

FOREIGN PATENT DOCUMENTS

| | | |
|---|---|---|
| JP | 2016-75693 A | 5/2016 |
| KR | 10-2454538 B1 | 10/2022 |

OTHER PUBLICATIONS

Jang et al., "MOVIN: Real-time Motion Capture using a Single LiDAR", Sep. 17, 2023. (Year: 2023).*

(Continued)

*Primary Examiner* — Michael P Nghiem
(74) *Attorney, Agent, or Firm* — Sughrue Mion, PLLC

(57) ABSTRACT

A real time motion capture system using a single LiDAR device is proposed, and more specifically, there is provided a system configured to capture movement of a person by using the single LiDAR device, obtain point cloud data, and analyze the obtained point cloud data, so as to generate motion data in real time for expressing the movement of the person.

14 Claims, 34 Drawing Sheets

(56)      References Cited

U.S. PATENT DOCUMENTS

| | | | |
|---|---|---|---|
| 2024/0177387 A1 | 5/2024 | Smith | |
| 2024/0192379 A1* | 6/2024 | Baker | G01S 17/34 |
| 2024/0196092 A1* | 6/2024 | Camyre | G05D 1/249 |
| 2024/0196462 A1* | 6/2024 | Ha | H04W 8/18 |
| 2024/0202969 A1 | 6/2024 | Wang et al. | |
| 2024/0353234 A1* | 10/2024 | Mitrokhin | G06T 7/50 |

OTHER PUBLICATIONS

Jang et al. "Real-time Motion Capture using a Single LiDAR", Nov. 5, 2023. (Year: 2023).*

Jang et al. "Real-time Motion Capture using a Single LiDAR", Sep. 17, 2023. (Year: 2023).*

Li et al., "LiDARCap: Long-range Marker-less 3D Human Motion Capture with LiDAR Point Clouds", arXiv:2203.14698v1, Mar. 28, 2022, pp. 1-11.

Communication issued Feb. 15, 2025 in Korean application No. 10-2024-0154585.

Communication issued Feb. 3, 2025 in Korean application No. 10-2024-0154586.

International Search Report dated Jan. 7, 2026, issued in International Application No. PCT/KR2025/015173.

Written Opinion of the International Searching Authority dated Jan. 7, 2026, issued in International Application No. PCT/KR2025/015173.

Deok-Kyeong Jang et al., "ELMO: Enhanced Real-time LiDAR Motion Capture through Upsampling", ACM Trans. Graph., 2024, vol. 43, No. 6 (14 pages).

\* cited by examiner sensing area

1000 point cloud data

2000 motion data $100\begin{cases} 1000 \\ 2000 \\ 3000 \end{cases}$

3000

A-Pose

FIG. 5
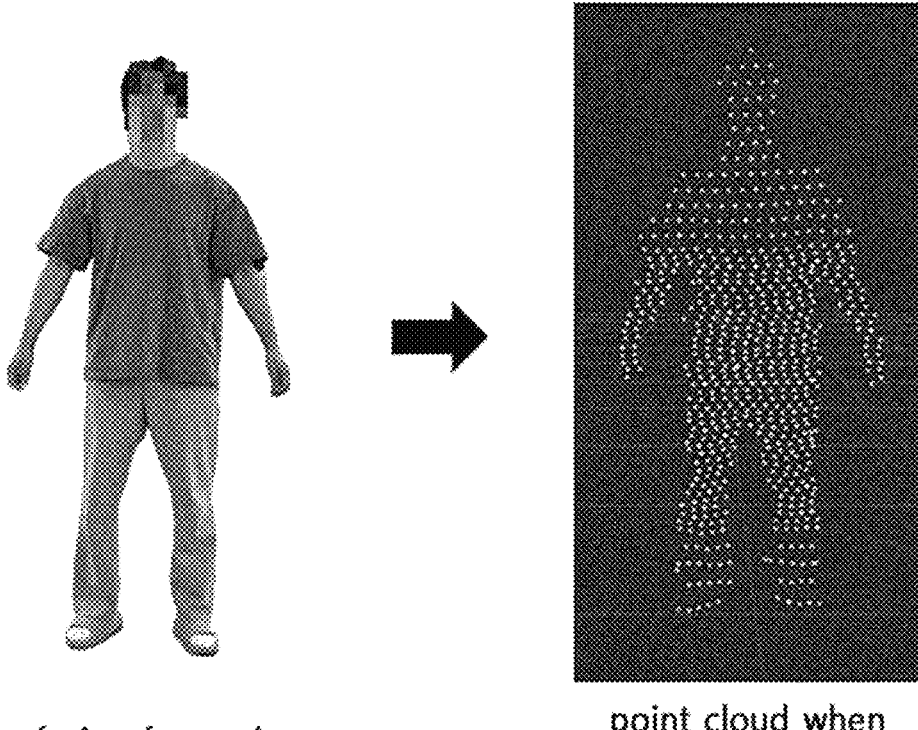
facing forward
point cloud when
facing forward
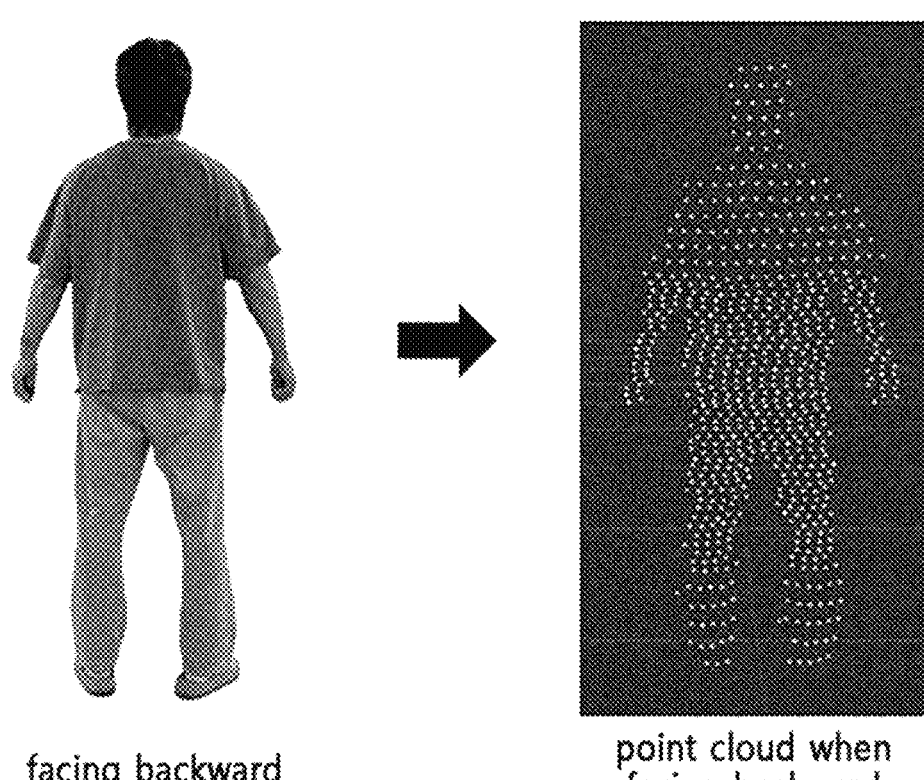
facing backward
point cloud when
facing backward FIG. 6
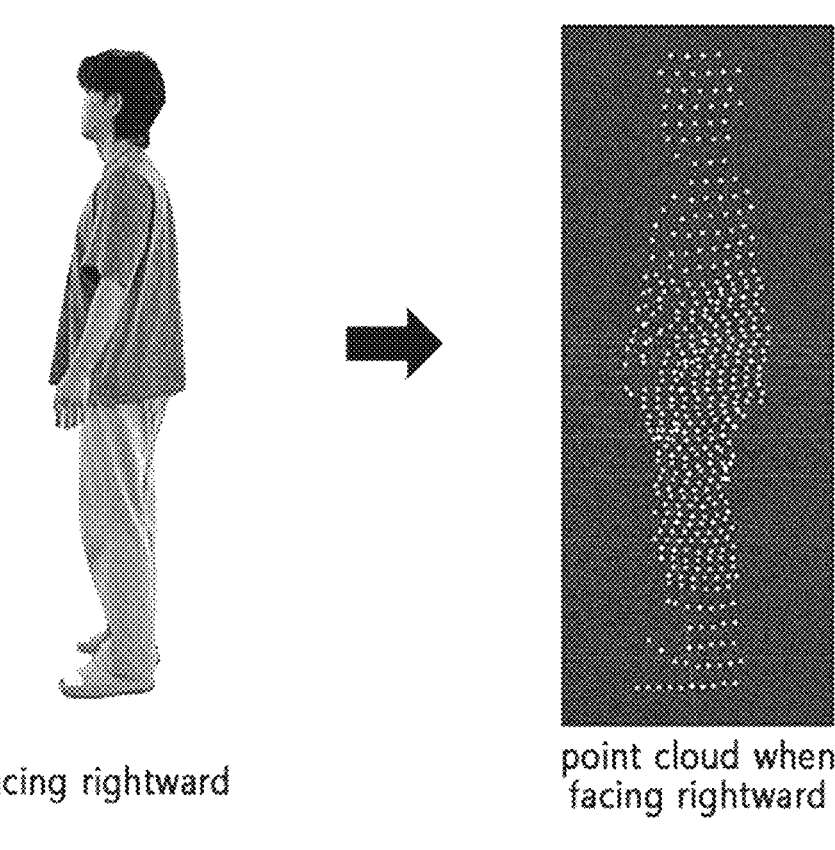
facing rightward
point cloud when
facing rightward
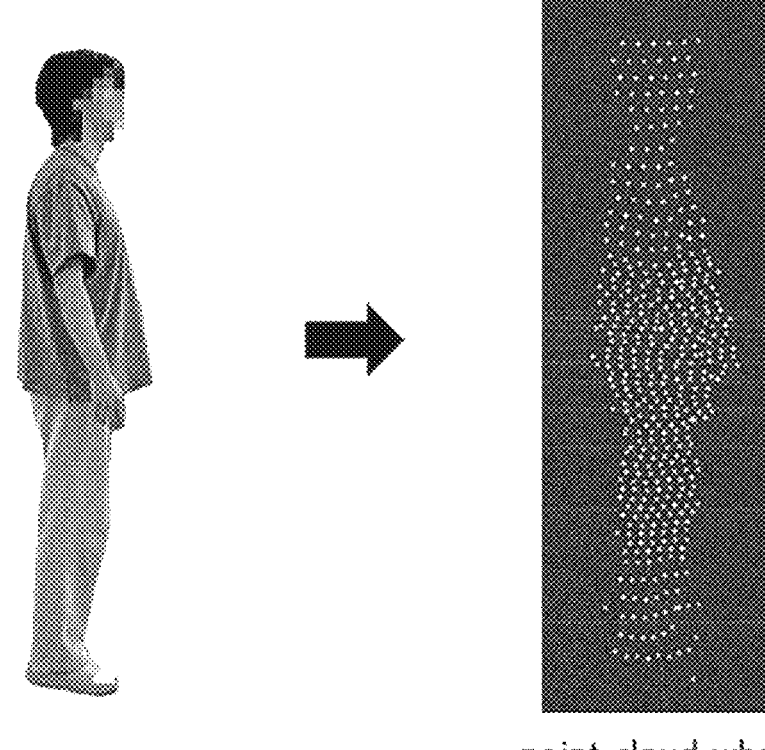
facing leftward
point cloud when
facing leftward body parts overlapped point cloud when body
parts are overlapped

FIG. 8 past orientation information past point
cloud data current point
cloud data inference
model current joint
data current orientation information

FIG. 11

FIG. 12
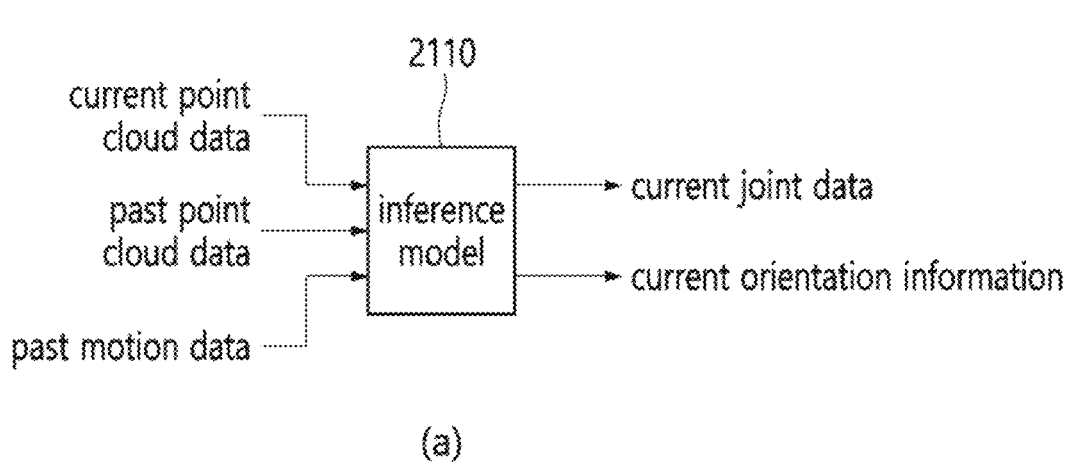
(a)
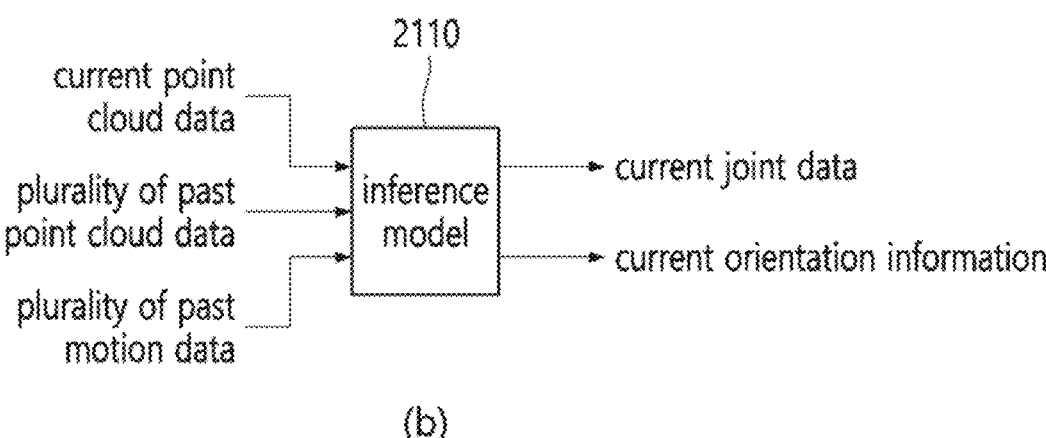
(b)

2110 current point
cloud data past point
cloud data ────→ inference ────→ current joint data
                  model
                        ────→ current orientation information past orientation information latent vector (a)

point cloud
data ────→ motion
           distribution ────→
motion data ──→ encoder latent vector probability distribution data (b)

FIG. 15 point cloud data local central point

2120 point embedding model point feature vector point token body patch

FIG. 18
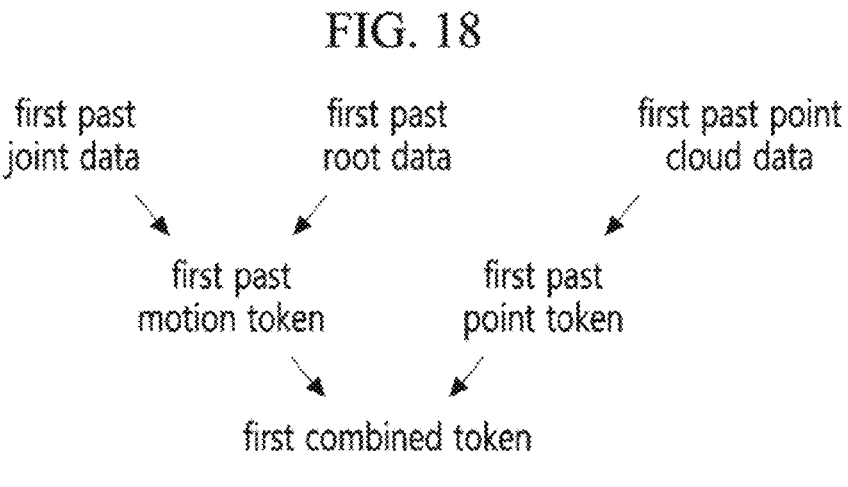
(a)
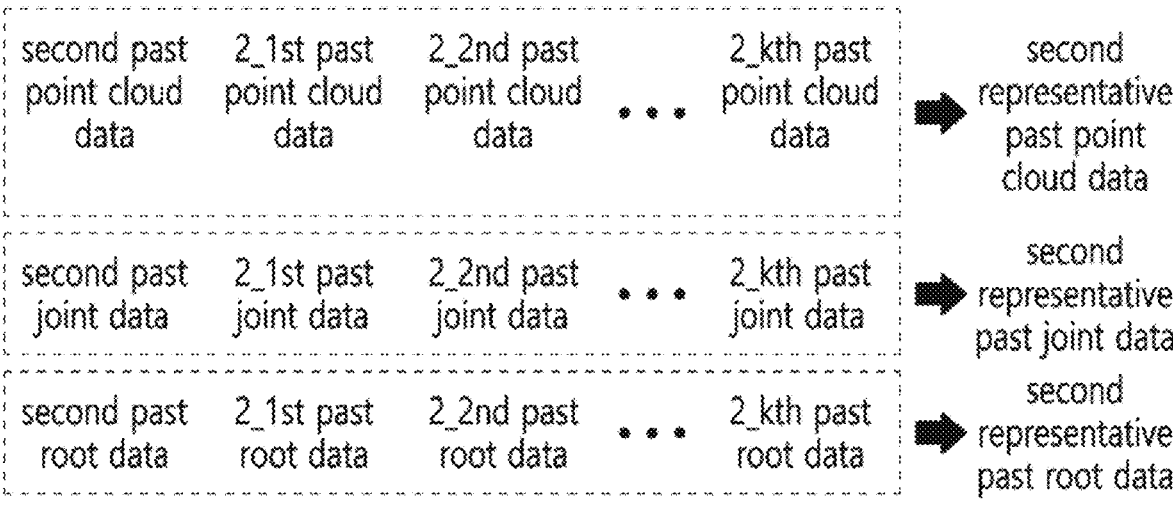
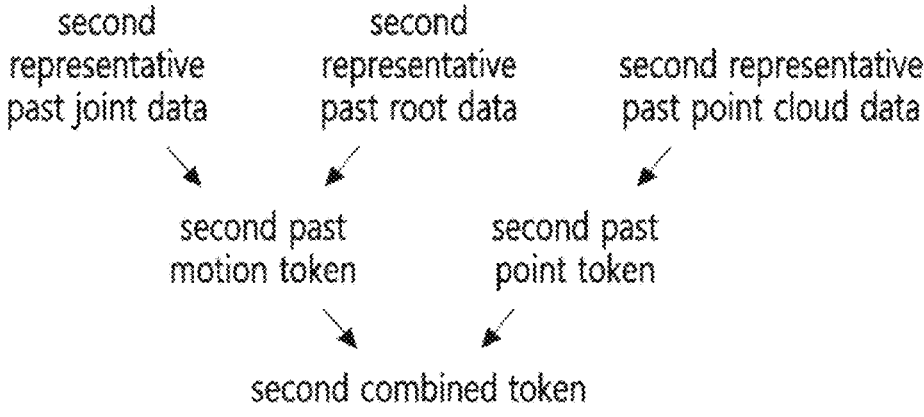
(b)

|          | $MJPE_{cm}$ | $MJRE°$ | $MJLVE_{cm}$ | $MJAVE°$ | Jitt. |
|----------|-------------|---------|--------------|----------|-------|
| GT         | –    | –     | –    | –    | 446.87 |
| w/o past pcd | 6.70 | 11.49 | 1.95 | 2.76 | 919.15 |
| w/o autoreg. | 6.09 | 9.71 | <u>2.07</u> | 3.15 | 1118.68 |
| MOVIN      | <u>6.21</u> | <u>10.12</u> | 1.89 | <u>2.75</u> | <u>871.53</u> |

|          | $MPPE_{cm}$ | $MPRE°$ | $MPLVE_{cm}$ | $MPAVE°$ | Cont._% |
|----------|-------------|---------|--------------|----------|---------|
| w/o past pcd | 4.98 | 12.03 | 1.67 | 6.76 | 92.79 |
| w/o autoreg. | 4.45 | 11.39 | 1.48 | <u>5.83</u> | 94.43 |
| MOVIN      | <u>4.42</u> | <u>11.64</u> | <u>1.50</u> | 4.94 | 94.28 |

(a)

(b)

FIG. 24
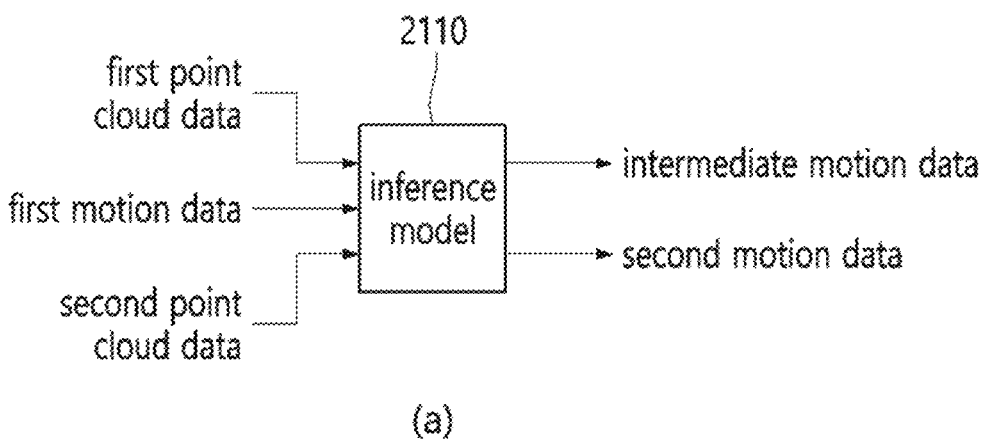
(a)
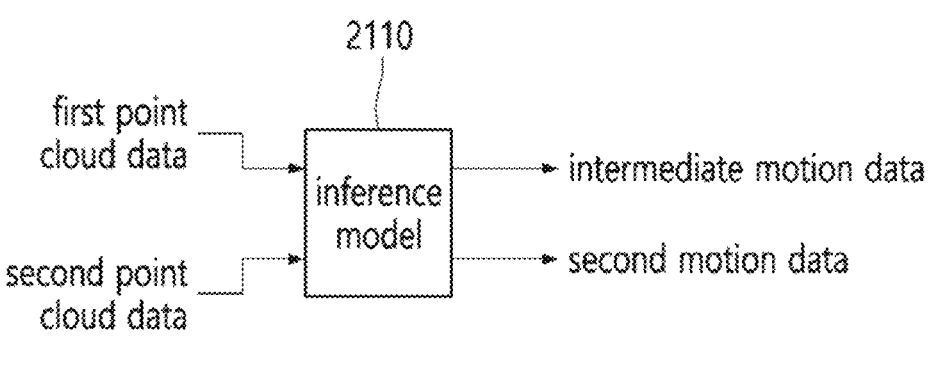
(b)

FIG. 30

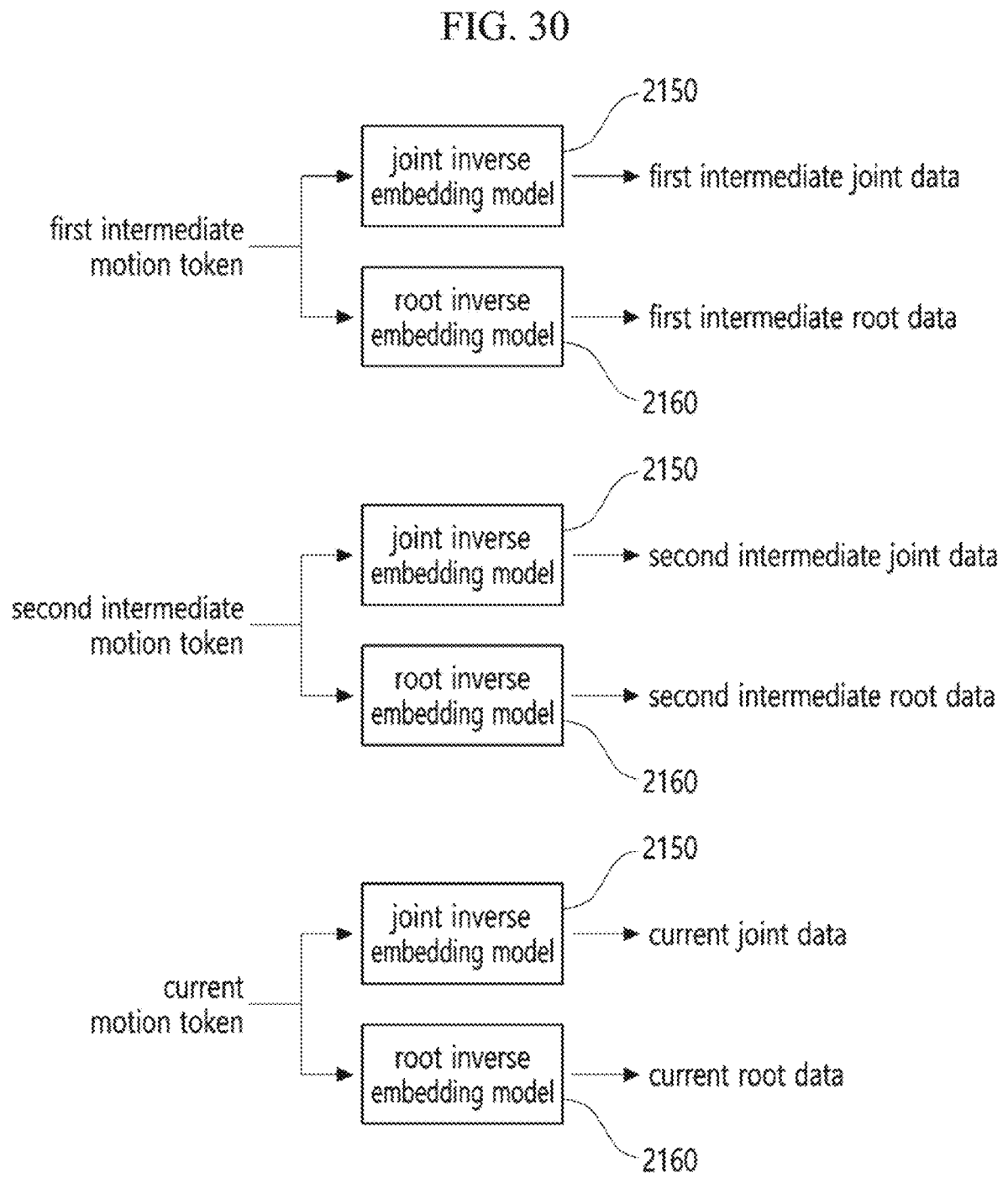

2150 first intermediate motion token → joint inverse embedding model → first intermediate joint data first intermediate motion token → root inverse embedding model → first intermediate root data

2160

2150 second intermediate motion token → joint inverse embedding model → second intermediate joint data second intermediate motion token → root inverse embedding model → second intermediate root data

2160

2150 current motion token → joint inverse embedding model → current joint data current motion token → root inverse embedding model → current root data

2160 obtaining point cloud data for object —S1100 inferring motion data by using point cloud data —S1200 generating digital shape reflecting motion data —S1300 generating feature vector by performing embedding operation on data being used — S2100 generating token by performing tokenization operation on feature vector — S2200 generating inference token by using token and temporal positional encoding vector — S2300 generating motion data by performing inverse embedding operation on inference token — S2400

REAL-TIME MOTION CAPTURE SYSTEM USING SINGLE LiDAR DEVICE

CROSS REFERENCE TO RELATED APPLICATION

The present application claims priority to Korean Patent Application No. 10-2024-0078212, filed Jun. 17, 2024, Korean Patent Application No. 10-2024-0154585, filed Nov. 4, 2024, and Korean Patent Application No. 10-2024-0154586, filed Nov. 4, 2024, the entire contents of which are incorporated herein for all purposes by this reference.

BACKGROUND OF THE INVENTION

Field of the Invention

The present disclosure relates to a motion capture system using a single LiDAR device. More particularly, the present disclosure relates to a system configured to capture movement of a person by using a single LiDAR device, obtain point cloud data, and analyze the obtained point cloud data, and generate motion data in real time for expressing the movement of the person.

Description of the Related Art

Motion capture technology is technology used in various fields such as games, movies, animation, sports, medicine, robots, and the metaverse, and refers to a technology for converting the movement of an object into motion data processable by an electronic device such as a computer through object-related data obtained by using a plurality of sensors. In this case, the level of images or videos visualized by using the motion data varies depending on how accurately the object's movement is inferred to generate the motion data.

Meanwhile, in order to obtain high-quality motion data, it is required to rent an indoor studio equipped with multiple cameras and detect movement by using a marker suit attached with markers recognizable by infrared cameras. Alternatively, it is required to detect the movement while a person wears an IMU suit attached with a plurality of inertial measurement units (IMUs). In this case, issues that studio rental cost is high and a specialized personnel is required for managing the the suit equipment and are acting as barriers to commercializing the motion capture technology for many people.

In addition, the optical motion capture technology using the infrared cameras or the inertial motion capture technology using the IMUs described above requires a long period for preparation processes (e.g., adjusting attachment positions of the markers or sensors, calibration, etc.), and an additional correction process (e.g., generating motion data by adjusting a reference point when happened to be misaligned) is also required in order to accurately recognize the person's movement by the sensors (the infrared cameras or IMU sensors) installed in advance. Because of this, even when the studio is rented for motion capture for a day, motion data actually obtained is merely 40% of the total recording time. Unlike text data, image data, or video data, the motion data has difficult limitations in being handled as the general data as well due to the fact that it is hard to obtain such high-level motion data.

Naturally, as research on motion capture technology increases, a markerless motion capture technology has been devised to capture a person's movement with an RGB camera, and analyze the captured images with an artificial intelligence model, thereby inferring motion. However, since the RGB camera generates two-dimensional (2D) data unrecognizable for forward/backward movement in spatial coordinates, a plurality of RGB cameras has to be installed at various angles, and as a result due to the using of the plurality of devices, there still remain problems such as i) requiring an installation space and ii) requiring a long preparation process (i.e., a calibration process to align sensing areas of two devices), etc. In addition, in the case of markerless motion capture technology, a person's movement is captured for a predetermined time period and then motion data is inferred by using the entire data obtained after the capturing is finished, so it is difficult to detect the person's movement in real time and generate the motion data.

The present disclosure describes a motion capture system that solves the limitations and problems of the existing motion capture technologies as described above.

SUMMARY OF THE INVENTION

A problem to be solved is to provide a markerless motion capture system for capturing the movement of an object and generate a digital shape by using a single LiDAR device.

Another problem to be solved is to provide a motion capture system for inferring motion data having high quality (i.e., a high match rate with actual movement) by using point cloud data on the movement of an object.

A yet another problem to be solved is to provide a motion capture system for inferring motion data having a shorter cycle than a cycle at which point cloud data is obtained for the movement of an object.

The problems to be solved are not limited to the above-described problems, and the problems not described will be clearly understood by those skilled in the art to which the present disclosure belongs from the present specification and accompanying drawings.

According to one embodiment, there is provided a method of motion capture, inferring information related to a movement of an object by using point cloud data for the object, the method comprising: obtaining, through a LiDAR device, point cloud data related to the object at a first time point; obtaining, through the LiDAR device, point cloud data related to the object at a second time point a preset time after the first time point, the preset time being determined according to a frame rate of the LiDAR device; and inferring, through a motion analysis device, joint data and orientation information for the object at the second time point; wherein the motion analysis device comprises an artificial intelligence-based inference model, wherein the joint data comprises at least one of position information of predetermined reference joints, angle information of the reference joints, velocity information of the reference joints, and angular velocity information of the reference joints, wherein the orientation information is indicated as a value that is distinguishable when the object is facing a first direction and when the object is facing a second direction different from the first direction, and wherein the motion analysis device is characterized by inferring the joint data and the orientation information at the second time point by using at least the point cloud data obtained at the first time point, the point cloud data obtained at the second time point, and orientation information at the first time point.

According to other embodiment, there is provided a method of motion capture for generating motion data at a frequency shorter than a scan cycle by using point cloud data obtained with the scan cycle, the method comprising:

obtaining, through a LiDAR device, point cloud data related to an object at a first time point and point cloud data related to the object at a second time point after the scan cycle from the first time point; and inferring, through a motion analysis device, motion data at the second time point for the object; wherein the motion analysis device comprises an AI-based inference model, wherein the motion data includes joint information and root information, wherein the joint data includes at least one of position information of predetermined reference joints, angle information of the reference joints, velocity information of the reference joints, and angular velocity information of the reference joints, wherein the root data includes at least one of position information of a predetermined representative point, angle information of the representative point, velocity information of the representative point, and angular velocity information of the representative point, wherein the inference model is characterized by inferring intermediate motion data at the third time point between the first time point and the second time point together with the motion data at the second time point, by using at least point cloud data obtained at the first time point, point cloud data obtained at the second time point, and motion data at the first time point.

The problem solutions are not limited to the above-described solutions, and solutions that are not described may be understood clearly to those skilled in the art to which the embodiments of the present disclosure belong from the present specification and the accompanying drawings.

According to the exemplary embodiments, the time and cost required to capture the movement of an object and obtain motion data are significantly reduced compared to those of optical motion capture or inertial motion capture.

According to the exemplary embodiments, the quality of motion data (i.e., a match rate with actual movement) is higher than that of an artificial intelligence-based motion capture system using an image camera.

According to the exemplary embodiments, high real-time performance (i.e., a speed at which motion data on the movement of an object is obtained or a speed at which the movement of the object is visualized as a digital shape) is secured.

According to the exemplary embodiments, the movement of a digital shape generated by using motion data has high resolution in a time axis.

The effects of the embodiments of the present disclosure are not limited to the above-described effects, and the effects not described herein may be clearly understood by those skilled in the art to which the embodiments of the present disclosure belong from the present specification and accompanying drawings.

BRIEF DESCRIPTION OF THE DRAWINGS

FIGS. 5 to 7 are views illustrating point clouds for various movements according to the exemplary embodiment.

FIG. 8 is a view illustrating input/output data of an inference model according to the exemplary embodiment.

FIG. 11 is a view illustrating results of performing motion capture on an object in a case where past point cloud data is included in input data of the inference model according to the exemplary embodiment.

FIG. 12 is a view illustrating inference models according to some exemplary embodiments.

FIG. 15 is a view illustrating a process of generating point feature vectors by performing body-patch embedding on point cloud data according to the exemplary embodiment.

FIG. 16 is a view illustrating a process in which an inference model 2110 infers an inference feature vector by using data at a plurality of time points according to the exemplary embodiment.

FIG. 17 is a view illustrating data available at a present time point at which the inference model obtains current point cloud data according to the exemplary embodiment.

FIG. 18 is a view illustrating a method of generating combined tokens according to the exemplary embodiment.

FIG. 24 is a view illustrating input/output data of inference models in an enhanced motion inferring method according to the exemplary embodiment.

FIG. 30 is a view illustrating an inverse embedding process performed in the motion analysis device according to the third exemplary embodiment.

DETAILED DESCRIPTION OF THE INVENTION

Figure 1:
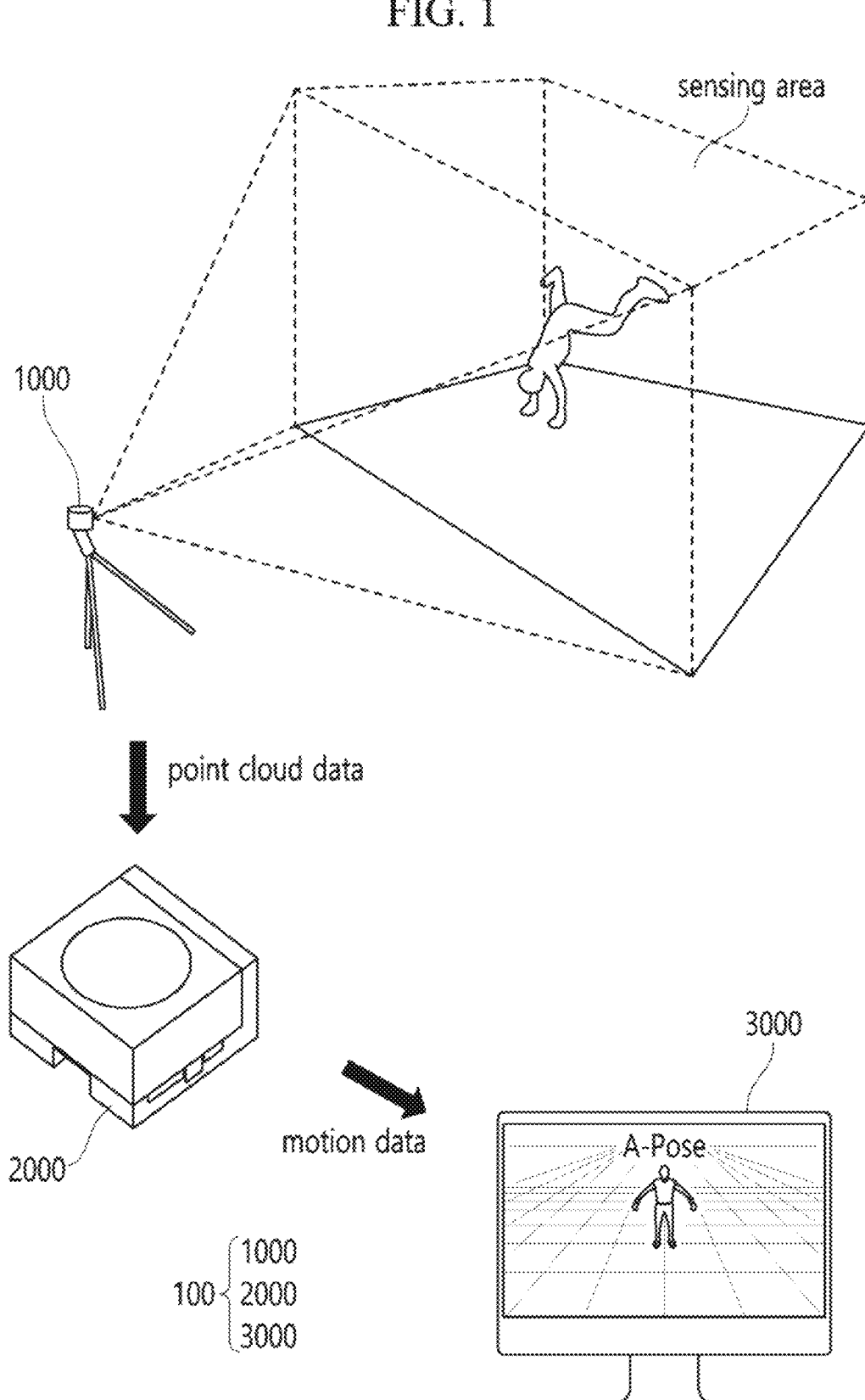
FIG. 1 is a view illustrating a motion capture system according to an exemplary embodiment.

According to one embodiment, there is provided a method of motion capture, inferring information related to a movement of an object by using point cloud data for the object, the method comprising: obtaining, through a LiDAR device, point cloud data related to the object at a first time point; obtaining, through the LiDAR device, point cloud data related to the object at a second time point a preset time after the first time point, the preset time being determined according to a frame rate of the LiDAR device; and inferring, through a motion analysis device, joint data and orientation information for the object at the second time point; wherein the motion analysis device comprises an artificial intelligence-based inference model, wherein the joint data comprises at least one of position information of predetermined reference joints, angle information of the reference joints, velocity information of the reference joints, and angular velocity information of the reference joints, wherein the orientation information is indicated as a value that is distinguishable when the object is facing a first direction and when the object is facing a second direction different from the first direction, and wherein the motion analysis device is characterized by inferring the joint data and the orientation information at the second time point by using at least the point cloud data obtained at the first time point, the point cloud data obtained at the second time point, and orientation information at the first time point.

The orientation information comprises an angle value corresponding to degree of rotation of the object relative to a reference axis within a sensing area of the LiDAR device.

The orientation information at the second time point inferred by the motion analysis device has a first angle value when the LiDAR device captures a front side of the object to obtain point cloud data, the orientation information at the second time point inferred by the motion analysis device has a second angle value when the LiDAR device captures a back side of the object to obtain point cloud data, and it is characterized that the second angle value is between (a+180)° and (a+360)° when the first angle value is between a (a is an integer)° and (a+180)°.

The inference model is pre-trained with training data of at least point cloud data, joint data, and orientation information from different time points.

The motion analysis device is characterized by inferring the joint data and the orientation information at the second time point by using point cloud data obtained at the first time point, point cloud data obtained at the second time point, point cloud data from each of n (n is a natural number greater than or equal to 1) time points selected within 1 second time interval prior to the first time point, and orientation information at the first time point.

The motion analysis device is characterized by inferring the joint data and the orientation information at the second time point by using point cloud data obtained at the first time point, point cloud data obtained at the second time point, orientation information at the first time point, point cloud data obtained at third time point prior to the first time point, and orientation information at the third time point.

The motion analysis device is characterized by inferring the joint data and the orientation information at the second time point by using point cloud data obtained at the first time point, point cloud data obtained at the second time point, joint data at the first time point and orientation information at the first time point.

When orientation information at the first time point is not pre-inferred, the motion analysis device is characterized by inferring the joint data and the orientation information at the second time point by at least point cloud data obtained at the first time point, point cloud data obtained at the second time point, and pre-stored default orientation information.

The motion analysis device is characterized by further inferring at least one of position information of a predetermined representative point, velocity information of the representative point, and angular velocity information of the representative point at the second time point, together with the joint data and the orientation information at the second time point, by using at least point cloud data obtained at the first time point, point cloud data obtained from the second time point, and orientation information at the first time point.

The motion analysis device further infers joint foot-contact information at the second time point together with the joint data and the orientation information at the second time point, by using at least point cloud data obtained at the first time point, point cloud data obtained at the second time point, and orientation information at the first time point, wherein the foot-contact information includes a value indicating whether a foot contacts a ground, and wherein the value included in the foot-contact information differs according to whether a velocity value of a foot joint corresponding to the foot among the reference joints is less than or equal to a threshold value.

The motion analysis device infers the joint data and the orientation information at the second time point by using at least point cloud data obtained at the first time point, point cloud data obtained at the second time point, orientation information at the first time point, and a reference value, and wherein the reference value is generated by using probability distribution data generated by using joint data and orientation information at a plurality of arbitrary time points.

The probability distribution data is probability density function having an average and standard deviation, wherein the reference value is a value randomly extracted from the probability density function, and wherein the average and the standard deviation are obtained by using a transformer-based encoder model and joint data and orientation information at the plurality of arbitrary time points.

The motion analysis device infers the joint data and the orientation information at the second time point by using at least point cloud data obtained at the first time point, point cloud data obtained at the second time point, orientation information at the first time point, and a reference value, and wherein the reference value is generated by using probability distribution data generated by using joint data, orientation information, and point cloud data at a plurality of arbitrary time points.

The probability distribution data is probability density function having an average and standard deviation, wherein the reference value is a value randomly extracted from the probability density function, and wherein the average and the standard deviation are obtained by using a transformer-based encoder model and joint data, orientation information, and point cloud data at the plurality of arbitrary time points.

Inferring the joint data and the orientation information at the second time point by using the motion analysis device comprises, obtaining, through a first embedding model, a first point feature vector from point cloud data obtained at the first time point, a second point feature vector from point cloud data obtained at the second time point; obtaining, through a second embedding model, a first root feature vector by using orientation information at the first time point; obtaining, through the inference model, an inferred feature vector from at least the first point feature vector, the second point feature vector, and the first root feature vector; and obtaining, by using inverse embedding model, the joint data and the orientation information from the inferred feature vector.

Obtaining, through the inference model, an inferred feature vector from at least the first point feature vector, the second point feature vector, and the first root feature vector comprises, generating a first motion token by using the first joint feature vector and the root feature vector; generating a first point token by using the first point feature vector; generating a first combined token by using the first motion token and the first point token; generating a second point token by using the second point feature vector; and obtaining the inferred feature vector by inputting the first combined token, the second point token, and a masked token into the inference model.

The preset time is n (n is a natural number equal to or greater than 1) times a reciprocal of the frame rate.

The joint data and the orientation information are used in generating digital shape corresponding to the object, and wherein a direction in which the digital shape is oriented is determined by the orientation information.

According to other embodiment, there is provided a method of motion capture for generating motion data at a frequency shorter than a scan cycle by using point cloud data obtained with the scan cycle, the method comprising: obtaining, through a LiDAR device, point cloud data related to an object at a first time point and point cloud data related to the object at a second time point after the scan cycle from the first time point; and inferring, through a motion analysis device, motion data at the second time point for the object; wherein the motion analysis device comprises an AI-based inference model, wherein the motion data includes joint information and root information, wherein the joint data includes at least one of position information of predetermined reference joints, angle information of the reference joints, velocity information of the reference joints, and angular velocity information of the reference joints, wherein the root data includes at least one of position information of a predetermined representative point, angle information of the representative point, velocity information of the representative point, and angular velocity information of the representative point, wherein the inference model is characterized by inferring intermediate motion data at the third time point between the first time point and the second time point together with the motion data at the second time point, by using at least point cloud data obtained at the first time point, point cloud data obtained at the second time point, and motion data at the first time point.

The inference model includes at least a first output node outputting a feature vector corresponding to the motion data at the second time point and a second output node outputting a feature vector corresponding to the intermediate motion data at the third time point.

The motion analysis device is characterized by inferring the motion data at the second time point, the intermediate motion data at the third time point between the first time point and the second time point, and intermediate motion data at the fourth time point between the third time point and the first time point together, by using the point cloud data obtained at the first time point, the point cloud data obtained at the second time point, and the motion data at the first time point.

The inference model includes at least a first output node outputting a feature vector corresponding to the motion data at the second time point, a second output node outputting a feature vector corresponding to the intermediate motion data at the third time point, and a third output node outputting a feature vector corresponding to the intermediate motion data at the fourth time point.

The inference model is pre-trained model with point cloud data and motion data at different time points and intermediate motion data at a time point between the different time points as training data.

The motion analysis device is characterized by inferring the motion data at the second time point and intermediate motion data at the third time point by using at least the point cloud data obtained at the first time point, the point cloud data obtained at the second time point, the motion data at the first time point, and intermediate motion data at the fourth time point before the first time point, and a time interval between the third time point and the second time point is same as a time interval between the fourth time point and the first time point.

The motion analysis device infers the motion data at the second time point and intermediate motion data at the third time point together by using at least the point cloud data at the first time point, the point cloud data at the second time point, the motion data at the first time point, and a reference value, and the reference value is characterized by being generated based on probability distribution data generated by using motion data at a plurality of arbitrary time points.

The probability distribution data is a probability density function having an average and a standard deviation, the reference value is a value randomly extracted from the probability density function, and the average and the standard deviation of the probability density function is obtained by using a transformer-based encoder model and the motion data at the plurality of arbitrary time points.

The motion analysis device infers the motion data at the second time point and intermediate motion data at the third time point together by using at least the point cloud data at the first time point, the point cloud data at the second time point, the motion data at the first time point, and a reference value, and the reference value is characterized by being generated based on probability distribution data generated by using motion data and point cloud data at a plurality of arbitrary time points.

The probability distribution data is a probability density function having an average and a standard deviation, the reference value is a value randomly extracted from the probability density function, and the average and the standard deviation of the probability density function is obtained by using a transformer-based encoder model and the motion data and point cloud data at the plurality of arbitrary time points.

Inferring, through the motion analysis device, the motion data at the second time point for the object comprises, obtaining, through a first embedding model, a first point feature vector from the point cloud data obtained at the first time point, a second point feature vector from the point cloud data obtained at the second time point; obtaining, through a second embedding model, a first joint feature vector by using the joint data at the first time point; obtaining, through a third embedding model, a first root feature vector by using the root data at the first time point; obtaining, through the inference model, an inferred feature vector from at least the first point feature vector, the second point feature vector, the first joint feature vector and the first root feature vector; and obtaining, by using an inverse embedding model, the motion data at the second time point and motion data at the third time point from the inferred feature vector.

Obtaining, through the inference model, an inferred feature vector from at least the first point feature vector, the second point feature vector, the first joint feature vector and the first root feature vector comprises, generating a first motion token by using the first joint feature vector and the root feature vector; generating a first point token by using the first point feature vector; generating a first combined token by using the first motion token and the first point token; generating a second point token by using the second point feature vector; and obtaining the inferred feature vector by inputting the first combined token, the second point token, and two masked tokens into the inference model.

The motion data is used to generate digital shape corresponding to the object.

The above-described objectives, features, and advantages will become more apparent from the following detailed description in conjunction with the accompanying drawings. However, since the embodiments of the present disclosure may have various changes and may have various exemplary embodiments, specific exemplary embodiments will be exemplified in the drawings and described in detail below.

In the drawings, the thicknesses of layers and regions are exaggerated for clarity. In addition, a case where an element and/or a component or layer is referred to as "on" or "over" another component or layer includes not only a case where the component is directly "on" the other component or layer, but also a case where is another layer or another component interposed therebetween. The same reference numbers throughout the specification indicate the same components, in principle. In addition, components having the same function within the scope of the same idea shown in the drawings of each exemplary embodiment will be described by using the same reference numerals, and a redundant description thereof will be omitted.

Numbers (e.g., first, second, etc.) used in a process of describing the present specification are merely identification symbols for distinguishing one component from other components.

In addition, the words "module" and "part/unit" used as additive words for the components used in the following exemplary embodiments are given or mixed in consideration of merely the ease of writing the specification, and do not have distinct meanings or roles by themselves.

In the exemplary embodiments below, the singular forms includes the plural forms as well, unless the context clearly indicates otherwise.

In the following exemplary embodiments, terms such as "comprise", "include", or "have" mean that a feature or a component described in the specification exists, and the possibility that one or more other features or components may be added is not precluded.

In the drawings, the size of the components may be exaggerated or reduced for convenience of description. For example, the size and thickness of each component shown in the drawings or views are arbitrarily represented for convenience of description, and the embodiments of the present disclosure are not necessarily limited to the illustrated drawings or views.

Where certain exemplary embodiments are otherwise implementable, specific process order may be performed different from the described order. For example, two processes described in succession may be performed substantially and simultaneously, or may be performed in an order opposite to the described order.

In the following exemplary embodiments, when a film, a region, a component, and/or the like are connected to a target, this includes not only a case where the film, the region, and/or the component are directly connected to the target, but also a case where the film, the region, and/or the component are indirectly connected to the target by means of another film, another region, and/or another component that are interposed therebetween.

For example, in the present specification, when it is said that a film, a region, a component, and/or the like are electrically connected to a target, this includes not only a case where the film, the region, the component, and/or the like are directly and electrically connected to the target, but also a case where the film, the region, the component, and/or the like are indirectly and electrically connected to the target by means of another film, another region, another component, and/or the like that are interposed therebetween.

Unless specifically stated or clear from the context, a term "about" in reference to a numerical value may be understood to mean a stated numerical value and a value up to +/-10% of the numerical value. The term "about" or "around" in reference to a numerical range may be understood to mean a range from a value 10% lower than a lower limit of the numerical range to a value 10% higher than an upper limit of the numerical range.

1. Motion Capture System

The present disclosure relates to a motion capture system using a single LiDAR device. More specifically, the present disclosure relates to a system configured to record movement of a person by using a single LiDAR device, obtain point cloud data, analyze the obtained point cloud data, and generate motion data for expressing the movement of the person.

Hereinafter, a motion capture system 100 is described with reference to FIGS. 1 to 4.

FIG. 1 is a view illustrating a motion capture system 100 according to an exemplary embodiment. Referring to FIG. 1, the motion capture system 100 may include a LiDAR device 1000, a motion analysis device 2000, and an electronic device 3000 for storing a motion editing program.

Figure 2:
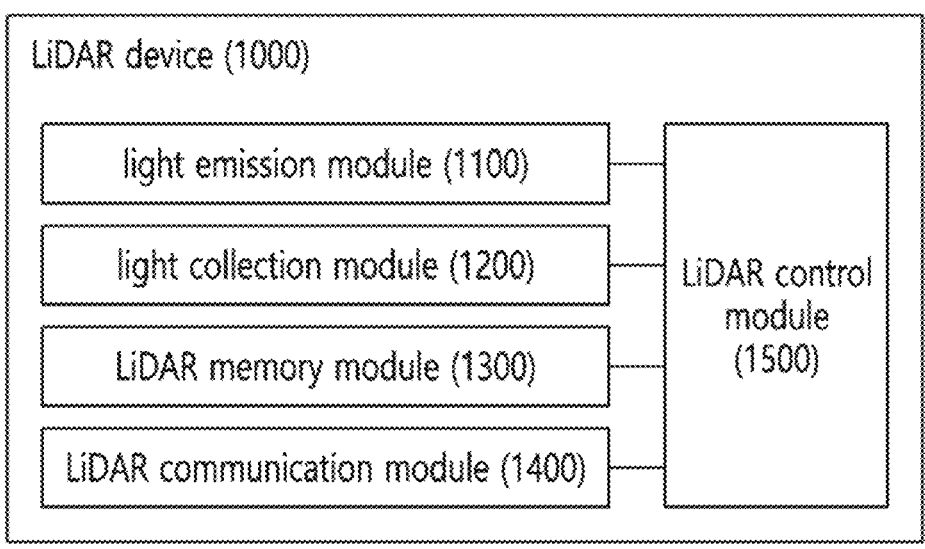
FIG. 2 is a view illustrating components of a LiDAR device according to the exemplary embodiment.

FIG. 2 is a view illustrating components of the LiDAR device 1000 according to the exemplary embodiment.

Figure 3:
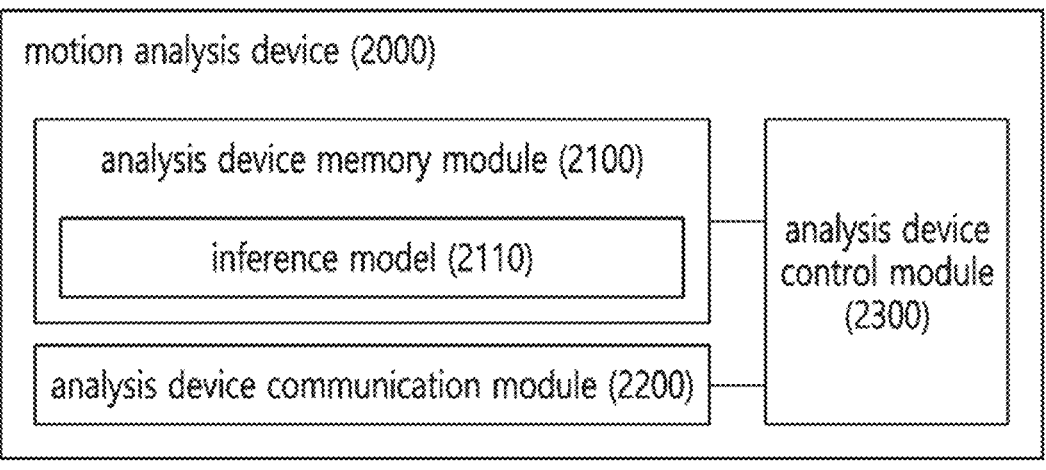
FIG. 3 is a view illustrating a motion analysis device according to the exemplary embodiment.

FIG. 3 is a view illustrating the motion analysis device 2000 according to the exemplary embodiment.

Figure 4:
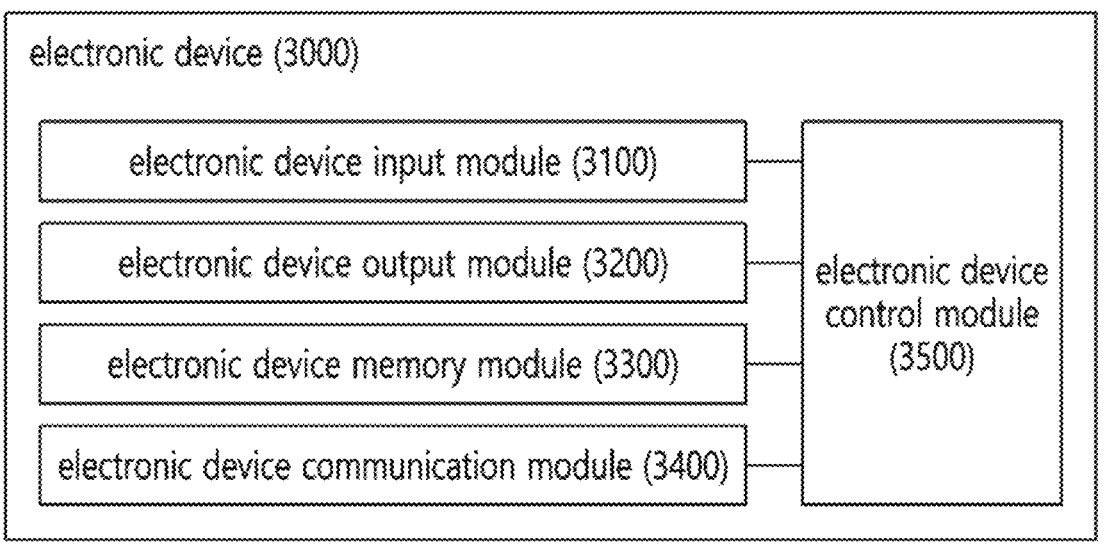
FIG. 4 is a view illustrating an electronic device according to the exemplary embodiment.

FIG. 4 is a view illustrating the electronic device 3000 according to the exemplary embodiment.

1.1 LiDAR Device

A LIDAR device 1000 refers to a device for detecting an object by using Light Detection And Ranging (LiDAR)

technology. Referring to FIG. 2, the LiDAR device 1000 may include a light emission module 1100, a light collection module 1200, a LiDAR memory module 1300, a LiDAR communication module 1400, and a LiDAR control module 1500.

The LiDAR device 1000 may obtain point cloud data by scanning a sensing area (or a scan n area) as to be described below.

The LiDAR device 1000 emits laser light in the form of pulses toward the sensing area by using the light emission module 1100, and collects the light emitted and reflected back by an object within the sensing area by using the light collection module 1200.

The LiDAR control module 1500 may measure a time taken from when light is emitted until the light is collected so as to calculate a distance from an object to a point where the light is reflected. In other words, the LiDAR control module 1500 may calculate the distance from the object to the point where the light is reflected by considering the time taken from when the light is emitted until the light is collected as well as the speed of light.

The light emission module 1100 may emit a plurality of rays of light in a predetermined arrangement, and the plurality of rays of light is reflected and then collected when collided with an object along light paths. The light emission module 1100 may rotate around an axis, and while rotating, the light emission module 1100 may emit the plurality of rays of light and then collect the reflected rays of light, thereby collecting the reflected rays of light for the object present in a sensing area.

The LiDAR device 1000 uses each collected light to infer the object's position information (i.e., reflection positions). As such, a collection of position information corresponding to the plurality of respective rays of light is referred to as point cloud data. For example, the point cloud data may include first position information (or first point information) for a first point to nth position information (or nth point information) for an nth point, and each position information may include three-dimensional coordinate values with a center of the sensing area as the origin.

The LiDAR memory module 1300 may store point cloud data, data obtained in a process of generating the point cloud data, a program for generating the point cloud data, etc.

The LiDAR memory module 1300 may be implemented in hardware in the form of various storage devices such as ROM, RAM, EPROM, a flash drive, or a hard drive.

The LiDAR device 1000 may exchange data with the motion analysis device 2000 by using the LiDAR communication module 1400. For example, the LiDAR device 1000 may transmit point cloud data to the motion analysis device 2000.

The LiDAR communication module 1400 may be, for example, a wired/wireless Local Area Network (LAN) module, a WAN module, an Ethernet module, a Bluetooth module, a Zigbee module, a Universal Serial Bus (USB) module, an IEEE 1394 module, a Wi-Fi module, a mobile communication module, a satellite communication module, or a combination thereof, but is not limited thereto.

Meanwhile, the LiDAR device 1000 may transmit and receive data with the motion analysis device 2000 via wired communication rather than wireless communication. This is because in a case of generating motion data in real time by using the motion capture system 1000, the wired communication rather than the wireless communication may reduce time delay due to data transmission and reception, and accordingly, it is preferable for the LiDAR device 1000 and the motion analysis device 2000 to be connected to each other by wire.

The LiDAR control module 1500 may produce point cloud data. Specifically, the LiDAR control module 1500 may execute a program for performing the method of generating the above-described point cloud data. In addition, the LiDAR control module 1500 may control the LiDAR communication module 1400, so as to transmit the point cloud data to the motion analysis device 2000.

The LiDAR control module 1500 may be, for example, a central processing unit (CPU), a graphics processing unit (GPU), a digital signal processor (DSP), a state machine, an application-specific integrated circuit (ASIC), a radio-frequency integrated circuit (RFIC), or a combination thereof, but is not limited thereto.

Meanwhile, the motion capture system 100 may obtain point cloud data by using another sensor instead of the LiDAR device 1000, and in that case, the point cloud data is obtained as a result, so the inventions disclosed in the present specification can be implemented.

For example, point cloud data may be obtained by using a Time of Flight (ToF) camera or be obtained by recording an object from angles different from each other by using a plurality of stereo vision cameras to extract depth information.

1.2 Motion Analysis Device

The motion analysis device 2000 refers to a device for generating motion data by using point cloud data.

The motion data refers to information related to the movement of an object including a person. For example, the motion data may refer to data including information such as the position, velocity, or the like of each of reference joints representing a person's shape. The motion data may be used to visualize the movement of a detected object, and the information included in the motion data may be used to visualize the movement of the object as a digital shape (in a three-dimensional (3D) model or 2D model) such as an avatar, a character, a skeleton, a body frame, or a mesh.

The accuracy of the visualized digital shape varies depending on the accuracy of the information included in the motion data, and as a result, the more accurate the information included in the motion data, the less unnatural or impossible movement is included in the movement of the visualized digital shape and the more closely the visualized digital shape may correspond to the movement of the actual detected object.

Referring to FIG. 3, the motion analysis device 2000 may include an analysis device memory module 2100, an analysis device communication module 2200, and an analysis device control module 2300.

The motion analysis device 2000 may store data, artificial intelligence models, application programs, etc., which are required to generate motion data, in the analysis device memory module 2100. For example, an inference model 2110 for inferring motion data by using point cloud data may be stored in the analysis device memory module 2100. In addition, the point cloud data obtained from the LiDAR device 1000 may be stored in the analysis device memory module 2100.

The analysis device memory module 2100 may be implemented in hardware in the form of various storage devices such as ROM, RAM, EPROM, a flash drive, or a hard drive.

The motion analysis device 2000 may obtain motion data from point cloud data by using the inference model 2110 stored in the analysis device memory module 2100. The inference model 2110 will be described in detail later.

The motion analysis device 2000 may receive the point cloud data from the LiDAR device 1000 by using the analysis device communication module 2100.

The motion analysis device 2000 may transmit and receive data to and from the electronic device 3000 by using the analysis device communication module 2100. For example, the motion analysis device 2000 may transmit the motion data to the analysis device communication module 2100.

The analysis device communication module 2100 may be, for example, a wired/wireless Local Area Network (LAN) module, a WAN module, an Ethernet module, a Bluetooth module, a Zigbee module, a Universal Serial Bus (USB) module, an IEEE 1394 module, a Wi-Fi module, a mobile communication module, a satellite communication module, or a combination thereof, but is not limited thereto.

Meanwhile, the analysis device communication module 2100 is configured to enable wired communication, and the motion analysis device 2000 may be connected to the LiDAR device 1000 via a cable for the wired communication. In addition, the motion analysis device 2000 may be connected to the electronic device 3000 via a cable for the wired communication in the same manner. This is to ensure high real-time performance of the motion capture system 100 (e.g., a speed at which motion data for the movement of an object is obtained or a speed at which the movement of the object is visualized as a digital shape) by maximally reducing a speed at which the motion analysis device 2000 receives point cloud data from the LiDAR device 1000 and a time at which the motion data is transmitted from the motion analysis device 2000 to the electronic device 3000.

The analysis device control module 2300 may perform motion analysis to be described below. Specifically, the analysis device control module 2300 may infer the motion data from the received point cloud data by using the inference model 2110.

The analysis device control module 2300 may control the analysis device communication module 2100, so as to receive the point cloud data from the LiDAR device 1000 or transmit the motion data to the electronic device 3000.

The analysis device control module 2300 may be, for example, a central processing unit (CPU), a graphics processing unit (GPU), a Neural Processing Unit (NPU), a digital signal machine, an application-specific processor (DSP), a state integrated circuit (ASIC), a radio-frequency integrated circuit (RFIC), or a combination thereof, but is not limited thereto.

1.3 Electronic Device

The electronic device 3000 may be, for example, a user terminal such as a computer, a laptop, a smartphone, or a tablet. Alternatively, the electronic device 3000 may be a server for storing and processing data.

The electronic device 3000 may receive motion data inferred from the motion analysis device 2000 and process or fabricate the received motion data.

For example, the electronic device 3000 may have a built-in program for editing inferred motion data. While executing an editing program, the electronic device 3000 may receive a user input to edit the inferred motion data.

For another example, the electronic device 3000 may have a built-in program for outputting a digital shape such as an avatar, a character, a skeleton, a body frame, or a mesh by applying the inferred motion data. While executing an output program, the electronic device 3000 may receive a user input and output a digital shape.

As a yet another example, the electronic device 3000 may have a built-in program for providing game content, movie production, animation production, sports pose analysis, or the like by using inferred motion data.

Referring to FIG. 4, the electronic device 3000 may include an electronic device input module 3100, an electronic device output module 3200, an electronic device memory module 3300, an electronic device communication module 3400, and an electronic device control module 3500.

The electronic device input module 3100 may receive input from a user. The electronic device input module 3100 provides the received input to the electronic device control module 3500, and the electronic device control module 3500 may execute a command corresponding to the received input. For example, motion data or a digital shape reflecting the motion data may be modified according to the user input received through the electronic device input module 3100.

The electronic device input module 3100 may be a keyboard, a button, a mouse, a microphone, a camera, a sensor, a touch screen, or a combination thereof, but is not limited thereto.

The electronic device output module 3200 may transmit information processed in the electronic device 3000 to a user. The electronic device output module 3200 may output visual information, auditory information, etc. For example, the electronic device output module 3200 may output an image or video including a digital shape reflecting the motion data.

The electronic device output module 3200 may be a display, a speaker, an indicator, or a combination thereof, but is not limited thereto.

The electronic device memory module 3300 may store processed information and executed programs in the electronic device 3000. For example, the electronic device memory module 3300 may store motion data received from the motion analysis device 2000. For another example, the electronic device memory module 3300 may store programs such as a program for visualizing and editing motion data and/or a program for using the motion data to provide specific content.

The electronic device memory module 3300 may be implemented in hardware in the form of various storage devices such as ROM, RAM, EPROM, a flash drive, or a hard drive.

The electronic device communication module 3400 may perform data communication between the electronic device 3000 and an external device. For example, the electronic device communication module 3400 may receive motion data from the motion analysis device 2000.

The electronic device communication module 3400 may be, for example, a wired/wireless Local Area Network (LAN) module, a WAN module, an Ethernet module, a Bluetooth module, a Zigbee module, a Universal Serial Bus (USB) module, an IEEE 1394 module, a Wi-Fi module, a mobile communication module, a satellite communication module, or a combination thereof, but is not limited thereto.

According to the motion capture system 100 described in the present disclosure, the LiDAR device 1000 emits light into a sensing area and collects the light reflected by a moving object in the sensing area, so that point cloud data for the object may be obtained, the obtained point cloud data may be analyzed through the motion analysis device 2000 to generate motion data for the object, and the generated motion data may be visualized or edited through the electronic device 3000.

2. Motion Inferring Method

Hereinafter, with reference to FIGS. 5 to 14, a motion inferring method performed in a motion analysis device 2000 is described. The motion inferring method refers to a method of using point cloud data obtained by using a LiDAR device 1000 to infer motion data.

2.1 Difficulty in Inferring Motion Data Using Point Cloud Data

As a method of inferring motion data by using point cloud data, there is a method of using an artificial intelligence model. For example, various movements of a person are captured by using optical or inertial motion capture technology to obtain actual motion data, the corresponding point cloud data is simultaneously obtained by using the LiDAR device 1000, training data is generated by labeling the actual motion data in the point cloud data, and the generated training data may be used to train the artificial intelligence model. In this case, the trained artificial intelligence model may receive input of the point cloud data and output the motion data.

In this case, it is required for the artificial intelligence model to be designed in consideration of the features of point cloud data. In particular, the accuracy of obtained motion data may vary depending on what information as the motion data to represent the movement of an object is included and how the data input to the artificial intelligence model is organized in what form. That is, whether various motions may be captured or not and the accuracy of the motion capture may vary depending on how the input/output data of the artificial intelligence model is designed.

Figure 7:
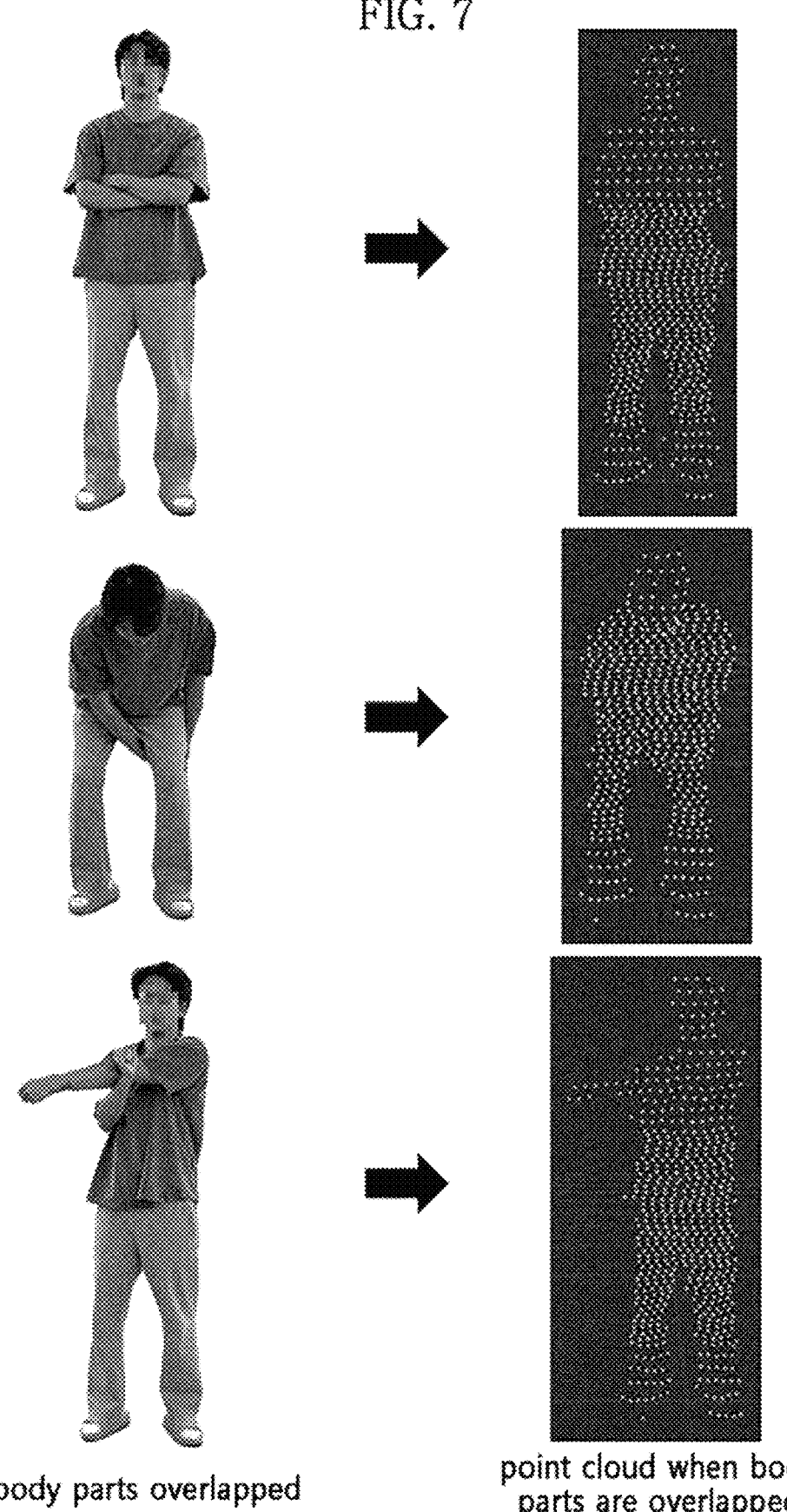

FIGS. 5 to 7 are views illustrating point clouds for various movements according to the exemplary embodiment.

Referring to FIG. 5, it may be seen that the aspects of the point clouds are similar with each other when an object is facing forward (or when an object is standing with a LiDAR device 1000 in front) and when the object is facing backward (or when the object is standing with its back to the LiDAR device 1000). That is, this means that the point cloud data provided when the object is facing forward and the point cloud data provided when the object is facing backward have significantly similar values, and in a case of an artificial intelligence model trained with training data obtained by simply labeling the positions or speeds of the object in the point cloud data, the same motion data can be output for the two kinds of point cloud data.

Referring to FIG. 6, it may be seen that the aspects of point cloud are similar with each other when an object is facing rightward (or when an object is standing with a LiDAR device 1000 placed on the left) and when the object is facing leftward (or when the object is standing with the LiDAR device 1000 placed on the right).

In other words, this means that the point cloud data provided when the object is facing rightward and the point cloud data provided when the object is facing leftward have significantly similar values, and in the case of the artificial intelligence model trained with training data obtained by simply labeling the positions or speeds of the object in the point cloud data, the same motion data can be output for the two kinds of point cloud data.

Referring to FIG. 7, in a case of a motion in which two or more body parts of an object overlap each other (e.g., a motion of crossing arms, a motion of putting an arm between the legs, a motion of pulling one arm with the other arm, a rotational motion in which the arm and torso overlap, a motion of sitting so that the arms and legs overlap, or the like), it may be seen that it is difficult to distinguish the overlapped body parts in point cloud.

In the case of the artificial intelligence model trained with the training data obtained by simply labeling the positions or speeds of the object in the point cloud data, inferred motion data may represent a shape shown as if the body parts are swapped or a motion that a person cannot make.

There were existing artificial intelligence models trained to input point cloud data and output a corresponding pose and shape. However, such models are not designed by taking into account the features of the point cloud data described above (i.e., the features that the front and back views, right and left views have similar point cloud shapes, and the characteristics of difficulty in distinguishing the overlapped body parts), and as a result, such models show significantly inaccurate performance for commercialization, for example: inaccurately distinguishing between the front and back of an object, inferring only temporary poses without considering the connectivity between the poses that an object has, and inferring that an object has moved a distance that is impossible to move in just one second.

The inference model 2110 of the motion analysis device 2000 to be described below is designed by taking into account of the features of the point cloud data described above, and as a result, highly accurate motion data inference corresponding to the actual movement of an object is achievable.

2.2 Input Data of Inference Model

Figure 8:
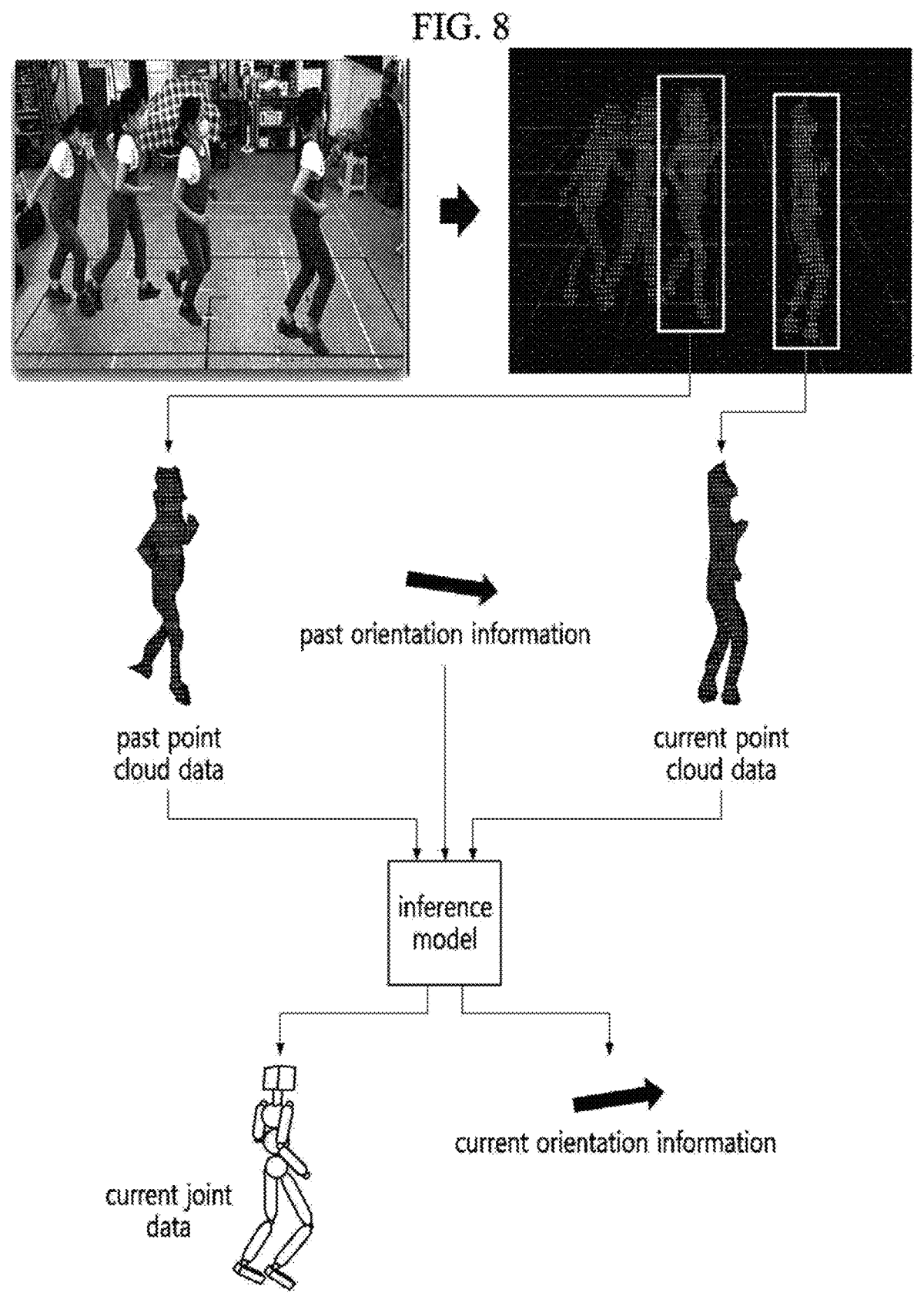

FIG. 8 is a view illustrating input/output data of an inference model 2110 according to the exemplary embodiment.

Referring to FIG. 8, the inference model 2110 may receive input of past point cloud data, past orientation information, and current point cloud data.

As an object moves within a sensing area of a LiDAR device 1000, the LiDAR device 1000 may obtain point cloud data about the movement of the object. At this time, the point cloud data may be obtained for each scan cycle of the LiDAR device 1000. The scan cycle of the LiDAR device 1000 is determined according to a frame rate among the performances of the LiDAR device 1000.

Point cloud data to be described below may be pre-processed before being used by the inference model 2110. Specifically, Statistical Outlier Removal (SOR) may be applied to each point cloud data. The SOR is a data processing method of calculating an average and a standard deviation of distance values between points in the point cloud data and removing points determined to be noise among the points in consideration of the average and standard deviation. When the SOR is applied, position information of the points other than those points corresponding to an object in the point cloud data may be removed as the noise.

Meanwhile, in a case when the SOR is applied, the number of points included in the point cloud data may vary. Accordingly, in order to adjust the number of points in the point cloud data to a predetermined value, a task of deleting position information or adding similar position information of some points included in the point cloud data may be performed.

Current point cloud data refers to point cloud data obtained by the LiDAR device 1000 at a time point at which motion data is to be inferred. Specifically, when an object moves over a predetermined time interval and the motion data for the particular time point during the predetermined time interval is to be inferred, the current point cloud data means point cloud data obtained by the LiDAR device 1000 at the corresponding time point (i.e., the particular time point). In a case where a motion capture system 100 is implemented in a form to infer motion data in real time, the current point cloud data may mean point cloud data most recently obtained by the LiDAR device 1000 based on an operation time point of the motion analysis device 2000.

The past point cloud data refers to point cloud data obtained at a time point prior to a time point at which motion data on the movement of the object is to be inferred. For example, in a case when the movement of an object is captured by the LiDAR device 1000 so that first point cloud data is obtained at a first time point, second point cloud data is obtained at a second time point after the first time point, and motion data at the second time point is to be inferred, the point cloud data obtained at the first time point may be input into the inference model 2110. In this case, the first point cloud data corresponds to the past point cloud data and the second point cloud data corresponds to the current point cloud data.

Since the past point cloud data is input into the inference model 2110 together with the current point cloud data, the object's shape at a past time point may also be considered when the inference model 2110 infers the object's motion data at the present time point. This means that when distinguishing the overlapping movements of the above-described object's body parts, the object's shape before overlapping may be taken into further consideration, and accordingly, there is an effect of inferring the motion data by accurately distinguishing the body parts even for the overlapping movements of the body parts as well.

The past point cloud data may refer to point cloud data obtained immediately before the current point cloud is obtained. For example, the time point at which the past point cloud data is obtained may be a time point that is earlier by a scan cycle than the time point at which the current point cloud data is obtained.

In a case where past point cloud data does not exist (e.g., in a case where the motion analysis device 2000 starts motion capture according to a user input and the like and point cloud data is first input into the inference model 2110), the inference model 2110 may use pre-stored default point cloud data. The pre-stored default point cloud data may represent a specific pose. For example, point cloud data representing an object's arbitrary pose (e.g., an attentive pose, a standing pose in an "A" shape, a standing pose with both arms spread horizontally, etc.) may be stored as default point cloud data in the motion analysis device memory module 2100.

Meanwhile, the inference model 2110 may not perform the motion inferring method in a case where past point cloud data does not exist. In this case, motion data may not be generated until the past point cloud data exists.

The past point cloud data may also refer to point cloud data obtained at an arbitrary time point before a time point at which the current point cloud data is obtained. For example, the time point at which the past point cloud data is obtained may be a multiple of the scan cycle before the time point at which the current point cloud data is obtained. However, in a case where a time point of obtaining the past point cloud data and a time point of obtaining current point cloud data are too far apart from each other, it may indicate less relevant movements, so improper data may be generated for distinguishing overlapping areas and inferring motion data by the inference model 2110.

Accordingly, the past point cloud data input into the inference model 2110 is required to be obtained at a time point within a preset time based on the time point at which the current point cloud data is obtained. The preset time may be, for example, 2 seconds or less, 1.5 seconds or less, 1 second or less, 0.95 seconds or less, 0.9 seconds or less, 0.85 seconds or less, 0.8 seconds or less, 0.75 seconds or less, 0.7 seconds or less, 0.65 seconds or less, 0.6 seconds or less, 0.55 seconds or less, 0.5 seconds or less, 0.45 seconds or less, 0.4 seconds or less, 0.35 seconds or less, 0.3 seconds or less, 0.25 seconds or less, 0.2 seconds or less, 0.15 seconds or less, 0.1 second or less, or 0.05 seconds or less.

Meanwhile, the inference model 2110 may use a plurality of past point cloud data as input data. For example, when the movement of an object is captured by the LiDAR device 1000 in order to obtain first point cloud data at a first time point, obtain second point cloud data at a second time point after the first time point, obtain third point cloud data at a third time point after the second time point, and infer motion data at the third time point, not only first point cloud data corresponding to the past point cloud data but also the second point cloud data may be input into the inference model 2110. There may be three or more pieces of past point cloud data input into the inference model 2110.

Based on the time point at which the current point cloud data is obtained, at least two or more pieces of point cloud data from among point cloud data obtained within a preset time may be used as input data for the inference model 2110. The preset time may be, for example, 2 seconds or less, 1.5 seconds or less, 1 second or less, 0.95 seconds or less, 0.9 seconds or less, 0.85 seconds or less, 0.8 seconds or less, 0.75 seconds or less, 0.7 seconds or less, 0.65 seconds or less, 0.6 seconds or less, 0.55 seconds or less, 0.5 seconds or less, 0.45 seconds or less, 0.4 seconds or less, 0.35 seconds or less, 0.3 seconds or less, 0.25 seconds or less, 0.2 seconds or less, 0.15 seconds or less, 0.1 second or less, or 0.05 seconds or less.

The past orientation information refers to orientation information obtained at a time point prior to a time point at which motion data on the movement of an object is to be inferred. Here, the orientation information stores information about a direction in which the object is heading. For example, the orientation information may be such a direction in which the object or the center of the object is heading, a degree to which the object or the center of the object is rotated relative to the origin, a direction in which the front of the object is heading, or particular orientation information of the object. Specific examples of orientation information will be described below.

The past orientation information may correspond to past point cloud data input into the inference model 2110. For example, the past orientation information may be past orientation information inferred by the inference model 2110 by using at least past point cloud data. The amount of past orientation information input into the inference model 2110 may be equal to the amount of past point cloud data. That is, when a plurality of past point cloud data is input into the inference model 2110, pieces of past orientation information respectively corresponding to the plurality of past point cloud data to be input may be input into the inference model 2110. Alternatively, even when the plurality of past point cloud data is input to the inference model 2110, only past orientation information corresponding to any one piece of past point cloud data from among the plurality of input past point cloud data may also be input into the inference model 2110 together.

In a case where past orientation information does not exist (e.g., in a case where past point cloud data does not exist, or in a case where past point cloud data exists but past orientation information is not inferred), the inference model 2110 may use pre-stored default orientation information. The default orientation information may have arbitrary values. Alternatively, the default orientation information may have values corresponding to a general facing direction of an object. For example, the default orientation information may have values corresponding to a direction in which the object is facing the LiDAR device 1000.

2.3 Output Data of Inference Model

Referring to FIG. 8, the inference model 2110 may output current joint data and current orientation information. Here, joint data and orientation information are first described with reference to FIG. 9.

Figure 9:
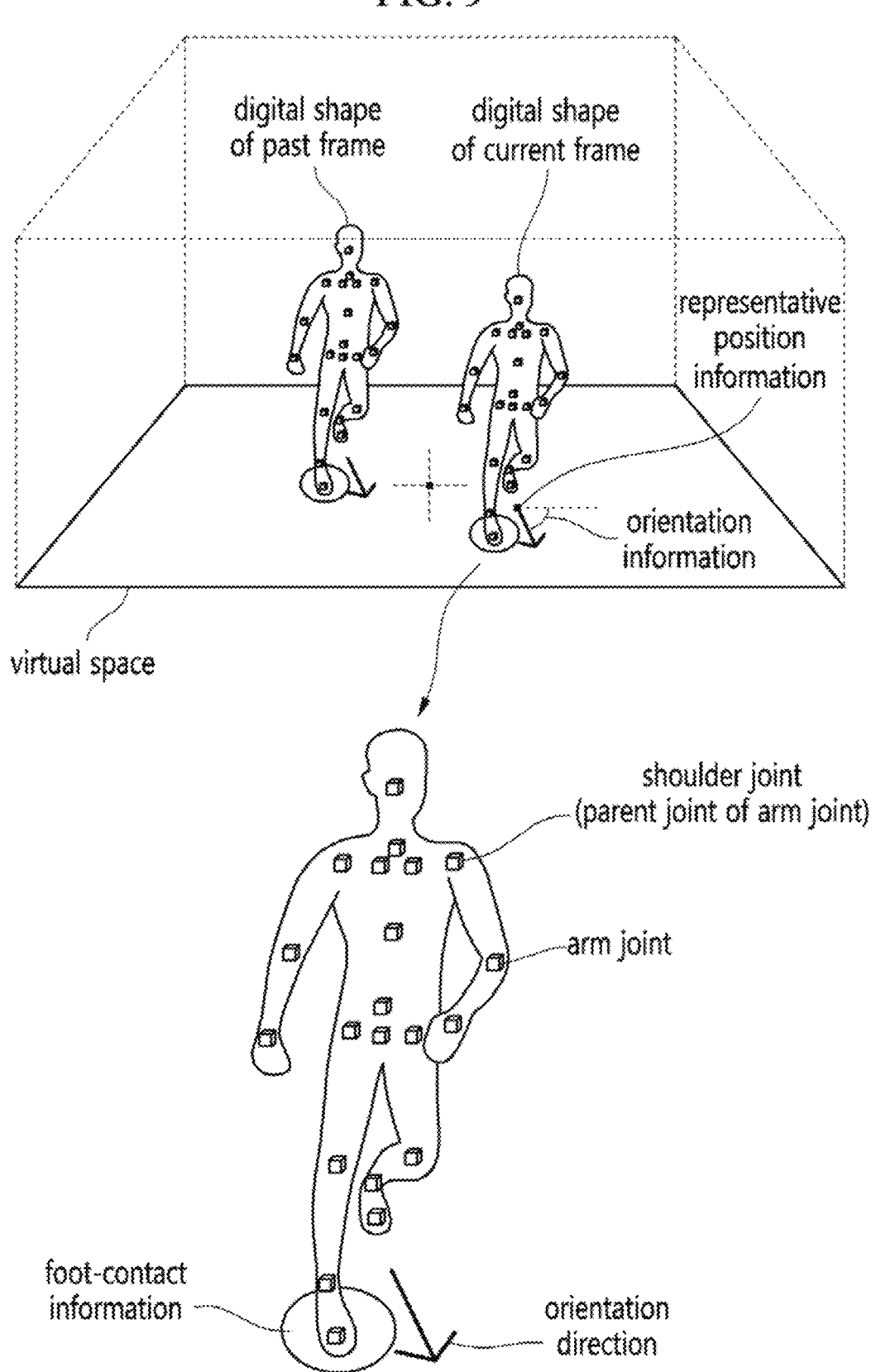
FIG. 9 is a view illustrating digital shapes implemented in a virtual space by using motion data according to the exemplary embodiment.

FIG. 9 is a view illustrating digital shapes implemented in a virtual space by using motion data according to the exemplary embodiment.

Referring to FIG. 9, the virtual space corresponding to a sensing area of a LiDAR device 1000 is set, and when a digital shape corresponding to an object is implemented, the digital shape is reflecting motion data, and the motion data may include joint data and root data.

The joint data refers to information about predetermined reference joints for implementing a person's shape. Specifically, the joint data may include at least some of joint position information, joint rotation information, joint velocity information, and joint angular velocity information of each of the reference joints.

The number of reference joints may be arbitrarily specified. For example, in a case where the number of reference joints is specified as 20, joint data may include first joint data to 20-th joint data, and the first joint data may include first joint position information, first joint rotation information, first joint velocity information, and first joint angular velocity information.

Meanwhile, the values of joint data may be relative values for nearby joints. For example, arm joint data for an arm joint may include relative values for a shoulder joint, which is a joint adjacent to the arm joint and close to a central joint (e.g., a hip joint or pelvic joint) that is the center of reference joints. Specifically, the arm joint data may include relative position information for the shoulder joint, relative angle information for the shoulder joint, relative velocity information for the shoulder joint, and relative angular velocity information for the shoulder joint.

Here, for any one of the reference joints, a joint adjacent to a corresponding joint and close to a central joint is called a parent joint, and joint data of each reference joint may be expressed as relative values to the parent joint.

The joint position information indicates values representing a position of a corresponding joint with respect to a parent joint. Specifically, the joint position information may be obtained with values calculated by subtracting position information of the parent joint from position information of the corresponding joint in a virtual coordinate system. That is, the joint position information refers to coordinate values when the parent joint is used as the origin.

The joint rotation information indicates values representing an angle by which a corresponding joint is rotated relative to a parent joint. Specifically, the joint rotation information refers to coordinate values when the parent joint is set as the origin in a polar coordinate system or a spherical coordinate system.

The joint velocity information indicates a velocity at which a corresponding joint moves from a past frame (or a previous frame) to a current frame, and may be calculated by dividing an amount of change in position information of the corresponding joint in the current frame compared to position information of the corresponding joint in the past frame (or the previous frame) by a value of frame interval.

The joint angular velocity information indicates a velocity at which a corresponding joint rotates from a past frame (or the previous frame) to a current frame, and may be calculated by dividing an amount of change in rotation information of the corresponding joint in the current frame compared to rotation information of the corresponding joint in the past frame (or the previous frame) by a value of frame interval.

The root data includes information about a representative point in a virtual space. Here, the representative point is a point indicating a position of an object in a sensing area, and may mean, for example, the above-described central joint (e.g., the hip joint or pelvic joint) among the reference joints. Alternatively, the representative point may be a point having a position value that is an average of position values of each of the reference joints.

The root data may include at least one of representative position information indicating a position of the representative point in a virtual space, orientation information indicating information about a direction in which a digital shape is heading in the virtual space, representative velocity information indicating a velocity of the representative point in the virtual space, and representative angular velocity information indicating an angular velocity of the representative point in the virtual space.

The representative velocity information indicates a velocity at which a representative point moves from a past frame (or a previous frame) to a current frame, and may be calculated by dividing an amount of change in position information of the representative point in the current frame compared to position information of the representative point in the past frame (or the previous frame) by a value of frame interval.

The representative angular velocity information indicates orientation information having a velocity of rotating from a past frame (or a previous frame) to a current frame, and may be calculated by dividing an amount of change in the orientation information in the current frame compared to the orientation information in the past frame (or the previous frame) by a value of frame interval.

The orientation information is information indicating a direction in which a digital shape is heading relative to a representative point in a virtual space. The orientation information may be expressed, for example, as an angle by which a digital shape is rotated toward a facing direction relative to reference axis defining the virtual space.

The orientation information inferred may vary depending on a direction an object is heading. For example, in a case where the orientation information inferred has a first angle value when the object is standing with its front to a LiDAR device 1000 (i.e., when a LiDAR device 1000 captures the front of the object), and the orientation information inferred has a second angle value when the object is standing with its back to the LiDAR device 1000 (i.e., when the LiDAR device 1000 captures the back of the object), a difference between the first angle value and the second angle value may be approximately 180° (degrees). Alternatively, when a first angle value is between a (where a is an integer) and (a+180), a second angle value may be between (a+180) and (a+360).

The root data may further include foot-contact information. The foot-contact information is information indicating whether a part of an object (particularly, a foot area) has touched the ground or not. The foot-contact information may be determined based on velocity information of a foot joint corresponding to a foot among the reference joints. For example, when a velocity of the foot joint is below a threshold value, the foot-contact information may have a value indicating that the foot has made contact, and when a velocity of the foot joint is greater than or equal to the threshold value, the foot-contact information may have a value indicating that the foot has not made contact.

As described above, the inference model 2110 may output current joint data and current orientation information. The current joint data and current orientation information may be understood as motion data at a time point at which current point cloud data is obtained for an object.

Data for implementing a digital shape corresponding to an object may be prepared by having the inference model 2110 output current joint data. Specifically, when the motion analysis device 2000 infers joint data and provides the inferred joint data to the electronic device 3000, the electronic device 3000 may generate digital shape data by using the current joint data, and may output and visualize the digital shape corresponding to the object in a virtual space. The operation on the device-specific motion capture system 100 is described in more detail below.

Meanwhile, the inference model 2110 may be designed to further output at least one of the above-described current representative position information, current representative velocity information, current representative angular velocity information, and foot contact information, in addition to the current joint data and current orientation information. That is, the inference model 2110 may be designed to output the current joint data and current root data.

2.4 Significance of Input/Output Data

The inference model 2110 outputs current orientation information, so poses and motions, which are difficult to distinguish in point cloud data, such as the front and back views, or right and left views of an object may be distinguished.

Figure 10:
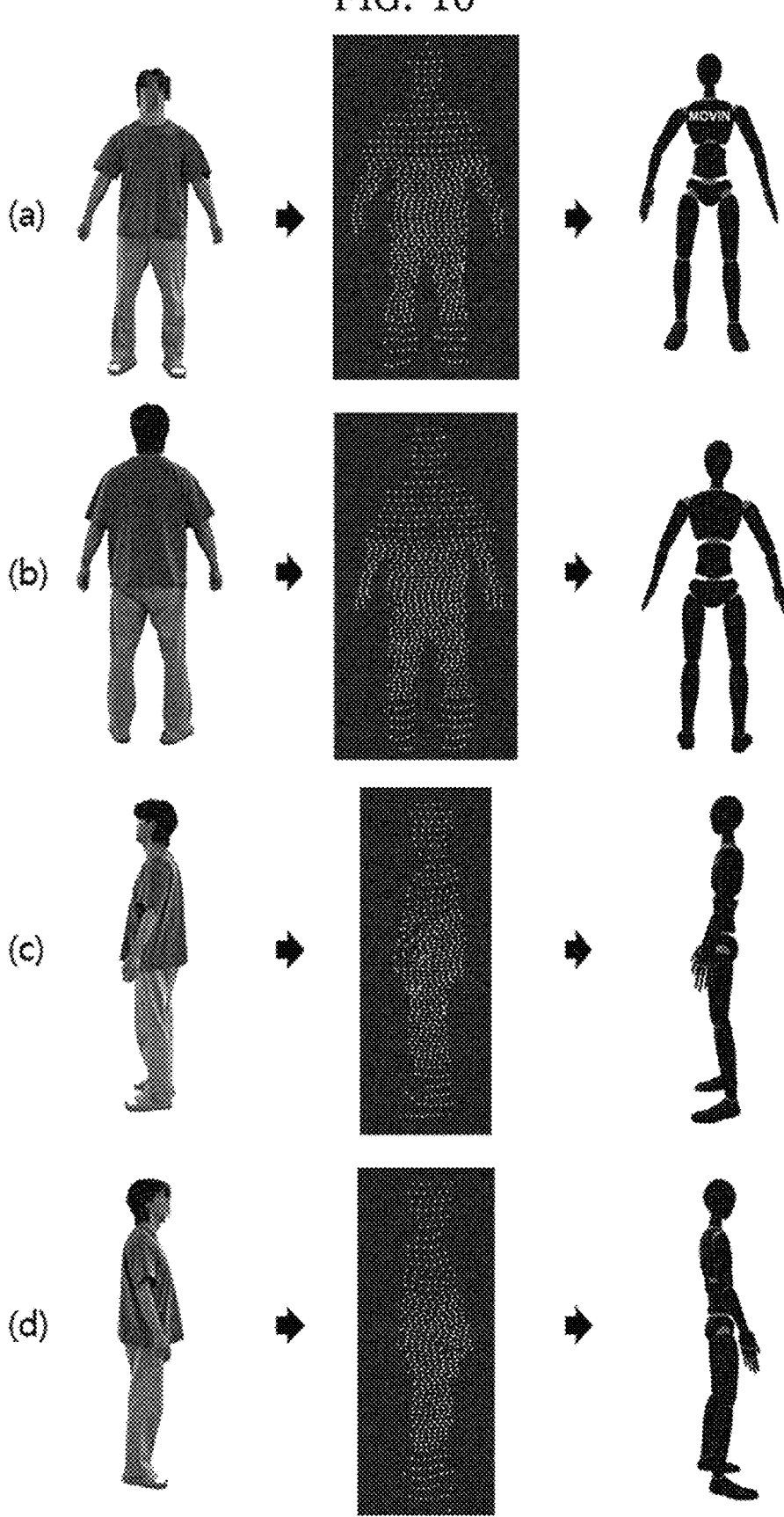
FIG. 10 is a view illustrating results of performing motion capture on an object in a case where current orientation information is included in output data of the inference model according to the exemplary embodiment.

FIG. 10 is a view illustrating results of performing motion capture on an object in a case where current orientation information is included in output data of an inference model 2110 according to the exemplary embodiment. (a) and (b) of FIG. 10 respectively illustrate point cloud data for the object's front and back views and motion data that is inferred therefrom and visualized as digital shapes. (c) and (d) of FIG. 10 respectively illustrate point cloud data on the object's right-facing and left-facing views and motion data that is inferred therefrom and visualized as digital shapes.

Referring to (a) and (b) of FIG. 10, even though the point cloud data for the front view and the point cloud data for the back view are similar with each other, current orientation information has values different from each other, and as a result, a case where the object is facing forward and a case where the object is facing backward may be distinguished from each other. In this way, it is possible to prevent the point cloud data for the front view from being mistakenly recognized as the back view or vice versa.

Referring to (c) and (d) of FIG. 10, even though the point cloud data for the right view and the point cloud data for the left view are similar with each other, current orientation information has values different from each other, and as a result, a case where the object is facing rightward and a case where the object is facing leftward may be distinguished from each other. In this way, it is possible to prevent the point cloud data for the right view from being mistakenly recognized as the left view or vice versa.

As such, since the inference model 2110 outputs the current orientation information, movements different from each other but having similar point cloud data may be distinguished from each other, and this is directly linked to the high accuracy of motion capture technology.

Since the inference model 2110 uses past point cloud data as input data, the body parts of the object may be distinguished from each other even when the body parts overlap.

Figure 11:
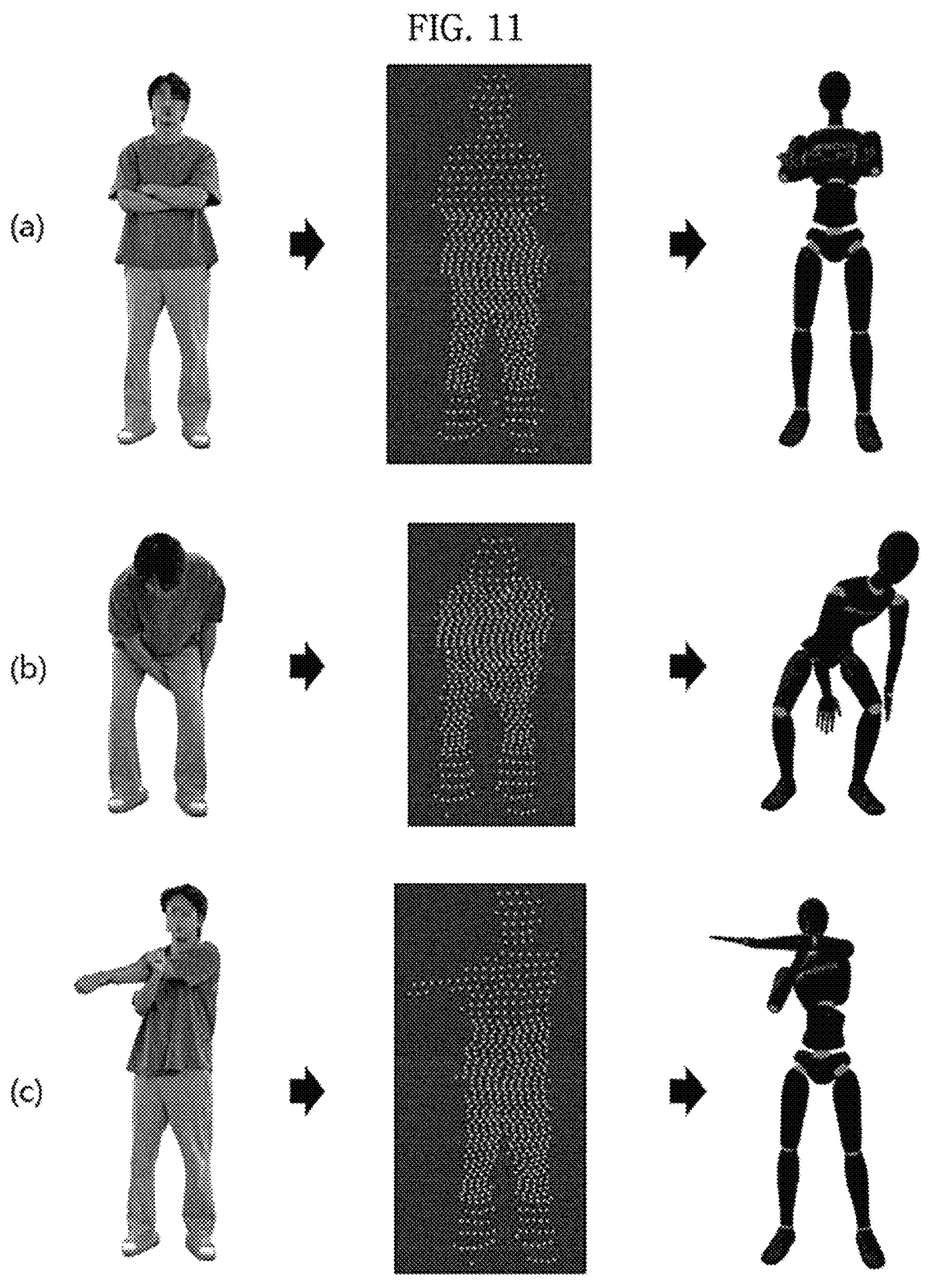

FIG. 11 is a view illustrating results of performing motion capture on an object in a case where past point cloud data is included in input data of the inference model 2110 according to the exemplary embodiment. (a) of FIG. 11 illustrates point cloud data for a view with arms and torso overlapped and motion data that is inferred therefrom and visualized as a digital shape. (b) of FIG. 11 illustrates point cloud data for a view with the arms and a leg overlapped and motion data that is inferred therefrom and visualized as a digital shape. (c) of FIG. 11 illustrates point cloud data for a view with a shoulder and the torso overlapped and motion data that is inferred therefrom and visualized as a digital shape.

As such, the inference model 2110 uses the past point cloud data as the input data, so that when a position of a specific body part (or a joint) is inferred by using current point cloud data regarding a state of body parts overlapped, the position of the body part is able to be considered in the past point cloud data regarding a state of the body parts not overlapped. Accordingly, the overlapped body parts may be distinguished from each other, and this means that there is an effect that unnatural or impossible movements of digital shapes are not to be shown.

2.4 Training Method and Usage Model of Inference Model

As described above, the inference model 2110 may receive input of past point cloud data, current point cloud data, and past orientation information, and output current joint data and current orientation information. In order for input/output data of the inference model 2110 to be designed as that described above, the inference model 2110 may be trained to receive input of the past point cloud data, the current point cloud data, and the past orientation information, and may output the current joint data and the current orientation information. Specifically, in a case of a model configured to receive input of point cloud data of a past time point, point cloud data of a present time point, and orientation information of the past time point to infer the current joint data and current orientation information, the inference model 2110 may be trained by using generated training data after generating training data in a way where second joint data and second orientation information corresponding to a second time point are labeled in first point cloud data at a first time point, second point cloud data at the second time point after the first time point, first and orientation information corresponding to the first point cloud data.

Here, the inference model 2110 may be a transformer-based artificial intelligence model. Specifically, the inference model 2110 may have a structure in which a Mixture of Expert (MoE) model is applied to a decoder of the transformer. Alternatively, the inference model 2110 may use, as a base model, a Gated Recurrent Unit (GRU) model, a Long Short Term Memory (LSTM) model, or a Recurrent Neural Network (RNN) model.

The training of the inference model 2110 may be performed by a training server. The training server is a component included in the motion capture system 100, and refers to a server configured to train artificial intelligence models such as a motion distribution encoder, an embedding model, and an inverse embedding model, which will be described later including the inference model 2110. The training server may be distinguished from the motion analysis device 2000.

Alternatively, the motion analysis device 2000 may also perform the function of the training server. The training server may obtain and store data (e.g., training point cloud data obtained by capturing the movement of an object, training motion data, etc.) required for the inference model 2110, generate a training data set in consideration of the input and output of each artificial intelligence model by using the data, and train each artificial intelligence model with the generated training data set. The training server may provide the trained artificial intelligence models to the motion analysis device 2000, and the motion analysis device 2000 may store the trained artificial intelligence models in the analysis device memory module 2100.

2.5 Orientation Information Omissible

Meanwhile, past orientation information may be excluded from input data of an inference model 2110. For example, the inference model 2110 may be designed to receive input of past point cloud data and current point cloud data and output current joint data and current orientation information.

Even in a case when past orientation information is excluded from the input data of the inference model 2110, motion data having a predetermined level of accuracy or higher may be inferred.

2.6 Input Data Additionally Used

Hereinafter, with reference to FIGS. 12 and 13, a case is described where additional input data is further used by an inference model 2110 in addition to past point cloud data, current point cloud data, and past orientation information. FIG. 12 is a view illustrating respective inference models 2110 according to some exemplary embodiments. (a) of FIG. 12 illustrates a case where current point cloud data, past point cloud data, and past motion data are used as input data of the inference model 2110. (b) of FIG. 12 illustrates a case where current point cloud data, a plurality of past point cloud data, and a plurality of past motion data are used as input data of the inference model 2110.

Referring to (a) of FIG. 12, the inference model 2110 may infer current joint data and current orientation information by further using past joint data, past representative position information, past representative velocity information, past representative angular velocity information, and past foot-contact information, in addition to current point cloud data, past point cloud data, and orientation information.

In other words, the inference model 2110 may be designed to receive input of current point cloud data, past point cloud data, and past motion data, and output current joint data and current orientation information.

The past motion data may correspond to the past point cloud data. Specifically, the past motion data may be motion data inferred by the inference model 2110 at a time point at which the past point cloud data is obtained. The past motion data may be data inferred by the inference model 2110 using the past point cloud data, point cloud data obtained at a time point before the past point cloud data is obtained, and corresponding motion data. In a case when the past point cloud data and past motion data do not exist (e.g., in a case when motion data is inferred for the first time), the inference model 2110 may infer current joint data and current orientation information from default point cloud data, default motion data, and current point cloud data, which are arbitrarily stored. The default data may be, for example, point cloud data and motion data for arbitrary poses of an object (e.g., an attentive pose, a pose standing in an "A" shape, a pose standing with both arms spread horizontally, etc.). Meanwhile, the default data may be generated by using a separate model, where the separate model is a model trained to receive input of point cloud data for the object at a time point and output motion data at the corresponding time point, and may be stored in the analysis device memory module 2100 of the motion analysis device 2000. The default data described in the present disclosure may be generated by using the separate model.

As the inference model 2110 further uses the past joint data when inferring the current joint data, even in a case where some joints overlap, time-series positions of the joints may be considered, whereby distinction is enabled and motions not performable by an object or unnatural motions are prevented from being inferred as motion data.

Meanwhile, the inference model 2110 may also be designed to receive input of current point cloud data, past point cloud data, and past motion data, and output current motion data.

Referring to (b) of FIG. 12, the inference model 2110 may infer current joint data and current orientation information by using current point cloud data, a plurality of past point cloud data, and a plurality of past motion data.

In other words, the inference model 2110 may be designed to receive input of the current point cloud data, the plurality of past point cloud data, and the plurality of past motion data, and output the current joint data and the current orientation information.

The plurality of past point cloud data may be selected from the point cloud data obtained within a preset time based on a time point at which the current point cloud data is obtained. For example, when a frame rate of a LiDAR device 1000 is 20 frames per seconds (fps), 20 pieces of past point cloud data may be obtained for one second in the past based on the time point at which the current point cloud data is obtained, and among this data, n (where n is a natural number greater than or equal to 2 and less than or equal to 20) pieces of past point cloud data may be used as input data. Meanwhile, as the amount of past point cloud data used increases, the amount of data processing increases, whereby a delay time may be lengthened between a time point at which the current point cloud data is obtained and a time point at which the current motion data is inferred. Accordingly, the amount of past point cloud data is required to be limited to a predetermined number, and past point cloud data corresponding to a preset number of frames among frames within a preset time may be selected. For example, the number of pieces of past point cloud data may be less than or equal to 6.

The plurality of past motion data may mean the plurality of past point cloud data respectively corresponding thereto.

When the movement of an object is broken down and described frame by frame (or by short-period time point), a pose of the object in a current frame is derived from a pose of the object in a previous frame. That is, the movement of the object is continuous in time series, and a pose in each frame is linked to a pose in an adjacent frame. As the plurality of past point cloud data is utilized, a pose of the object in not only the current frame and the immediately preceding frame but also the frame before the preceding frame may be considered, thereby contributing to enable the inference model 2110 to infer current joint data and current orientation information more accurately.

Meanwhile, the inference model 2110 may also be designed to receive input of current point cloud data, a plurality of past point cloud data, and a plurality of past motion data, and output current motion data.

Figure 13:
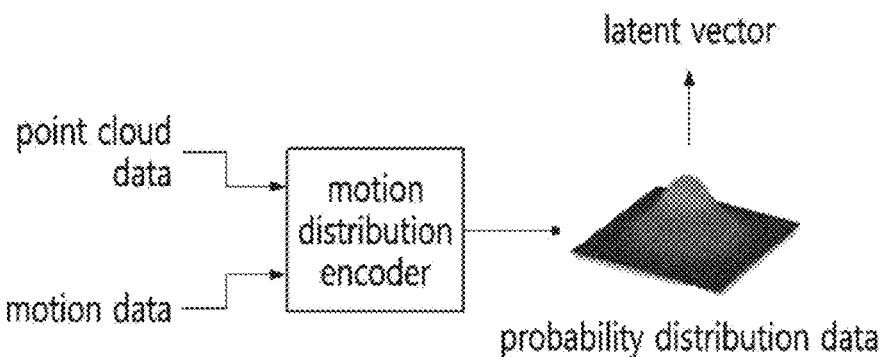
FIG. 13 is a view illustrating a case where latent vector is included in input data of an inference model according to the exemplary embodiment.

FIG. 13 is a view illustrating a case where latent vector is included in input data of an inference model 2110 according to the exemplary embodiment. (a) of FIG. 13 illustrates that the inference model 2110 further uses the latent vector to infer current joint data and current orientation information. (b) of FIG. 13 illustrates a process of generating the latent vector.

Referring to (a) of FIG. 13, the inference model 2110 may receive input of current point cloud data, past point cloud data, past orientation information, and latent vector, and output current joint data and current orientation information.

Latent vector may be understood as a feature value for any one of possible movements of an object in a process of inferring the movement of the object. The inference model 2110 further utilizes the latent vector, enabling inference by considering various possibilities, rather than by inferring motion data collectively.

Specifically, in a case where the movement of the object is unusual, i.e., in a case of data that is about movement difficult to obtain during a process of training the inference model 2110, the using of the latent vector may be more advantageous in predicting untrained movement.

In addition, due to the characteristics of point cloud data, it is difficult to distinguish between body parts of an object in a case where the body parts overlap each other, and in particular, it is impossible to identify what movement is taking place for covered body parts. Even in such a case, latent vector may help the inference model 2110 infer motion data by considering possible movement for the covered body parts.

In addition, in a case of not using latent vector, the inference model 2110 infers substantially the same joint data and orientation information for two identical pieces of point cloud data, whereas the inference model 2110 in a case of using latent vector is able to infer different joint data and orientation information even though they are two identical pieces of point cloud data.

In addition, during the process of training the inference model 2110, in a case where incorrect motion data is trained for point cloud data, a probability that incorrect motion data will be inferred for specific point cloud data increases. However, the latent vector may contribute to inferring correct motion data even for incorrectly trained point cloud data by diversifying the likelihood of values that the motion data may have.

Latent vector may be understood as a reference vector or a reference value that may be referenced in the process of inferring the movement of an object.

Referring to (b) of FIG. 13, latent vector may be obtained by using a motion distribution encoder model. For example, the motion distribution encoder model may receive input of point cloud data and motion data, and output probability distribution data having an average and a standard deviation or a probability density function expressed using the average and standard deviation. The latent vector may be generated arbitrarily from the probability distribution data.

The motion distribution encoder may be a transformer-based artificial intelligence model, an autoencoder model, or a variational autoencoder model.

The motion distribution encoder is trained outside the motion analysis device 2000, and accordingly, probability distribution data may also be generated outside the motion analysis device 2000 and stored in the motion analysis device 2000. For example, the motion capture system 100 further includes a training server, wherein the training server stores a motion distribution encoder and the training server may obtain a training data set and train the motion distribution encoder with the obtained training data set. The training server may generate the probability distribution data by using the trained motion distribution encoder. The training server may provide the generated probability distribution data to the motion analysis device 2000. The motion distribution encoder may also be stored in the motion analysis device 2000, and accordingly, the motion analysis device 2000 may also train the motion distribution encoder.

Meanwhile, the motion distribution encoder may generate probability distribution data by using only motion data as input data. In a case of using point cloud data and motion data as input data, latent vector may be generated based on the point cloud data. In a case when the input data does not include the point cloud data corresponding to the motion data that is to be inferred (e.g., in a case of inferring motion data for a time point in between time points at which point cloud data is obtained), an effect of improving accuracy by using the latent vector may be small. Accordingly, depending on the data included in the input/output data of the inference model 2110, the motion distribution encoder may generate the probability distribution data by using only the motion data as the input data.

In this case, the training data set for training the motion distribution encoder may also be composed of only the motion data.

2.7 Embedding Model and Inverse Embedding Model

Hereinafter, an embedding model and an inverse embedding model are described with reference to FIG. 14.

Figure 14:
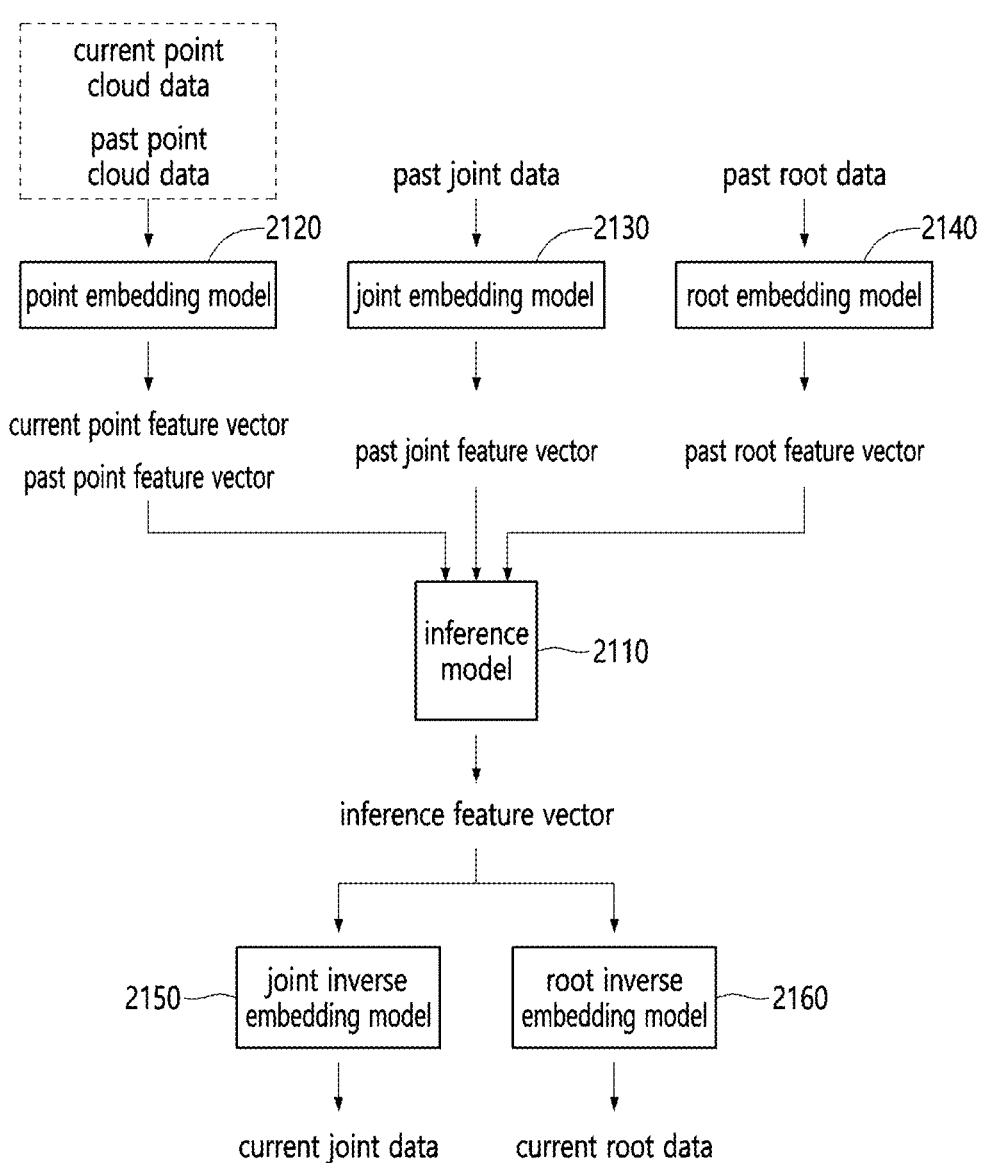
FIG. 14 is a view illustrating how motion data is obtained through an embedding process, an inference process, and an inverse embedding process according to the exemplary embodiment.

FIG. 14 is a view illustrating how motion data is obtained through an embedding process, an inference process, and an inverse embedding process according to the exemplary embodiment. Hereinafter, for convenience of description, the following description is provided based on a case where an inference model 2110 infers current motion data by using current point cloud data, past point cloud data, and past motion data. However, the technical idea of the present disclosure is not limited thereto, and in an embedding process and an inverse embedding process, input/output data used in the inference model 2110 may be similarly applied for any case.

Referring to FIG. 14, feature vectors are generated as current point cloud data, past point cloud data, and past motion data go through the embedding process, and the generated feature vectors may be input into the inference model 2110.

The motion analysis device 2000 may include a point embedding model 2120, a joint embedding model 2130, and a root embedding model 2140, which perform the embedding process. The point embedding model 2120, the joint embedding model 2130, and the root embedding model 2140 may be stored in an analysis device memory module 2100.

The point embedding model 2120 may receive input of current point cloud data, and output a current point feature vector. The point embedding model 2120 may receive input of past point cloud data, and output a past point feature vector. Alternatively, the point embedding model 2120 may receive input of past point cloud data and current point cloud data and output one point feature vector as well.

For example, the point embedding model 2120 may process coordinates of each point by using a multi-layer perceptron (MLP) structure for the input point cloud data and generate one feature vector by using a max-pooling method.

The point embedding model 2120 may be, for example, a PointNet model, a PointNet++ model, a Mini-PointNet model, a PointGrid model, a PointCNN model, a DGCNN model, or a combination thereof.

The joint embedding model 2130 may receive input of past joint data, and output a past joint feature vector. The joint embedding model 2130 includes layers that perform graph convolution, and the graph convolution may be performed on the past joint data to generate the past joint feature vector.

The joint embedding model 2130 may be, for example, a Graph Convolution Network (GCN) model, a Spatial Temporal Graph Convolution Network (ST-GCN) model, an RNN model, a Seq2Seq model, a Transformer model, or a combination thereof. In a case of processing time-series data such as past joint data at a plurality of time points, the joint embedding model 2130 may be implemented as the ST-GCN model, and in a case of processing past joint data at one time point, the joint embedding model 2130 may be implemented as the GCN model.

The root embedding model 2140 includes a convolution operation layer, and the convolution operation is performed on past root data to generate a past root feature vector.

The root embedding model 2140 may be, for example, a multilayer perceptron (MLP) model, a one-dimensional (1D) convolution model, a two-dimensional (2D) convolution model, an RNN model, or a combination thereof.

In a case of processing time-series data such as past root data and the like at a plurality of time points, the root embedding model 2140 may be implemented as a one-dimensional convolutional model, and in a case of processing past root data at one time point, the root embedding model 2140 may be implemented as a multilayer perceptron model.

The inference model 2110 may be designed to receive input of a current point feature vector, a past point feature vector, a past joint feature vector, and a past root feature vector, and output an inference feature vector. The inference feature vector refers to a vector reflecting unique patterns or features of values input to the inference model 2110. The inference feature vector may be understood as a vector including the features of motion data desired to be inferred, and the motion data may be obtained by performing inverse embedding on the inference feature vector as to be described below.

Referring to FIG. 14, current joint data and current root data may be generated, as the inference feature vector goes through the inverse embedding process.

The motion analysis device 2000 may include a joint inverse embedding model 2150 and a root inverse embedding model 2160, which are provided to perform the inverse embedding process. The joint inverse embedding model 2150 and the root inverse embedding model 2160 may be stored in the analysis device memory module 2100.

The joint inverse embedding model 2150 may receive input of an inference feature vector, and output current joint data. The joint inverse embedding model 2150 may have a structure that is an inversed structure of the joint embedding model 2130. For example, in a case where the joint embedding model 2130 is a GCN model, the joint inverse embedding model 2150 may perform feature propagation and graph structure reconstruction on the inference feature vector, thereby generating the current joint data.

The root inverse embedding model 2160 may receive input of an inference feature vector, and output current root data. The root inverse embedding model 2160 may have a structure that is an inversed structure of the root embedding model 2140. For example, in a case where the root embedding model 2140 is a one-dimensional convolutional model, the root inverse embedding model 2160 may perform a transposed convolution operation on the inference feature vector, thereby generating the current root data.

Meanwhile, when point cloud data obtained by a LiDAR device 1000 is compared with image data obtained by an RGB camera or the like, a positional relationship between points changes as frames are changed. Specifically, image data consists of a predetermined number of pixels having fixed positions, and a value of each pixel may change when a frame is changed, but positions with respect to other pixels are fixed. In contrast, in a case of point cloud data, a relative position of each point with respect to other points is not fixed but changes with each frame, so it is difficult to identify what structural features each point has.

In addition, in a case of point cloud data, since the number and positions of points obtained for each frame are changed, there is no guarantee that a specific point from a previous frame will exist in the next frame, and even when the specific point does exist, it is difficult to identify to which point the specific point is mapped. This is in contrast to image data, which has pixels at fixed positions so that a specific pixel from a previous frame may be tracked in the next frame.

Accordingly, as a method of analyzing data, in the case of image data, it is easy to analyze the image data by using a grid having a specific size and shape to group pixels, whereas in the case of point cloud data, it is difficult to use the method used for analyzing the image data because a positional relationship between points and the density or distribution of the points are not constant.

Hereinafter, with reference to FIG. 15, an embedding method of specifying a positional relationship between points in point cloud data will be described as a preparatory operation for analyzing the point cloud data.

Figure 15:
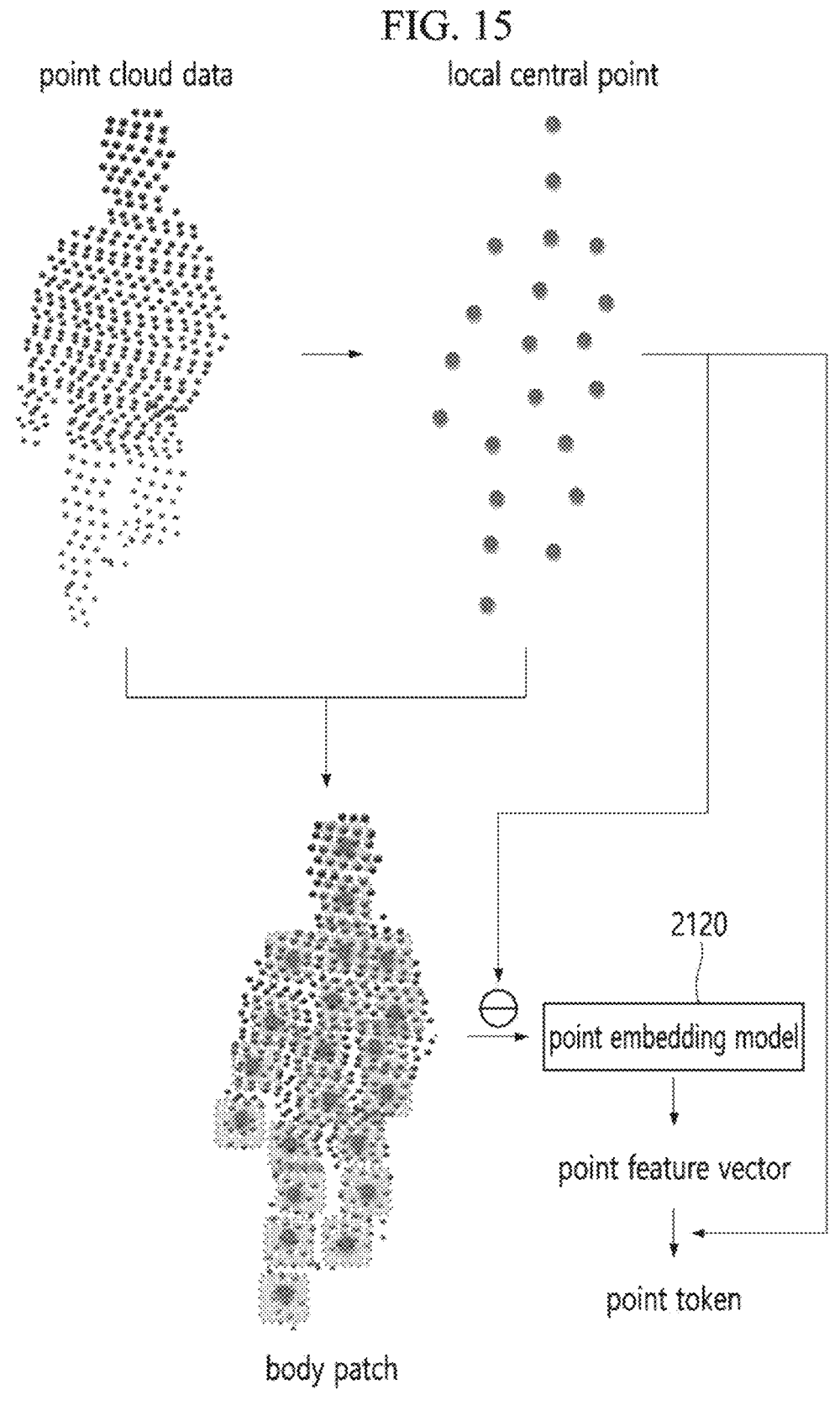

FIG. 15 is a view illustrating a process of generating point feature vectors by performing body-patch embedding on point cloud data according to the exemplary embodiment.

Referring to FIG. 15, a motion analysis device 2000 may select local central points from point cloud data obtained from a LiDAR device 1000, generate a plurality of body patches based on the selected local central points, and input each body patch into a point embedding model 2120 to generate the point feature vectors.

The local central points refer to n points selected from among points represented by the point cloud data. In this case, the n points are obtained by sampling so that distances between the points are as far as possible. For example, a Farthest Point Sampling (FPS) technique may be used to sample the local central points.

The local central points may mean points representing the point cloud data.

A body patch may be generated by grouping k nearest points relative to a local central point. The k-nearest neighbors (k-NN) technique may be used to generate the body patch.

A local central point in each body patch may be excluded. This is to ensure that information included in a body patch is not biased by the local central point due to the body patch generated based on the local central point. In other words, in a case where a local central point is included in each body patch when the body patches are used in extracting point feature vectors from the entire point cloud data, an extracted point feature vector may be close to a feature vector of the local central point, and thus, it is required to exclude the local central point from the corresponding body patch in order to prevent such an instance.

Meanwhile, a local central point may be used to generate a point token by using a point feature vector. A process of generating the point token will be described in detail later.

2.8 Tokenization Method

As described above, in the motion inferring method, past point cloud data and past motion data for a plurality of time points may be used as input data. In this case, when motion data is inferred, there may be provided a method of inputting data so that an inference model 2110 is able to associate the point cloud data and the past motion data with each other for the same time point. In addition, there may be provided the method of inputting data so that the inference model 2110 may take into account the order between the plurality of time points. In this way, a correlation between pieces of data for the same time point is considered, and the accuracy of motion inference may be improved as the order between the time points is considered.

Hereinafter, with reference to FIGS. 16 to 18, there is provided a description of the tokenization method configured to correct input data so that the pieces of data for the same time point are correlated to each other and the order between the plurality of time points is applied.

In a motion inferring method, input data used in the inference model 2110 may include data for a plurality of past time points. That is, as described in (b) of FIG. 12, the inference model 2110 may infer current motion data by way of using current point cloud data, a plurality of past point cloud data, and a plurality of past motion data. Hereinafter, for convenience of description, there is provided a description based on a case where the inference model 2110 infers current motion data including current joint data and current root data and a case where the current root data includes current orientation information. However, the technical idea of the present disclosure is not limited thereto, and as an example, the tokenization method to be described below may also be applied even to a case where the inference model 2110 infers current joint data and current orientation information.

Figure 16:
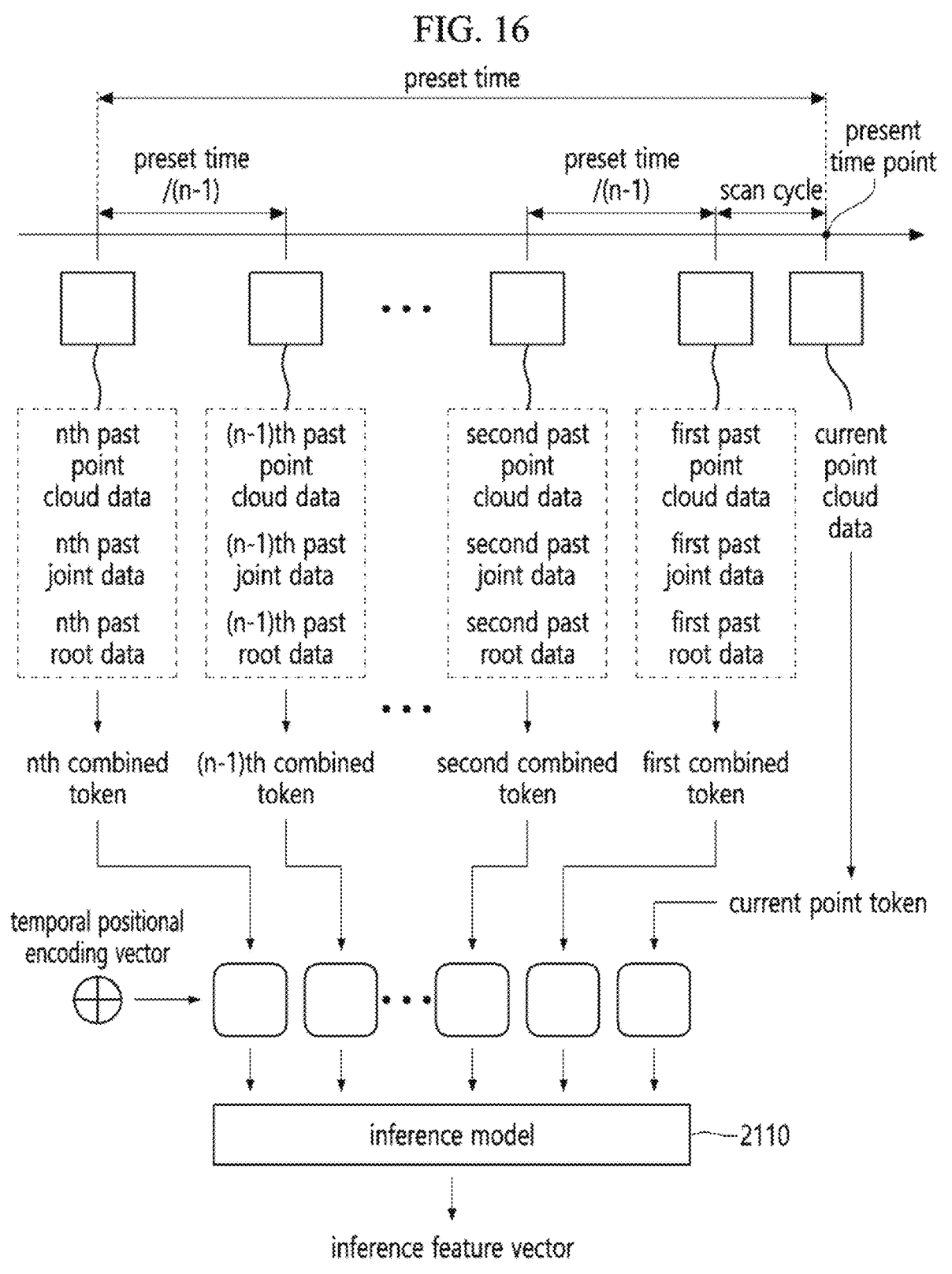

FIG. 16 is a view illustrating a process in which an inference model 2110 infers an inference feature vector by using data at a plurality of time points according to the exemplary embodiment.

Referring to FIG. 16, at a present time point at which current point cloud data is obtained, a motion analysis device 2000 may use at least first past point cloud data to nth past point cloud data, first past joint data to nth past joint data, and first past root data to nth past root data. The corresponding pieces of data may be stored in the analysis device memory module 2100.

The first past point cloud data to the nth past point cloud data may be n pieces of point cloud data selected, based on a preset time, from among point cloud data obtained by a motion analysis device 2000 from a LiDAR device 1000.

For example, point cloud data for a first past time point that is earlier by a scan cycle than a present time point at which the current point cloud data is obtained may be the first past point cloud data. In addition, among the point cloud data obtained up to a time point prior to a preset time based on the first past time point, n–1 pieces of point cloud data obtained at time points having the same interval may be the second past point cloud data to the nth past point cloud data. In this case, a time interval between the first past point cloud data and the nth past point cloud data is calculated as a preset time/(n–1).

For another example, the n pieces of point cloud data selected from among point cloud data obtained during an arbitrary time interval prior to the present time point at which the current point cloud data is obtained may be the first past point cloud data to the nth past point cloud data. In this case, a length of the arbitrary time interval may be the preset time.

The preset time may be, for example, 2 seconds or less, 1.5 seconds or less, 1 second or less, 0.95 seconds or less, 0.9 seconds or less, 0.85 seconds or less, 0.8 seconds or less, 0.75 seconds or less, 0.7 seconds or less, 0.65 seconds or less, 0.6 seconds or less, 0.55 seconds or less, 0.5 seconds or less, 0.45 seconds or less, 0.4 seconds or less, 0.35 seconds or less, 0.3 seconds or less, 0.25 seconds or less, 0.2 seconds or less, 0.15 seconds or less, 0.1 second or less, or 0.05 seconds or less.

The first past joint data to nth past joint data refer to joint data corresponding to the first past point cloud data to the nth past point cloud data, respectively. For example, the first past joint data may be joint data inferred by the inference model 2110 by using at least the first past point cloud data and point cloud data that is obtained therebefore.

The first past root data to nth past root data refer to root data corresponding to the first past point cloud data to the nth past point cloud data, respectively. For example, the first past root data may be root data inferred by the inference model 2110 by using at least the first past point cloud data and the point cloud data obtained therebefore.

As above, in a case where point cloud data and motion data (i.e., joint data and root data) at a plurality of time points are used, the accuracy of inference results may be improved by inputting the pieces of data that are related to each other in bundle, rather than indiscriminately inputting the corresponding data into the inference model 2110.

To this end, pieces of data corresponding to respective time points may be combined into one combined token and input into the inference model 2110. Specifically, referring to FIG. 15, a first combined token may be generated by using first past point cloud data, first past joint data, and first past root data. Similarly, an nth combined token may be generated by using nth past point cloud data, nth past joint data, and nth past root data.

The inference model 2110 may receive input of the first to nth combined tokens and a current point token, and output an inference feature vector. Here, the current point token may be identical to the current point cloud data. Alternatively, the current point token may be data obtained by processing the current point cloud data.

The first to nth combined tokens and the current point token may be processed by using a temporal positional encoding vector and then input into the inference model 2110.

Specifically, values different from each other and representing a temporal order may be respectively added to the first to nth combined tokens and the current point token by the temporal positional encoding vector, and accordingly, the inference model 2110 may infer the inference feature vector by further considering the temporal sequences.

In the above, the case is described where the inference model 2110 infers the inference feature vector by using some of the point cloud data obtained from the LiDAR device 1000 and the corresponding joint data and root data. That is, the inference model 2110 does not use data other than the data at the time point selected among the time points at which the point cloud data is obtained. Hereinafter, a case will be described where the inference model 2110 infers an inference feature vector by using data at all time points at which point cloud data is obtained.

Figure 17:
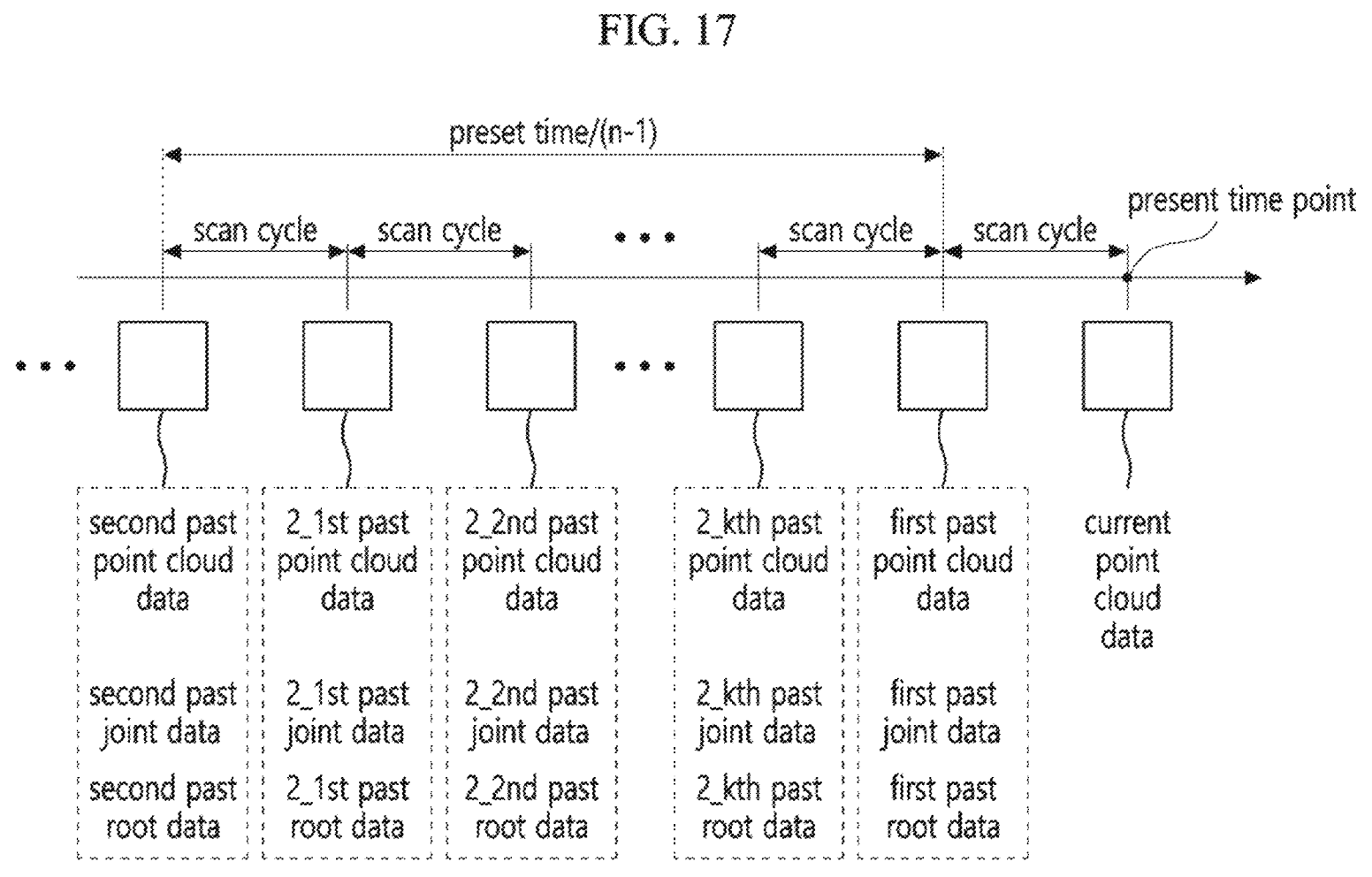

FIG. 17 is a view illustrating data available at a present time point at which an inference model 2110 obtains current point cloud data according to the exemplary embodiment.

FIG. 18 is a view illustrating a method of generating combined tokens according to the exemplary embodiment. (a) of FIG. 18 illustrates a method of generating a first combined token, and (b) of FIG. 18 illustrates a method of generating a second combined token.

Referring to FIG. 17, at a present time point when current point cloud data is obtained, a motion analysis device 2000 may use the first past point cloud data to the nth past point cloud data described above. In addition, the motion analysis device 2000 may use 2_1st past point cloud data to 2_kth past point cloud data, which are obtained at time points in between a time point when the first past point cloud data is obtained and a time point when the second past point cloud data is obtained. In addition, the motion analysis device 2000 may use m_1st past point cloud data to m_kth past point cloud data (where m is a natural number from 2 to n), which are obtained at time points in between a time point when the m_1st past point cloud data is obtained and a time point when mth past point cloud data is obtained. In addition, the motion analysis device 2000 may use the past joint data and the past root data, which are inferred by using the above-described point cloud data (in FIG. 16, only the second past point cloud data is shown based on the present time point).

Here, a value of n may be determined arbitrarily. As to be described below, the value of n may be equal to the number of tokens input to the inference model 2110. As the number of tokens input to the inference model 2110 increases, more data can be considered, but the amount of data required to be processed may also increase to that extent. Accordingly, the value of n may be determined through experiments as a value ensuring that the accuracy of inferred data is at a predetermined level or higher while also ensuring that a data processing speed is at a predetermined level or higher.

Here, a value of k may be determined according to a value of n, a preset time, and a frame rate of the LiDAR device 1000. For example, k may be 3, which is calculated as (preset time/((n−1)*scan cycle))−1, where the frame rate of the LiDAR device 1000 is 20 fps, the preset time is 1 second, and n is 6. Referring to (a) of FIG. 18, the motion analysis device 2000 may generate a first combined token by using first past joint data, first past root data, and first past point cloud data.

First, the motion analysis device 2000 may generate a first past motion token by combining the first past joint data and the first past root data. The first past motion token may be generated by concatenating the first past joint data and the first past root data. Alternatively, the first past motion token may be generated by concatenating the first past joint data and the first past root data, adding a spatial joint encoding vector to each of the first past joint data and the first past root data. The spatial joint encoding vector is a feature vector trained during a training process and has values reflecting a connection relationship between joint data and root data.

The motion analysis device 2000 may generate a first past point token by using the first past point cloud data. The first past point token may be identical to the first past point cloud data. Alternatively, the first past point token may be generated by adding a center point positional encoding vector to the first past point cloud data. The center point positional encoding vector may be used body-patch embedding is performed on the point cloud data, and may mean a vector reflecting a position of a local central point described above.

The motion analysis device 2000 may generate a first combined token by using the first past motion token and the first past point token. The motion analysis device 2000 may generate the first combined token by concatenating the first past motion token and the first past point token.

Meanwhile, in generating the first combined token, an embedding process may be further performed on joint data, root data, and point cloud data.

Specifically, the motion analysis device 2000 may extract a first past joint feature vector from the first past joint data by using a joint embedding model 2130. In addition, the motion analysis device 2000 may extract a first past root feature vector from the first past root data using a root embedding model 2140. In addition, the motion analysis device 2000 may extract a first past point feature vector from the first past point cloud data by using a point embedding model 2120.

The motion analysis device 2000 may generate a first past motion token by using the first past joint feature vector and the first past root feature vector. The first past motion token may be generated by concatenating the first past joint feature vector and the first past root feature vector. Alternatively, the first past motion token may be generated by concatenating the first past joint feature vector and the first past root feature vector, adding the above-described spatial joint encoding vector to each vector.

The motion analysis device 2000 may generate a first past point token by using the first past point feature vector. The first past point token may be identical to the first past point feature vector. Alternatively, the first past point token may be generated by adding the above-described center point positional encoding vector to the first past point feature vector. The center point positional encoding vector may be used when body-patch embedding rather than point embedding is performed on the point cloud data, and may mean a vector reflecting the position of the local central point described above.

The motion analysis device 2000 may generate the first combined token by using the first past motion token and the first past point token. The motion analysis device 2000 may generate the first combined token by concatenating the first past motion token and the first past point token.

Referring to (b) of FIG. 18, the motion analysis device 2000 may generate a second combined token by using second past joint data, 2_1st past joint data to 2_kth past joint data, second past root data, 2_1st past root data to 2_kth past root data, second past point cloud data, and 2_1st past point cloud data to 2_kth past point cloud data.

The motion analysis device 2000 may generate second representative past joint data by using the second past joint data and the 2_1st to 2_kth past joint data. The motion analysis device 2000 may generate the second representative past joint data by averaging the second past joint data and the 2_1st to 2_kth past joint data. Besides the averaging, other methods of generating representative data may be used. For another example, any one of the second past joint data and the 2_1st to 2_kth past joint data may be used as the second representative past joint data.

The motion analysis device 2000 may generate second representative past root data by using the second past root data and the 2_1st to 2_kth past root data. The motion analysis device 2000 may generate the second representative past root data by averaging the second past root data and the 2_1st to 2_kth past root data. Besides the averaging, other methods of generating representative data may be used.

The motion analysis device 2000 may generate second representative past point cloud data by using the second past point cloud data and the 2_1st to 2_kth past point cloud data. For example, the motion analysis device 2000 may generate second representative past point cloud data by averaging on the second past point cloud data and the 2_1st to 2_kth past point cloud data. In addition to the averaging, other methods of generating representative data may be used.

Thereafter, the motion analysis device 2000 may generate a second past motion token by using the second representative past joint data and the second representative past root data. The second past motion token may be generated by concatenating the second representative past joint data and the second representative past root data. Alternatively, the second past motion token may be generated by concatenating the second representative past joint data and the second representative past root data, adding the above-described spatial joint encoding vector to each piece of data.

The motion analysis device 2000 may generate a second past point token by using the second representative past point cloud data. The second past point token may be identical to the second past point cloud data. Alternatively, the second past point token may be generated by adding the above-described center point positional encoding vector to the second representative past point cloud data. The center point positional encoding vector may be used when body-patch embedding is performed on the point cloud data, and may mean a vector reflecting a position of a local central point described above.

The motion analysis device 2000 may generate a second combined token by using the second past motion token and the second past point token. For example, the motion analysis device 2000 may generate the second combined token by concatenating the second past motion token and the second past point token.

Meanwhile, in generating the second combined token, an embedding process may be further performed on joint data, root data, and point cloud data.

Specifically, the motion analysis device 2000 may extract a second past joint feature vector and 2_1st to 2_kth past joint feature vectors from the second past joint data and the 2_1st to 2_kth past joint data by using the joint embedding model 2130, and generate a second representative past joint feature vector by averaging on these extracted vectors.

The motion analysis device 2000 may extract a second past root feature vector and 2_1st to 2_kth past root feature vectors from the second past root data and the 2_1st to 2_kth past root data by using the root embedding model 2140, and generate a second representative past root feature vector by averaging on these extracted vectors.

The motion analysis device 2000 may extract a second past point feature vector and 2_1st to 2_kth past point feature vectors from the second past point cloud data and the 2_1st to 2_kth past point cloud data by using the point embedding model 2120, and generate a second representative past point feature vector by averaging on these extracted vectors.

Meanwhile, in a case where an embedding process is additionally performed, a process of generating representative data for at least some data may be performed or omitted before the embedding process. For example, the motion analysis device 2000 may use only the second past point feature vector obtained by performing embedding on the second past point cloud data when generating the second past point token. For another example, the motion analysis device 2000 may generate second representative past point cloud data by using the second past point cloud data and the 2_1st to 2_kth past point cloud data, and then perform point embedding to generate a second representative past point feature vector. This may be equally applied to joint data and root data as well.

In a case where data at all time points is used, the amount of data on which the embedding process has to be performed may also increase dramatically, and accordingly, data processing speed thereof may also increase dramatically, whereby the real-time performance of motion capture may be decreased. Accordingly, it is necessary to reduce the embedding process itself as much as possible. As described above, motion data is expected to have a greater impact on inferring current motion data than that of point cloud data, so it is preferable to reduce the embedding process for the point cloud data.

The motion analysis device 2000 may obtain an inference feature vector by inputting the first to nth combined tokens and the current point token into the inference model 2110.

Before being input to the inference model 2110, the first to nth combined tokens and the current point token may be processed by using the temporal positional encoding vector described above. Specifically, values different from each other and representing a temporal order may be respectively added to the first to nth combined tokens and the current point token by the temporal positional encoding vector, and accordingly, the inference model 2110 may infer the inference feature vector by further considering the temporal order.

In the above, it is described that the first combined token is generated by using the first past point cloud data, the first past joint data, and the first past root data, and each of the second to nth combined tokens is generated by using a plurality of past point cloud data, a plurality of past joint data, and a plurality of root data. This is because the first past point cloud data, the first past joint data, and the first past root data are data at a time point closest to a present time point at which motion data (joint data and root data) is to be inferred, thereby having the highest correlation to the motion data at the present time point. That is, one of the reasons is to cause the inference model 2110 to increase the weights of the point cloud data obtained at the closest time point to the time point at which the motion data is to be inferred and the inferred motion data so that they are considered with their originality being retained, and the other reason is to cause the inference model 2110 to decrease the weights of the point cloud data obtained during a preset time therebefore and the inferred motion data so that they are compressed and considered.

3. Exemplary Embodiment of Motion Inferring Method

As described above, the input/output variables of the inference model 2110 may be determined in various ways according to some exemplary embodiments in the motion inferring method, and the form of the variables may also be variously transformed when there are provided the embedding process and inverse embedding process.

3.1 First Exemplary Embodiment

Hereinafter, a first exemplary embodiment of a motion analysis device 2000 for performing the above-described motion inferring method is described with reference to FIGS. 19 and 20.

Figure 19:
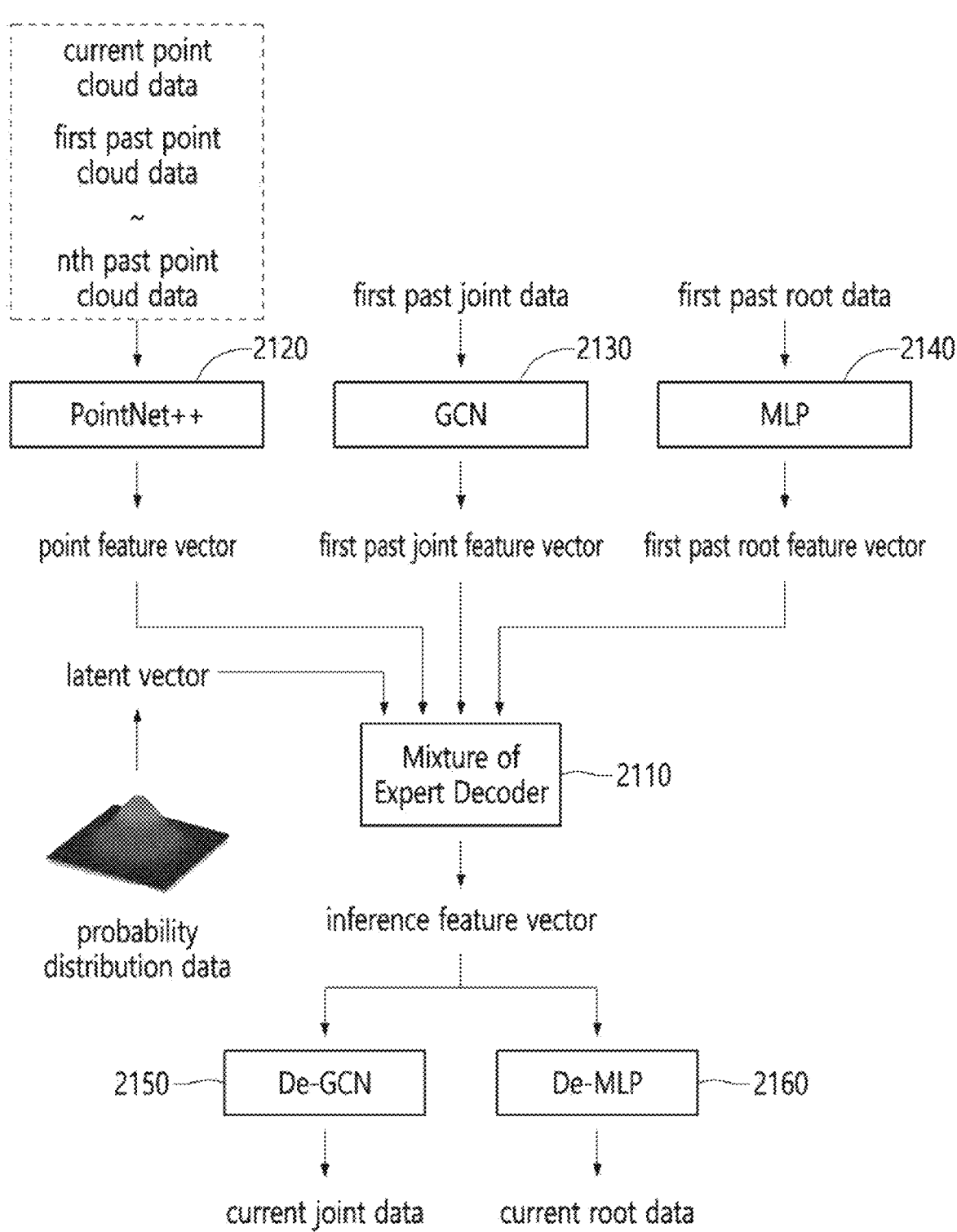
FIG. 19 is a view illustrating a configuration of a motion analysis device and a process by which data is processed according to a first exemplary embodiment.

FIG. 19 is a view illustrating a configuration of a motion analysis device 2000 and a process by which data is processed according to the first exemplary embodiment. Referring to FIG. 19, the motion analysis device 2000 may include a point embedding model 2120, a joint embedding model 2130, a root embedding model 2140, an inference model 2110, a joint inverse embedding model 2150, a root inverse embedding model 2160, and probability distribution data. The above-described models and the probability distribution data may be stored in an analysis device memory module 2100.

The motion analysis device 2000 according to the first exemplary embodiment may infer current joint data and current root data by using the first to nth past point cloud data, the current point cloud data, the past joint data, and the past root data.

The point embedding model 2120 receives input of the first to nth past point cloud data and the current point cloud data, and outputs point feature vectors.

The current point cloud data refers to point cloud data obtained from a LiDAR device 1000 at a time point at which motion data is to be inferred.

The first to nth past point cloud data refer to n pieces of point cloud data selected from among point cloud data received from the LiDAR device 1000 during a time prior to a preset time based on a time point at which the current point cloud data is obtained.

The longer the preset time, the more past movement of an object may be further considered. However, when the preset time becomes excessively long, the past movement having little correlation with current movement of the object is considered, whereby the accuracy of inferred motion data may rather be lowered. Accordingly, the preset time may be determined experimentally as a time that is for a case where the accuracy of the inferred motion data is high. The preset time may be determined as one second, but is not limited thereto.

The more a value of n that is the number of pieces of past point cloud data increases, the more the accuracy of the inferred motion data increases. However, since the number of data values to be processed increases, an inference speed may slow down. Accordingly, the value of n may be determined experimentally as a value that is for a case where high accuracy of inferred motion data is ensured while not excessively slowing down the inference speed. The value of n may be four, but is not limited thereto.

Meanwhile, a range of the value of n may be determined according to a frame rate of the LiDAR device 1000 (or a scan cycle during which point cloud data is obtained) and a preset time (i.e., a time for a movement to be considered among the past movements of the object as described above). For example, in a case where the frame rate of the LiDAR device 1000 is 20 fps and the preset time is 1 second, the value of n is determined to be greater than or equal to 1 and less than or equal to 19 (i.e., the number of frames obtained in the preset time, (=preset time*frame rate−1), or (=the number of frames corresponding to current point cloud)).

The n pieces of past point cloud data may be point cloud data corresponding to n time points having the same time interval within a preset time. For example, in a case where a preset time is 1 second and n is 4, data may be selected from among point cloud data obtained within 1 second prior to a present time point at which current point cloud data is obtained, the data including: first past point cloud data obtained at a first past time point 0.25 seconds prior to the present time point; second past point cloud data obtained at a second past time point 0.25 seconds prior to the first past time point; third past point cloud data obtained at a third past time point 0.25 seconds prior to the second past time point; and fourth past point cloud data obtained at a fourth past time point 0.25 seconds prior to the third past time point. Each of the above-described current point cloud data and the plurality of past point cloud data may be pre-processed before k input into the point embedding model 2120.

Specifically, the above-described SOR may be applied to each of the current point cloud data and the plurality of past point cloud data.

Thereafter, in order to adjust the number of points in the point cloud data to a predetermined value, position information of some points may be removed or new point position information may be generated and added. For example, the position information of the farthest point among the points may be removed by using a farthest point sampling (FPS) technique. For another example, a new point may be generated and added by selecting an arbitrary point among the points and adding an error to this arbitrary point.

A base model of the point embedding model 2120 may be a PointNet++ model. The PointNet++ model may include a plurality of abstraction layers, including multilayer perceptron (MLP) layers and max-pooling layers. The point embedding model 2120 may receive point cloud data at a plurality of time points as input and generate point feature vectors. That is, the point embedding model 2120 may receive all the input of position information of each point of the selected point cloud data and generate the point feature vectors. The point embedding model 2120 may be designed to include: input nodes for receiving input of current point cloud data and first to nth past point cloud data; and output nodes for outputting point feature vectors.

The joint embedding model 2130 receives input of first past joint data and output a first past joint feature vector.

Here, joint data refers to information about predetermined reference joints for implementing a person's shape. Specifically, the joint data may include joint position information, joint rotation information, joint velocity information, and joint angular velocity information of each of the reference joints.

The first past joint data refers to joint data corresponding to the point cloud data immediately before a time point at which current point cloud data is obtained.

Specifically, first past joint data refers to joint data included in the motion data inferred from first past point cloud data in a case where the motion analysis device 2000 obtains the first past point cloud data at a first time point, obtains current point cloud data at a second time point, and infers current motion data corresponding to the current point cloud. To this end, the motion analysis device 2000 may store the first past joint data inferred from the first past point cloud data in the analysis device memory module 2100.

Meanwhile, default joint data may be used in a case where there is no first past joint data at the time point at which the current point cloud data is obtained (e.g., in a case where the motion analysis device 2000 infers motion data for the first time). The default joint data may be joint position information, joint rotation information, velocity joint information, and joint angular velocity information, which are arbitrarily set for reference joints.

A base model of the joint embedding model 2130 may be a GCN model. The GCN model is an artificial intelligence model for processing graph data, and may include spatial convolution layers and body part pooling layers. The joint embedding model 2130 may output feature vectors by considering the relationship between information of received reference joints. The joint embedding model 2130 may be designed to include an input node for receiving past joint data and an output node for outputting a past joint feature vector.

The root embedding model 2140 receives input of first past root data and outputs a first past root feature vector.

The root data includes information about a representative point in a virtual space. Here, the representative point is a point indicating a position of an object in a sensing area, and may mean, for example, the above-described central joint (e.g., the hip joint or pelvic joint) among reference joints. The root data includes: representative position information indicating a position of a representative point in a virtual space; orientation information indicating information about a direction in which a digital shape of an object implemented with reference joints in the virtual space is heading; representative velocity information indicating a velocity of the representative point in the virtual space; representative angular velocity information indicating an angular velocity of the representative point in the virtual space; and foot-contact information indicating whether or not a part of the object (particularly a foot area) touches the ground.

The first past root data refers to root data corresponding to the point cloud data immediately before a time point at which the current point cloud data is obtained. Specifically, in a case where the motion analysis device 2000 obtains first past point cloud data at a first time point, obtains current point cloud data at a second time point, and infers current motion data corresponding to the current point cloud, the first past root data refers to root data included in motion data inferred for the first past point cloud data. To this end, the motion analysis device 2000 may store the first past root data inferred from the first past point cloud data in the analysis device memory module 2100.

Meanwhile, in a case where there is no first past root data at the time point at which the current point cloud data is obtained (e.g., in a case where the motion analysis device 2000 infers motion data for the first time), default root data may be used. The default root data may be representative position information, orientation information, representative velocity information, and representative angular velocity information, which are arbitrarily set for a representative point.

A base model of the root embedding model 2140 may be an MLP model. The MLP model includes a plurality of feed-forward layers and activation functions (e.g., a Rectified Linear Unit, a Sigmoid function, or a Tanh function), and may output a feature vector reflecting features of input data. The root embedding model 2130 may be designed to include an input node for receiving first past root data and an output node for outputting a first past root feature vector.

The inference model 2110 may receive input of point feature vectors, past joint feature vectors, past root feature vectors, and latent vector, and output an inference feature vector.

The latent vector input to the inference model 2110 may be randomly sampled from probability distribution data.

Specifically, the probability distribution data is stored in advance in the analysis device memory module 2100 of the motion analysis device 2000, and when the motion inferring method is performed, the motion analysis device 2000 may obtain the latent vector from the probability distribution data.

The inference model 2110 may be transformer-based artificial intelligence model. Specifically, the inference model 2110 has a structure in which a Mixture of Expert (MoE) model is applied to a decoder of the transformer, and may include a plurality of expert layers and a single gating network.

The inference model 2110 may generate an inference feature vector by applying the features of the point feature vectors, past joint feature vectors, and past root feature vectors input through the plurality of layers and further considering the input latent vector. The inference model 2110 may be designed to include: input nodes for receiving the inputs of the point feature vectors, the past joint feature vectors, the past root feature vectors, and the latent vector; and an output node for outputting the inference feature vector.

Hereinafter, with reference to FIG. 20, a process of obtaining probability distribution data used to extract latent vector is described in detail.

The probability distribution data may be generated by using a motion distribution encoder before a motion inferring method is performed. More specifically, point cloud data and motion data may be obtained by capturing the movement of an object, and a training data set may be generated by using the obtained data. When the motion distribution encoder is trained with the generated training data set, the weights in the motion distribution encoder are adjusted, and after the training is completed, an arbitrary value may be input into the motion distribution encoder to obtain the probability distribution data.

Figure 20:
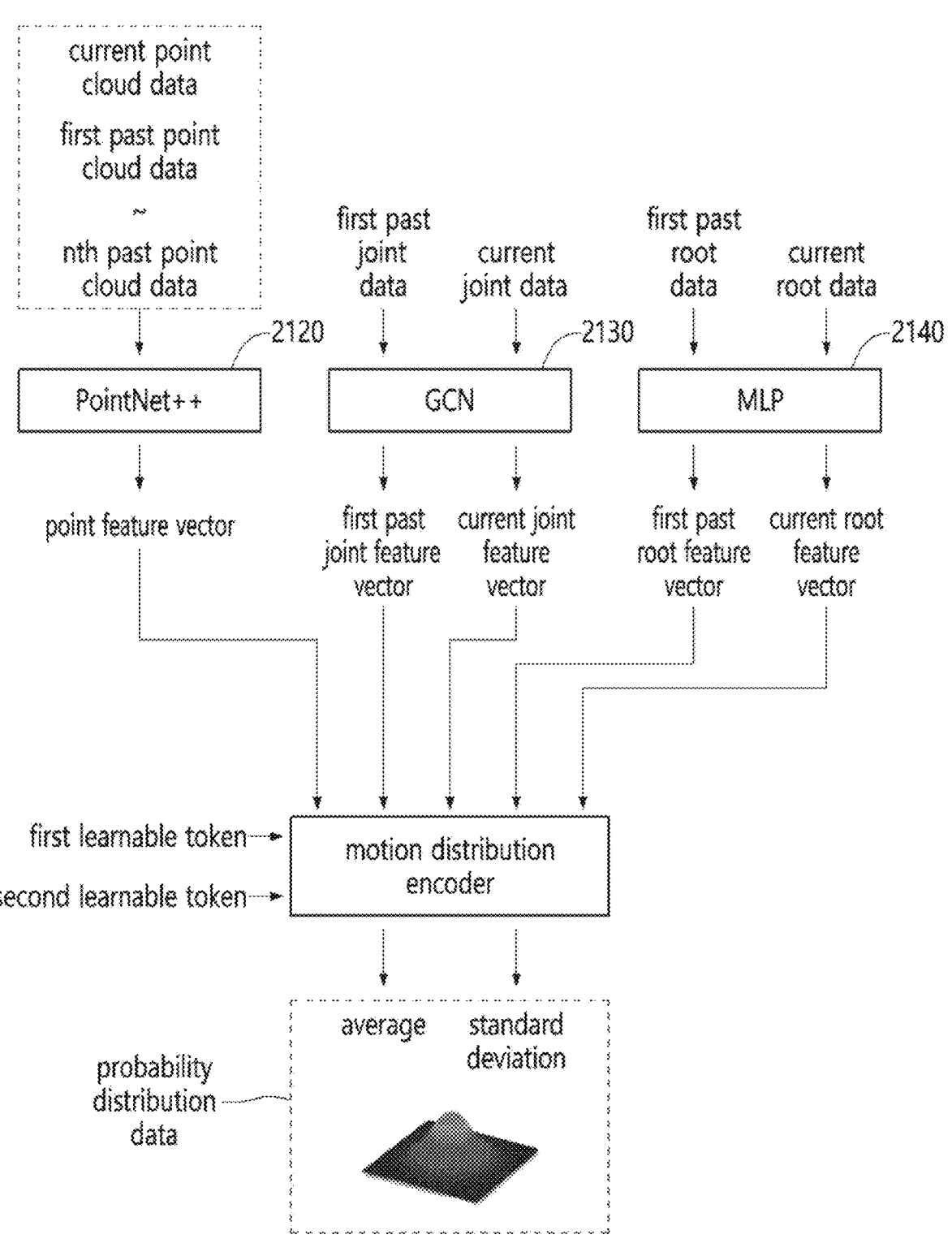
FIG. 20 is a view illustrating a process of obtaining probability distribution data according to the exemplary embodiment.

FIG. 20 is a view illustrating a process of obtaining probability distribution data according to the exemplary embodiment. Referring to FIG. 20, a motion distribution encoder may be trained to receive input of point feature vectors, a first past joint feature vector, a current joint feature vector, a first past root feature vector, and a current root feature vector and output the probability distribution data.

A motion distribution encoder may be trained outside the motion analysis device 2000, and accordingly, probability distribution data may also be generated outside the motion analysis device 2000 and stored in the motion analysis device 2000. For example, as described above, the motion capture system 100 includes a training server, and in the training server, the motion distribution encoder may be trained by a training data set. Meanwhile, the motion distribution encoder may be stored in the motion analysis device 2000, and the motion analysis device 2000 may also train the motion distribution encoder.

Hereinafter, the motion distribution encoder is described as being trained by the training server, but the technical idea of the present disclosure is not limited thereto.

The training server may obtain current point cloud data, first to nth past point cloud data, past motion data, and current motion data, which are related to the arbitrary movement of an object.

Here, point cloud data may be obtained by using a LiDAR device 1000. In addition, motion data may be obtained by using an inertial sensor (or an optical sensor). The specific process is as follows.

First, the LiDAR device 1000 and the inertial sensor (or an optical sensor) are operated simultaneously for the arbitrary movement of an object so as to obtain the point cloud data and the motion data.

Thereafter, using a time point as a reference point, the point cloud data corresponding to the reference point is obtained as current point cloud data, and the motion data corresponding to the reference point is obtained as current motion data. The current motion data includes current joint data and current root data.

Point cloud data corresponding to a first past time point that is earlier by a scan cycle of the LiDAR device 1000 than a reference time point is obtained as first past point cloud data, and motion data corresponding to the first past time point is obtained as first past motion data. The first past motion data includes first past joint data and first past root data.

A motion distribution encoder may be trained by using a plurality of training data sets, so as to obtain probability distribution data. Here, the training data set may include: the above-described current point cloud data, the first to nth past point cloud data, the first past joint data, the first past root data, the current joint data, and the current root data. the training data sets for training the motion distribution encoder may be obtained for various movements of arbitrary objects.

Point feature vectors input to the motion distribution encoder may be obtained by inputting the current point cloud data and the first to nth past point cloud data into the point embedding model 2120. The operation of the point embedding model 2120 is as described in FIG. 19, so a description thereof is omitted.

A first past joint feature vector input to the motion distribution encoder may be obtained by inputting the first past joint data to the joint embedding model 2130. In addition, the current joint feature vector input to the motion distribution encoder may be obtained by inputting the current joint data to the joint embedding model 2130. The operation of the joint embedding model 2130 is as described in FIG. 19, so a description thereof is omitted.

A first past root feature vector input to the motion distribution encoder may be obtained by inputting the first past root data to the root embedding model 2140. In addition, the current root feature vector input to the motion distribution encoder may be obtained by inputting the current root data to the root embedding model 2140. The operation of the root embedding model 2140 is as described in FIG. 19, so a description thereof is omitted.

The motion distribution encoder may be a transformer-based artificial intelligence model. The motion distribution encoder may receive input of feature vectors and learnable tokens that have undergone an embedding process, and may train the learnable tokens to summarize the feature vectors or to apply information obtained by compressing patterns between the feature vectors. The learnable tokens trained may ultimately result in an average and standard deviation representing probability distribution data.

Referring to FIG. 20, the motion distribution encoder may receive point feature vectors, a first past joint feature vector, a current joint feature vector, a first past root feature vector, and a current root feature vector as input, and may also receive a first learnable token and a second learnable token as input, and output an average and a standard deviation. In this process, the motion distribution encoder is trained to maximally reduce a reconstruction loss and a KL-divergence loss for the output result values (i.e., the average and the standard deviation), and the plurality of training data sets described above may be used here.

Referring back to FIG. 19, the motion analysis device 2000 may obtain the current joint data and current root data through an inverse embedding process for an inference feature vector.

The joint inverse embedding model 2150 receives input of the inference feature vector, and outputs current joint data.

The current joint data is joint data at a present time point which is to be inferred, and refers to the joint data corresponding to the current point cloud data. The current joint data may include joint position information, joint rotation information, joint velocity information, and joint angular velocity information of each of the reference joints.

The joint inverse embedding model 2150 has a structure symmetrical to that of the joint embedding model 2130. That is, the joint inverse embedding model 2150 may generate current joint data by performing calculations in an inverse order of calculations performed in the joint embedding model 2130 on the inference feature vector.

The root inverse embedding model 2160 receives input of the inference feature vector, and outputs current root data.

The current root data is root data at the present time point which is to be inferred, and refers to the root data corresponding to the current point cloud data. The current root data includes: representative position information indicating a position of a representative point in a virtual space; orientation information indicating information about a direction in which a digital shape of an object implemented with reference joints in the virtual space is heading; representative velocity information indicating a velocity of the representative point in the virtual space; representative angular velocity information indicating an angular velocity of the representative point in the virtual space; and foot-contact information indicating whether or not a part of the object (particularly a foot area) touches the ground.

The root inverse embedding model 2160 has a structure symmetrical to that of the root embedding model 2140. That is, the root inverse embedding model 2160 may generate the current root data by performing calculations in an inverse order of calculations performed in the root embedding model 2140 on the inference feature vector.

3.2 Second Exemplary Embodiment

Hereinafter, a second exemplary embodiment of a motion analysis device 2000 for performing a motion inferring method is described with reference to FIGS. 21 and 22.

Figure 21:
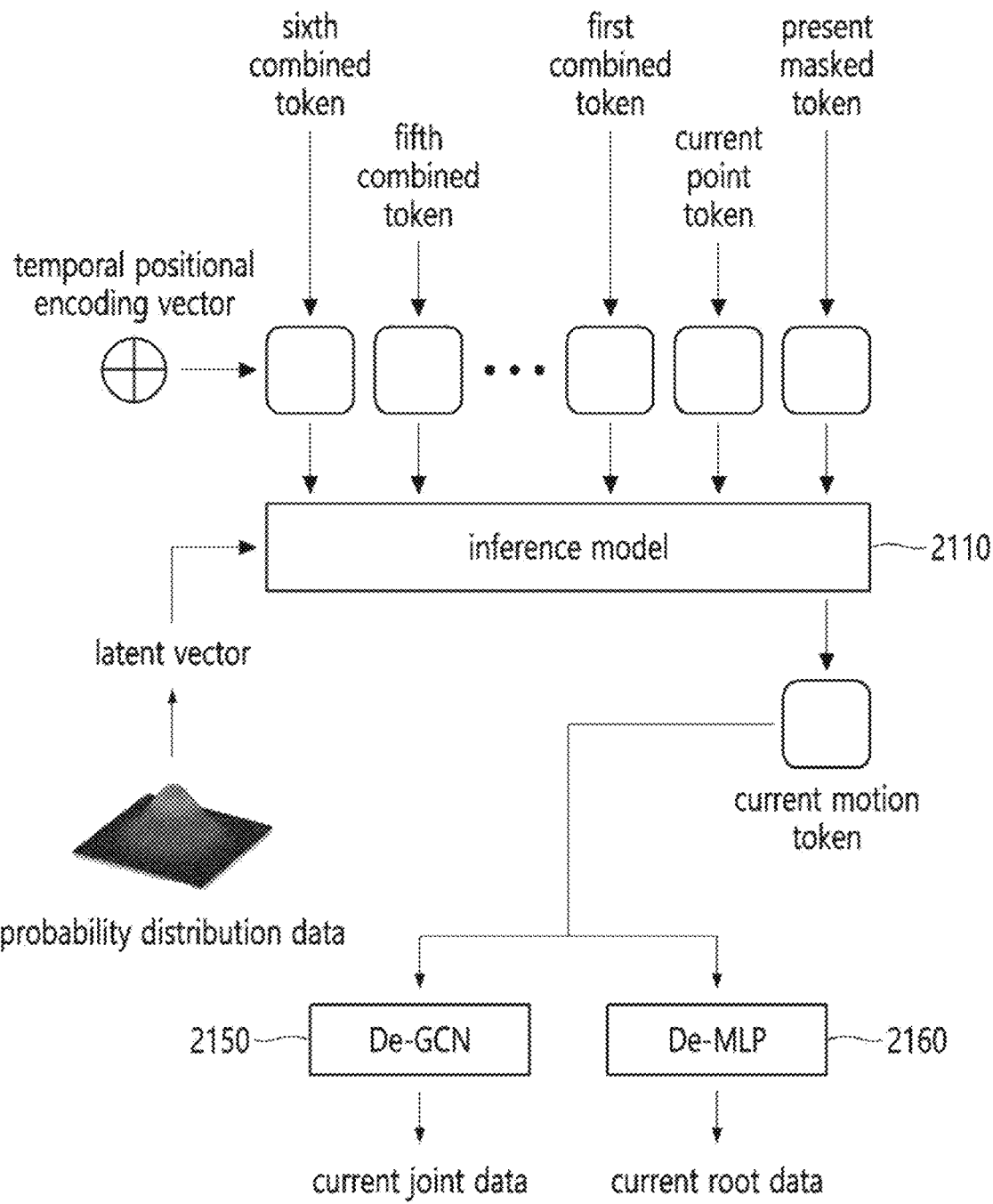
FIG. 21 is a view illustrating some components of a motion analysis device and a process by which data is processed according to a second exemplary embodiment.

FIG. 21 is a view illustrating some components of a motion analysis device 2000 and a process by which data is processed according to the second exemplary embodiment.

When motion data is inferred, the motion analysis device 2000 uses point cloud data obtained for a preset time of one second based on a first past time point, which is a time point at which the point cloud data is obtained immediately before a present time point to be inferred, and the motion data inferred by using respective point clouds. In addition, it will be described that the motion analysis device 2000 is configured to select six pieces of point cloud data obtained for one second, determine the selected data as data (i.e., first past point cloud data to sixth past point cloud data), and process the motion data already inferred based on the selected point cloud data, so as to input the processed data into an inference model 2110.

Specifically, when current motion data is inferred, the motion analysis device 2000 may use current point cloud data, first to sixth past point cloud data, $m\_1st$ to $m\_3rd$ past point cloud data (where m is a natural number from 2 to 6), first to sixth past joint data, $m\_1st$ to $m\_3rd$ past joint data, first to sixth past root data, and $m\_1st$ to $m\_3rd$ past root data. The data used by the motion analysis device 2000 is as described in FIGS. 15 and 16, so a description thereof is omitted.

Referring to FIG. 21, the motion analysis device 2000 may obtain a current motion token by inputting a first to sixth combined tokens, a current point token, a present masked token, and a latent vector into the inference model 2110.

The method of generating the first to sixth combined tokens is as described in FIGS. 16 to 18, so a description thereof is omitted.

The current point token may be generated by using the current point cloud data. Specifically, the motion analysis device 2000 may perform body-patch embedding on the current point cloud data to generate a current point feature vector and a center point positional encoding vector. The motion analysis device 2000 may generate a current point token by adding the center point positional encoding vector to the current point feature vector. In this case, the motion analysis device 2000 may use a point embedding model 2120, and a Mini-PointNet model may be used as the point embedding model 2120.

Before being input to the inference model 2110, the first to sixth combined tokens, the current point token, and the present masked token may be processed by using a temporal positional encoding vector. Specifically, values different from each other and representing a temporal order may be respectively added to the first to sixth combined tokens, the current point token, and the present masked token by the temporal positional encoding vector. Meanwhile, the current point token and the present masked token have the same temporal order, so the same value may be added thereto.

The present masked token is a vector input to the inference model 2110 to infer a current motion token. The present masked token is a vector input to recognize a position that the inference model 2110 should infer, and may be input to the inference model 2110 after a value corresponding to a position between a first combined token and a current point token is added by the temporal positional encoding vector. Alternatively, the present masked token may be input into the inference model 2110 after adding the value corresponding to a position of the current point token by the temporal positional encoding vector. Alternatively, the present masked token may be input to the inference model 2110 after adding a value corresponding to a position after the position of the current point token by the temporal positional encoding vector. The present masked token may have an arbitrary value, or a specific value including 0.

A latent vector may be sampled from pre-stored probability distribution data. Specifically, the probability distribution data is stored in advance in the analysis device memory module 2100 of the motion analysis device 2000, and when the motion inferring method is performed, the motion analysis device 2000 may obtain the latent vector from the probability distribution data. A process by which the probability distribution data is obtained is described in detail in FIG. 21.

The current motion token refers to an inferred token corresponding to a present time point. The current motion token may include a current joint feature vector and a current root feature vector.

The motion analysis device 2000 may obtain current motion data by performing inverse embedding on the current motion token.

The inference model 2110 may be a transformer-based artificial intelligence model. For example, the inference model 2110 may be a vision transformer model and may include a multi-headed self-attention layer and a feed forward network (FFN).

The motion analysis device 2000 may perform inverse embedding by using a joint inverse embedding model 2150 and a root inverse embedding model 2160. The joint inverse embedding model 2150 may have a structure that is an inversed structure of the joint embedding model 2130 used in the motion analysis device 2000 according to the second exemplary embodiment. The root inverse embedding model 2160 may have a structure that is an inversed structure of the root embedding model 2140 used in the motion analysis device 2000 according to the second exemplary embodiment.

The motion analysis device 2000 may generate current joint data by inputting the current motion token into the joint inverse embedding model 2150. Alternatively, the motion analysis device 2000 may generate the current joint data by inputting the current joint feature vector of the current motion token into the joint inverse embedding model 2150.

The motion analysis device 2000 may generate current root data by inputting the current motion token into the root inverse embedding model 2160. Alternatively, the motion analysis device 2000 may generate the current root data by inputting the current root feature vector of the current motion token into the root inverse embedding model 2160.

Figure 22:
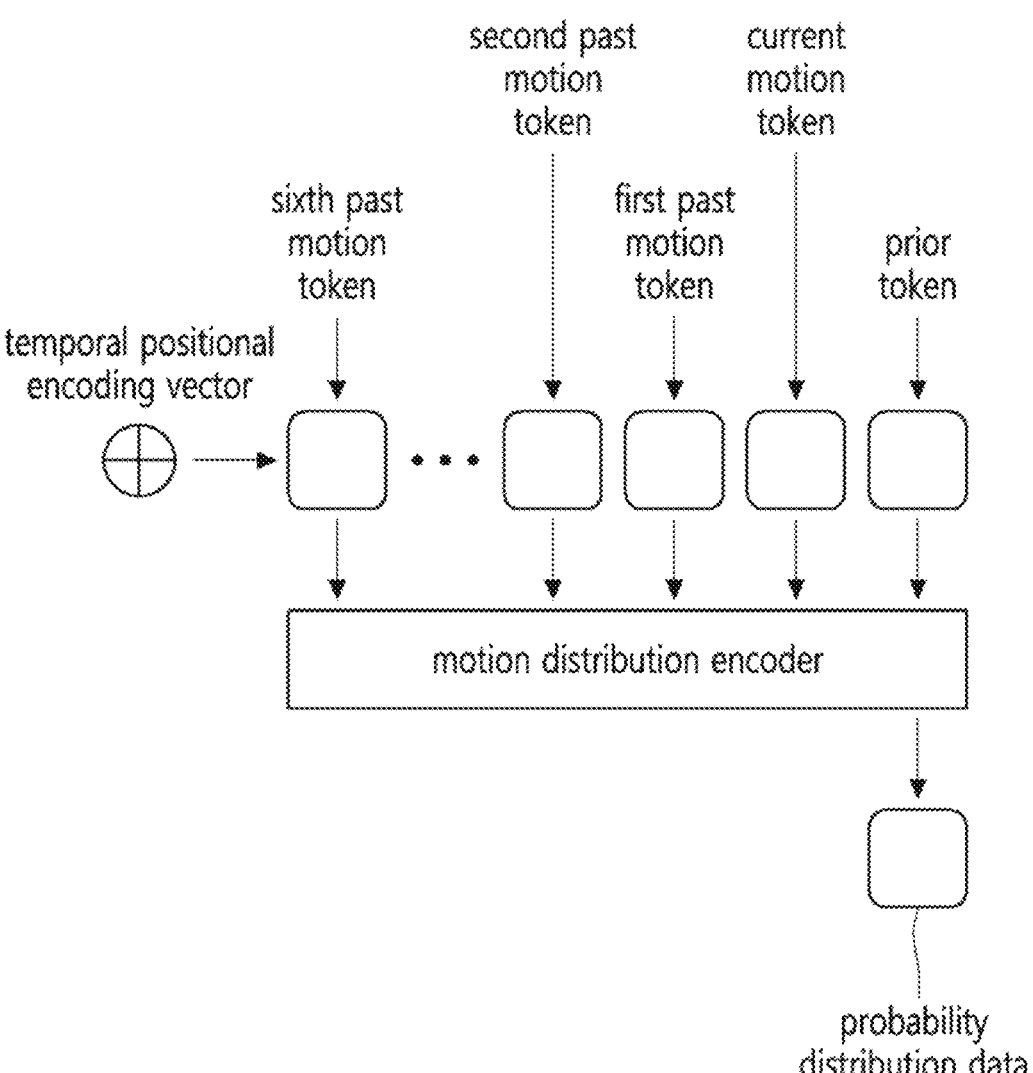
FIG. 22 is a view illustrating a process of generating probability distribution data used in an inference model according to the second exemplary embodiment.

FIG. 22 is a view illustrating a process of generating probability distribution data used in an inference model 2110 according to the second exemplary embodiment. The probability distribution data may be generated by the motion analysis device 2000 or may also be generated by another device and then provided to the motion analysis device 2000. Hereinafter, a case is described where the probability distribution data is generated by the motion analysis device 2000, but the method of generating the probability distribution data may be used in the same way in other devices as well.

Probability distribution data may be generated by using a motion distribution encoder before a motion inferring method is performed. More specifically, point cloud data and motion data may be obtained by capturing the movement of an object, and a training data set may be generated by using the obtained data. When the motion distribution encoder is trained with the generated training data set, the weights in the motion distribution encoder are adjusted, and after the training is completed, an arbitrary value may be input into the motion distribution encoder to obtain the probability distribution data.

Referring to FIG. 22, the motion distribution encoder may be trained so as to receive input of first to sixth past motion tokens, a current motion token, and a prior token, and output probability distribution data.

The motion distribution encoder may be trained by a training server, which is further included in the motion analysis device 2000 or the motion capture system 100. Hereinafter, although it is described that the motion distribution encoder is trained by the training server, the technical idea of the present disclosure is not limited thereto.

The training server may obtain current point cloud data, first to sixth past point cloud data, m_1st to m_3rd past point cloud data (where m is a natural number from 2 to 6), first to sixth past motion data, m_1st to m_3rd past motion data, and current motion data, which are related to the arbitrary movement of an object.

Here, the point cloud data may be obtained by using a LiDAR device 1000. In addition, the motion data may be obtained by using an inertial sensor (or an optical sensor). The specific process is as follows.

First, a LiDAR device 1000 and an inertial sensor (or an optical sensor) are operated simultaneously for arbitrary movement of an object and obtain point cloud data and motion data.

Thereafter, using a time point as a reference time point, the point cloud data corresponding to the reference time point is obtained as current point cloud data, and the motion data corresponding to the reference time point is obtained as current motion data.

The point cloud data corresponding to a first past time point that is earlier by a scan cycle of the LiDAR device 1000 than a reference time point is obtained as first past point cloud data, and the motion data corresponding to the first past time point is obtained as first past motion data.

From among the point cloud data obtained up to a time point one second prior to from the first past time point as the reference, the five pieces of point cloud data having uniform time intervals are obtained as second to sixth past point cloud data.

Respective motion data corresponding to the first to sixth past point cloud data are obtained as first to sixth past motion data.

The motion data among the past motion data are obtained as m_1st to m_3rd past motion data.

The motion data corresponding to the present time point is obtained as current motion data.

The training server may generate first to sixth past motion tokens by using the first to sixth past motion data, and the m_1st to m_3rd past motion data. The method of generating the past motion tokens is as described in FIG. 17, so a description thereof is omitted.

The training server may generate a current motion token by using the current motion data. Specifically, the training server may obtain a current joint feature vector by performing embedding on current joint data of the current motion data, obtain a current root feature vector by performing embedding on current root data of the current motion data, and then concatenate the current joint feature vector and the current root feature vector, thereby generating a current motion token.

A prior token is a vector input to a motion distribution encoder in order to infer probability distribution data. The prior token may have an arbitrary value, or a specific value including 0.

The training server may obtain point cloud data and motion data regarding various movements of an object, and prepare a large amount of training data sets by repeating the above-described process. The training server may train the motion distribution encoder with the large amount of prepared training data sets, input arbitrary values into the motion distribution encoder after completing the training, and then generate probability distribution data. The training server may provide the generated probability distribution data to the motion analysis device 2000.

3.3 Experimental Data

Hereinafter, the quality of motion data inferred according to input data used in a motion inferring method is described with reference to FIG. 23.

Figure 23:
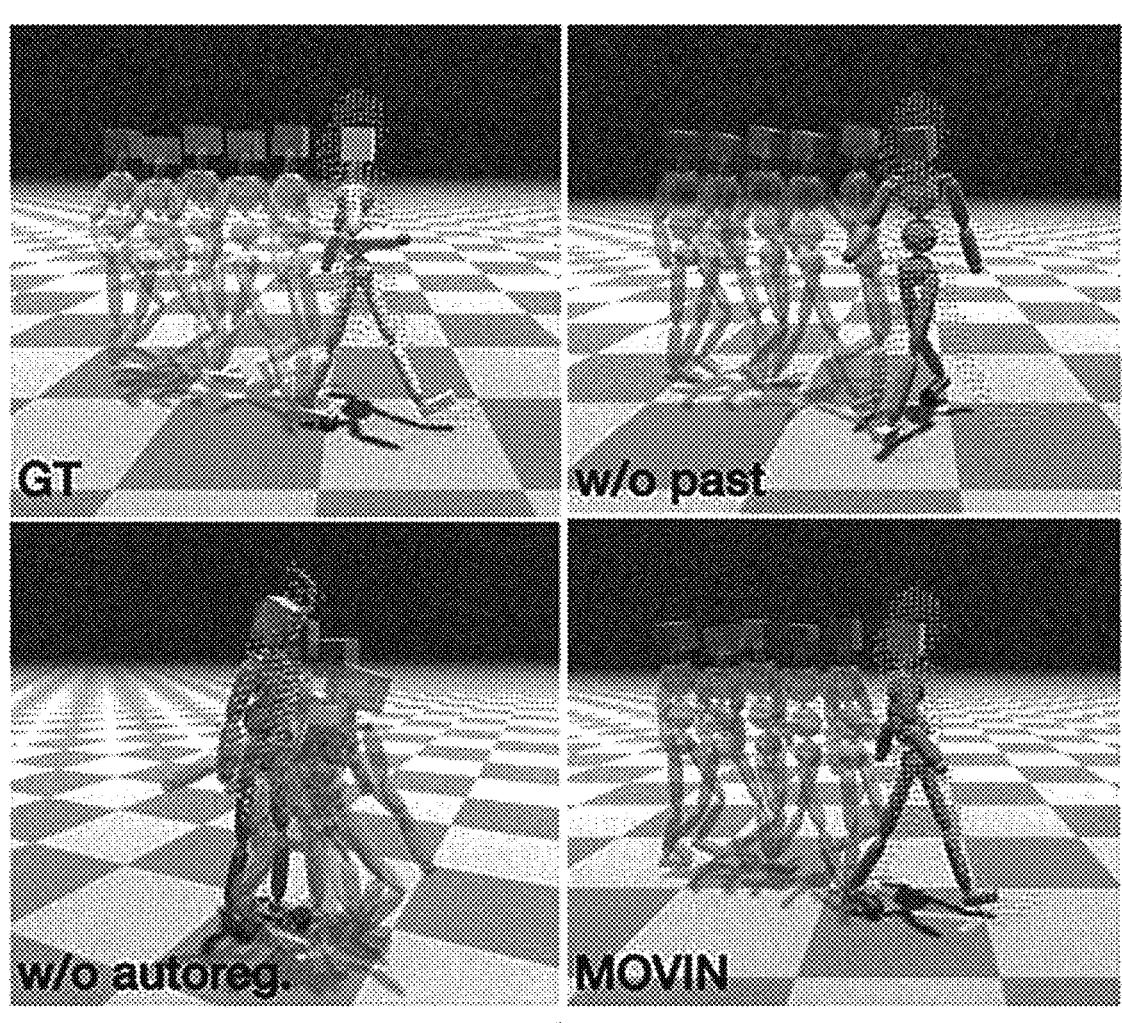
FIG. 23 is a view illustrating a table provided to compare accuracy of motion data inferred by using input data through models different from each other.

In FIG. 23 is a view indicating a table that compares accuracy of motion data inferred by using input data through models different from each other. (a) of FIG. 23 is the table that illustrates evaluating the accuracy of motion data inferred from each model, and (b) of FIG. 23 illustrates digital shapes implemented by using the motion data inferred from each model.

Referring to FIG. 23, experiments are conducted on a GT model, a w/o past pcd model, a w/o autoreg. model, and a MOVIN model, and each model is evaluated based on indices including MJPE, MJRE, MJLVE, MJAVE, MPPE, MPRE, MPLAVE, MPAVE, and Jitt.

The GT model uses an optical sensor to capture the movement of an object and obtain motion data, and provides a reference value for comparing accuracy between each model.

The w/o past pcd model is a model designed to infer current motion data at a present time point by using current point cloud data obtained at the present time point and first past motion data corresponding to a first past time point closest to the present time point.

The w/o autoreg. model is a model designed to infer current motion data at a present time point by using current point cloud data obtained at a present time point and first to fourth past point cloud data for four past time points prior to the present time point.

The MOVIN model is a model designed to infer current motion data at a present time point by using current point cloud data obtained at the present time point, first to fourth past point cloud data for four past time points prior to the present time point, and first past motion data corresponding to the first past point cloud data.

Among the evaluation indices, MPPE, MPRE, MPLAVE, and MPAVE respectively indicate an average position error, an average rotation error, an average linear velocity error, and an average angular velocity error of a person's pelvic joint. Among the evaluation indices, MJPE, MJRE, MJLVE, and MJAVE respectively indicate an average position error, an average rotation error, an average linear velocity error, and an average angular velocity error of the person's other joints. The evaluation index Jitt. indicates the degree of shaking, and the evaluation index Cont. indicates the degree of agreement with the motion data of the GT model.

Referring to FIG. 23, the w/o past pcd model, w/o autoreg. model, and MOVIN model all have a predetermined level of accuracy or higher compared to that of the GT model. Accordingly, it may be seen that it is possible to implement an inference model 2110 (e.g., a w/o autoreg. model) in the form of inferring motion data by using only past point cloud data and current point cloud data. However, in the case of the w/o autoreg. model, it may be seen that a linear velocity error and angular velocity error of a joint are relatively larger than those of other models. Accordingly, in order to obtain higher quality motion data, it is preferable to additionally utilize past motion data.

Meanwhile, in the case of the w/o past pcd model, it may be seen that the error values of most evaluation indices are relatively larger than those of other models. As described above, this supports the fact that point cloud data has a difficulty in a case where body parts overlapping each other are to be distinguished, and accordingly, past point cloud data should be used. Therefore, it is preferable to use both past point cloud data and current point cloud data when motion data is inferred.

4. Enhanced Motion Inferring Method

The motion inferring method described above is a method of inferring motion data by using point cloud data obtained from a LiDAR device 1000, and inferring the motion data only at a time point at which the point cloud data is obtained. In other words, in a case where the LiDAR device 1000 has a frame rate of 20 fps, 20 pieces of motion data are inferred per second, whereby the number of pieces of motion data that may be expressed (or visualized) per second is determined according to the frame rate of the LiDAR device 1000.

Meanwhile, the frame rate of the LiDAR device 1000 is generally 20 to 30 fps, and a LiDAR device 1000 having a high-speed frame rate of 30 fps or higher is expensive, thereby greatly reducing its price competitiveness and making it practically difficult to use in a motion capture system.

In terms of having a frame rate of 120 fps or higher for a high-speed RGB camera used in markerless motion capture, the LiDAR device 1000 has a relatively low frame rate.

In a case where a frame rate is low, capturing and visualizing a rapid movement of an object may be choppy and unsmooth, and further, the quality of motion capture may be reduced such as that inferring motion data that is different from the actual movement.

The present applicant has successfully developed a motion capture system 100 using a single LiDAR device 1000, but has recognized that the poor quality of motion capture due to the low frame rate of the LiDAR device 1000 may weaken competitiveness when commercializing the motion capture system. Accordingly, the present applicant has conducted research on a method of inferring motion data even among time points at which the LiDAR device 1000 obtains point cloud data, so as not to deteriorate the quality of motion capture even though the LiDAR device 1000 having a low frame rate is used.

4.1 Method of Using Pre and Post Motion Data

The present applicant has first developed a method of inferring intermediate motion data (i.e., intermediate joint data and intermediate root data) by using motion data inferred from point cloud data obtained by using a LiDAR device 1000. A process thereof is as follows.

First point cloud data is obtained at a first time point by using a LiDAR device 1000, and second point cloud data is obtained at a second time point that is the next time point of the first time point (or a time point that has elapsed by a scan cycle of the LiDAR device 1000). Thereafter, the above-described motion inferring method is performed to obtain first motion data corresponding to the first point cloud data and obtain second motion data corresponding to the second point cloud data. Thereafter, the first motion data and the second motion data are used to infer intermediate motion data corresponding to an arbitrary time point between the first time point and the second time point.

As a method of inferring intermediate motion data in a simple way, data interpolation may be applied. Specifically, the intermediate motion data may be generated by using a median value, an average value, or the like of the first motion data at a first time point and second motion data at a second time point. However, since it is difficult for the intermediate motion data generated by the data interpolation to go beyond a value between the first motion data and the second motion data, it is unable to capture when a movement different from a movement at the first time point or a movement at the second time point occurs between the first time point and the second time point as the object moves rapidly, whereby accuracy is significantly reduced.

Another method of inferring intermediate motion data may include an upsampling model designed to input first motion data and second motion data and output intermediate motion data.

The method of inferring the intermediate motion data may include the embedding process and inverse embedding process described above. Specifically, an embedding process may be performed on first motion data to obtain a first joint feature vector and a first root feature vector, and an embedding process may be performed on second motion data to obtain a second joint feature vector and a second root feature vector. The upsampling model may receive input of the first joint feature vector, the first root feature vector, the second joint feature vector, and the second root feature vector and output an inference feature vector, and the above-described inverse embedding process may be performed on the inference feature vector, so as to obtain intermediate joint data and intermediate root data.

The upsampling model may be, for example, a model trained by using a transformer-based artificial intelligence model.

The upsampling model may also infer a plurality of intermediate motion data. Specifically, the upsampling model may be designed to receive input of first motion data corresponding to a first time point and second motion data corresponding to a second time point, and infer first intermediate motion data, which is for a first intermediate time point between the first time point and the second time point, to nth intermediate motion data for an nth intermediate time point (where n is a natural number). In a case where there is a plurality of intermediate motion data to be inferred, the upsampling model may be designed to output a plurality of inference feature vectors.

Meanwhile, the intermediate motion inferring method described above requires pre and post motion data. That is, when a motion analysis device 2000 receives current point cloud data for a present time point from a LiDAR device 1000, an inference model 2110 infers current motion data for the present time point, and then the upsampling model infers intermediate motion data by using the current motion data and previously stored past motion data.

In this case, motion data is obtained at a shorter cycle than the scan cycle of the LiDAR device 1000, whereby a sufficient amount of motion data that may be visualized per second may be secured, and even relatively fast movement may be visualized naturally. However, an additional processing time is required due to the inferring of the intermediate motion data in the upsampling model, and as a result, a time required to visualize the object's movement also increases. That is, there occurs a problem that real-time performance of motion capture is hindered.

In addition, the form of inferring intermediate motion data by using the first motion data inferred for the first time point and the second motion data inferred for the second time point becomes a form of performing the inference again by using the already inferred data, so the accuracy of the intermediate motion data depends on the accuracy of the first motion data or second motion data. Specifically, when the inferred first motion data or the inferred second motion data has an error compared to an actual movement, the intermediate motion data may result in an even larger error.

4.2 Method of Using Pre and Post Motion Data and Pre and Post Point Cloud Data In order to solve the above-described problem, the present applicant has developed a method of inferring intermediate motion data (i.e., intermediate joint data and intermediate root data) by using motion data and point cloud data, which are inferred.

Specifically, a motion analysis device 2000 may infer intermediate motion data corresponding to an arbitrary time point between a first time point and a second time point by using first point cloud data obtained at the first time point by using a LiDAR device 1000, second point cloud data obtained at the second time point which is the next time point (or a time point having elapsed by a scan cycle of the LiDAR device 1000), first motion data inferred for the first time point, and second motion data inferred for the second time point.

The motion analysis device 2000 may include an upsampling model designed to receive input of the first point cloud data, the second point cloud data, the first motion data, and the second motion data and output the intermediate motion data.

In this case, the above-described embedding process and inverse embedding process may be additionally performed. For example, by using the point embedding model 2120, the motion analysis device 2000 may extract a first point feature vector for the first point cloud data and a second point feature vector for the second point cloud data. In addition, by using the joint embedding model 2130, the motion analysis device 2000 may extract a first joint feature vector for first joint data of the first motion data and a second joint feature vector for second joint data of the second motion data. In addition, by using the root embedding model 2140, the motion analysis device 2000 may extract a first root feature vector for first root data of the first motion data and a second root feature vector for second root data of the second motion data. The motion analysis device 2000 may infer an inference feature vector by inputting, into the upsampling model, the first point feature vector, the second point feature vector, the first joint feature vector, the second joint feature vector, the first root feature vector, and the second root feature vector. Finally, the motion analysis device 2000 may generate intermediate joint data from the inferred feature vector by using the joint inverse embedding model 2150, and may generate intermediate root data from the inferred feature vector by using the root inverse embedding model 2160, thereby obtaining the intermediate motion data.

The upsampling model may be, for example, a model trained by using a transformer-based artificial intelligence model.

The upsampling model may also infer a plurality of intermediate motion data. Specifically, the upsampling model may be designed to receive input of the first point cloud data and first motion data corresponding to the first time point and the second point cloud data and second motion data corresponding to the second time point, and infer first intermediate motion data, which is for a first intermediate time point between the first time point and the second time point, to nth intermediate motion data for an nth intermediate time point (where n is a natural number). In a case where there is a plurality of intermediate motion data to be inferred, the upsampling model may be designed to output a plurality of inference feature vectors.

In terms of inferring intermediate motion data by using point cloud data about an actual movement of an object as input data, the method of inferring the intermediate motion data by using the inferred motion data and point cloud data may have higher accuracy than that of the method of inferring the intermediate motion data by using only the inferred motion data.

However, pre and post motion data are still required so that intermediate motion data is inferred. In other words, when the motion analysis device 2000 receives current point cloud data for the present time point from the LiDAR device 1000, the inference model 2110 infers current motion data for the present time point, and then the upsampling model receives input of the current point cloud data, the past motion data, and the past point cloud data, in addition to the inferred current motion data, so as to infer the intermediate motion data. Accordingly, there still exists a problem that the real-time performance of motion capture is hindered because an additional processing time is required due to the inferring of the intermediate motion data in the upsampling model described above.

The present applicant has conducted research on a method of solving not only the task that a separate upsampling model should not be used other than an inference model 2110 but also the task that highly accurate intermediate motion data should be inferred, and thus has developed an enhanced motion inferring method to which an upsampling technique is applied as to be described below.

4.3 Enhanced Motion Inferring Method

Hereinafter, an enhanced motion inferring method to which the upsampling technique is applied is described with reference to FIGS. 24 to 26.

FIG. 24 is a view illustrating input/output data of inference models 2110 in the enhanced motion inferring method according to the exemplary embodiment.

Referring to (a) of FIG. 24, an inference model 2110 may infer intermediate motion data and second motion data by using first point cloud data, second point cloud data, and first motion data.

The first point cloud data refers to point cloud data obtained from a LiDAR device 1000 at a first time point.

The second point cloud data refers to point cloud data obtained from the LiDAR device 1000 at a second time point after the first time point.

The second time point refers to a time point at which motion data is to be inferred. The second time point may be a time point having elapsed by a scan cycle of the LiDAR device 1000 from the first time point. Alternatively, the second time point may be a time point having elapsed a multiple of the scan cycle of the LiDAR device 1000 from the first time point.

The first motion data refers to motion data corresponding to the first time point, and may be motion data inferred by the inference model 2110 using at least the first point cloud data.

The first motion data may include first joint data and first root data. The joint data may include at least some of joint position information, joint rotation information, joint velocity information, and joint angular velocity information of each of reference joints. The first root data may include at least one of representative position information indicating a position of a representative point in a virtual space, orientation information indicating information about a direction in which the representative point is heading in the virtual space, representative velocity information indicating a velocity of the representative point in the virtual space, and representative angular velocity information indicating an angular velocity of the representative point in the virtual space.

The first motion data may be inferred before the second time point and stored in an analysis device memory module 2100. The second motion data refers to motion data corresponding to the second time point and refers to motion data that the inference model 2110 aims to infer.

The second motion data may include second joint data and second root data. The second joint data may include at least some of joint position information, joint rotation information, joint velocity information, and joint angular velocity information of each of the reference joints. The second root data may include at least one of representative position information indicating a position of a representative point in the virtual space, orientation information indicating information about a direction in which the representative point is heading in the virtual space, representative velocity information indicating a velocity of the representative point in the virtual space, and representative angular velocity information indicating an velocity angular of the representative point in the virtual space.

The type of information included in the second motion data may be the same as the type of information included in the first motion data. However, the technical idea of the present disclosure is not limited thereto, and the type of information included in the second motion data may be more or less than the type of information included in the first motion data. For example, even when the first motion data does not include orientation information, the second motion data is able to include orientation information.

Intermediate motion data refers to motion data corresponding to an arbitrary time point between a first time point and a second time point. For example, the intermediate motion data refers to the motion data corresponding to an intermediate time point between the first time point and the second time point.

The intermediate motion data may include intermediate joint data and intermediate root data. The type of information included in the intermediate motion data may be the same as the type of information included in the second motion data. However, the technical idea of the present disclosure is not limited thereto, and the type of information included in the intermediate motion data may be more or less than the type of information included in the second motion data.

The inference model 2110 may also infer a plurality of intermediate motion data. Specifically, the inference model 2110 may be designed to infer first intermediate motion data, which is for a first intermediate time point between the first time point and the second time point, to nth intermediate motion data for an nth intermediate time point (where n is a natural number).

The inference model 2110 may be a transformer-based artificial intelligence model. Specifically, the inference model 2110 may be a transformer-based autoregressive model, which outputs data having a sequence for input data. In terms of the fact that the intermediate motion data and second motion data to be output by the inference model 2110 have a time-series order after the first motion data input to the inference model 2110, it is preferable that the inference model 2110 have a structure of an autoregressive model.

As the intermediate motion data is inferred together with the second motion data, a delay time between a time point at which point cloud data is obtained for an object and a time point at which the movement of the object corresponding to the relevant time point is visualized may be shortened compared to that of a case where the intermediate motion data is inferred after the second motion data is inferred. That is, the real-time performance of the motion inferring method may be improved. Meanwhile, the inference model 2110 may not use first motion data as input data. Specifically, referring to (b) of FIG. 24, the inference model 2110 may infer intermediate motion data and second motion data by using first point cloud data and second point cloud data.

In a case where the inference model 2110 does not use the first motion data as input data, the accuracy of the inferred intermediate motion data and second motion data may be lower than that of a case where the first motion data is used as the input data, but computation speed may be improved as the amount of data processed is reduced.

Meanwhile, the intermediate motion data and the second motion data may also be inferred by using separate models different from each other.

Figure 25:
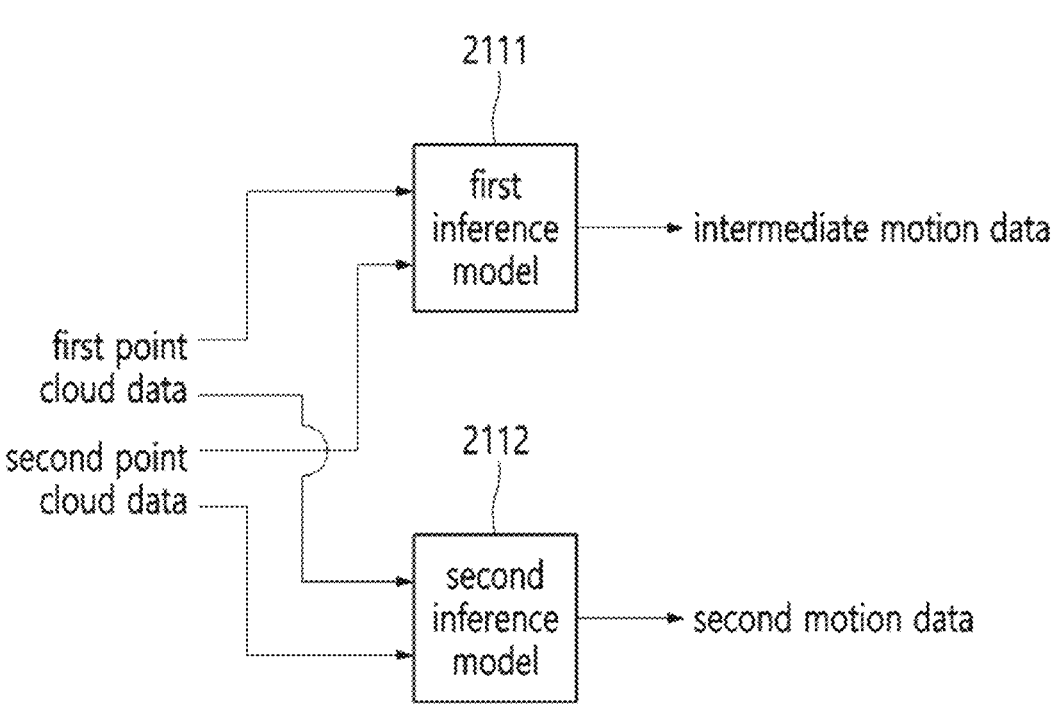
FIG. 25 is a view illustrating input/output data of each inference model when a plurality of inference models is used in the enhanced motion inferring method according to the exemplary embodiment.

FIG. 25 is a view illustrating input/output data of each inference model when a plurality of inference models is used in the enhanced motion inferring method according to the exemplary embodiment.

Referring to FIG. 25, the motion analysis device 2000 includes a first inference model 2111 and a second inference model 2112, wherein the first inference model 2111 may be designed to infer intermediate motion data by using first point cloud data and second point cloud data, and the second inference model 2112 may be designed to infer second motion data by using the first point cloud data and the second point cloud data.

In a case where a plurality of inference models is used, the accuracy of intermediate motion data to be inferred may be increased compared to that of a case where a single inference model is used, but the amount of data processing increases due to the use of at least two models, and a time point at which the intermediate motion data is obtained becomes non-uniform in a case when output time points between the at least two models do not match (are not synchronized or are misaligned), and thus a problem such as unnaturalness of a digital shape reflecting the motion data based thereon may occur.

Meanwhile, data used by the inference model 2110 in performing the enhanced motion inferring method may be determined in various ways. For example, in addition to first point cloud data, the inference model 2110 may further utilize point cloud data obtained before a time point at which the first point cloud data is obtained. For another example, in addition to the first motion data, the inference model 2110 may further utilize motion data obtained before the time point at which the first point cloud data is obtained.

The inference model 2110 may further utilize the above-described latent vector. That is, the motion analysis device 2000 may store probability distribution data in the analysis device memory module 2100 before performing the enhanced motion inferring method, and the inference model 2110 may receive the latent vector generated from the probability distribution data together with input data.

Probability distribution data may be generated by using the motion analysis device 2000 or a separate server. For example, the motion capture system 100 includes a separate training server. The training server includes a motion distribution encoder, and may obtain the probability distribution data by using the trained motion distribution encoder after training the motion distribution encoder with a training data set. In this case, data included in the training data set for training the motion distribution encoder may be determined according to the input data used in the inference model 2110.

Meanwhile, in the enhanced motion inferring method as well, the embedding process and inverse embedding process described above may be additionally performed.

Figure 26:
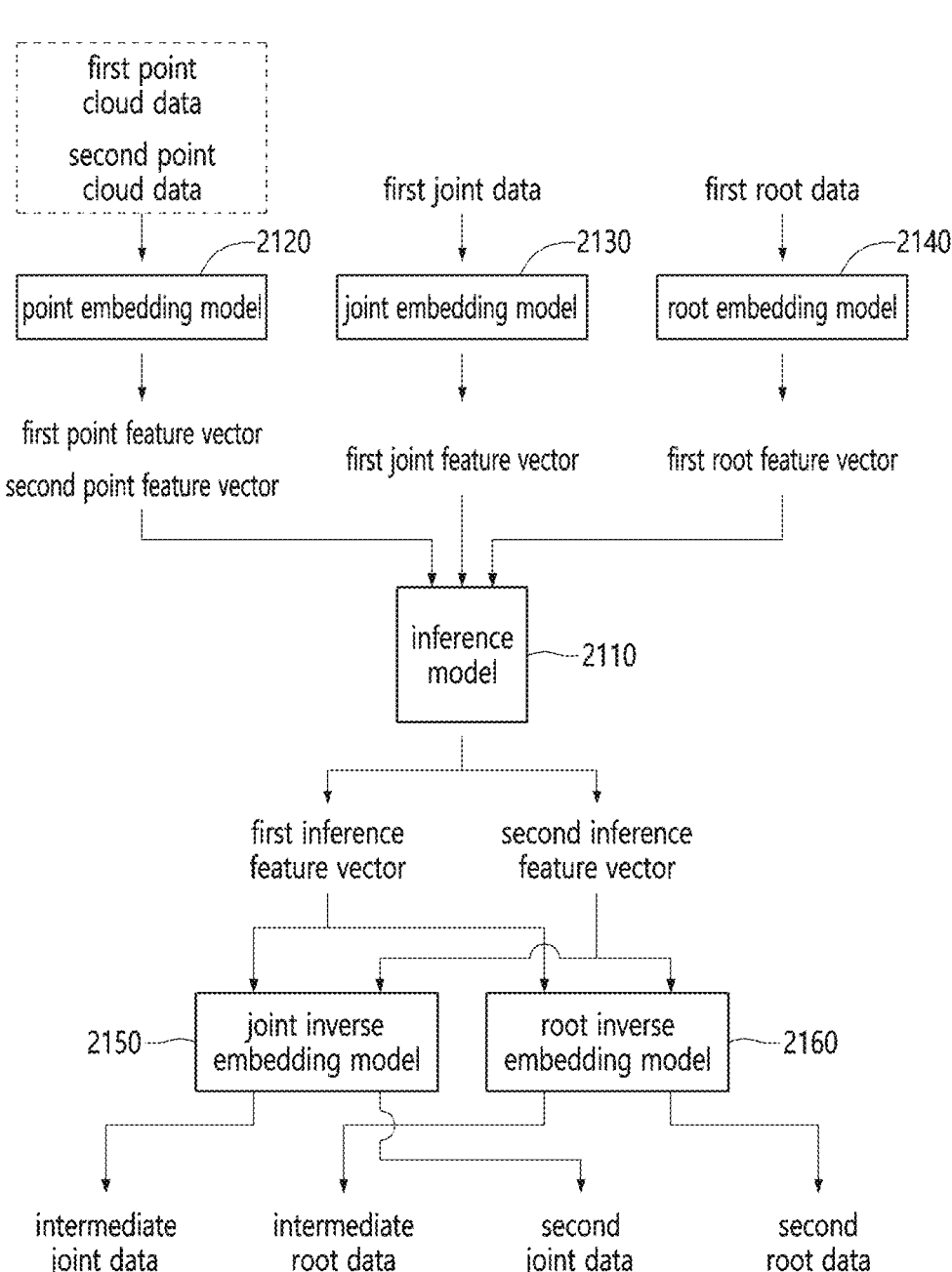
FIG. 26 is a view illustrating how intermediate motion data is obtained through an embedding process, an inference process, and an inverse embedding process according to the exemplary embodiment.

FIG. 26 is a view illustrating how intermediate motion data is obtained through an embedding process, an inference process, and an inverse embedding process according to the exemplary embodiment.

A motion analysis device 2000 includes a point embedding model 2120 and may perform point embedding or body-patch embedding on point cloud data by using the point embedding model. For example, the point embedding model 2120 may receive input of first point cloud data to extract a first point feature vector, and receive input of second point cloud data to extract a second point feature vector. The point embedding method is as described in FIG.

14, and the body-patch embedding method is as described in FIG. 15, so descriptions thereof are omitted.

The motion analysis device 2000 includes a joint embedding model 2130 and may perform joint embedding on joint data included in motion data by using this model. For example, the joint embedding model 2130 may receive input of first joint data included in first motion data to extract a first joint feature vector. The joint embedding method is as described in FIG. 14, a description thereof is omitted.

The motion analysis device 2000 includes a root embedding model 2140 and may perform root embedding on root data included in motion data by using this model. For example, the root embedding model 2140) may receive input of first root data included in the first motion data to extract a first root feature vector. The root embedding method is as described in FIG. 14, so a description thereof is omitted.

At least one of the point embedding model 2120, the joint embedding model 2130, and the root embedding model 2140 may be omitted, and when one embedding model is omitted, corresponding data thereof may be input into the inference model 2110 without the embedding process.

The inference model 2110 may be designed to receive input of a first point feature vector, a second point feature vector, a first joint feature vector, and a first root feature vector and output a first inference feature vector corresponding to intermediate motion data as well as a second inference feature vector corresponding to second motion data. Alternatively, the inference model 2110 may be designed to receive input of the first point feature vector and the second point feature vector and output the first inference feature vector corresponding to the intermediate motion data as well as the second inference feature vector corresponding to the second motion data.

Meanwhile, the inference model 2110 may be designed to receive input of feature vectors generated according to the embedding process and output motion data rather than inference feature vectors. For example, the inference model 2110 may be designed to receive input of a first point feature vector, a second point feature vector, a first joint feature vector, and a first root feature vector and output intermediate motion data and second motion data. For another example, the inference model 2110 may be designed to receive input of a first point feature vector and a second point feature vector and output intermediate motion data and second motion data.

In the case where the inference model 2110 is designed to output a feature vector, inverse embedding may be performed on the output feature vector.

The motion analysis device 2000 includes a joint inverse embedding model 2150, and may perform joint inverse embedding on an inference feature vector by using this model. For example, the joint inverse embedding model 2150 may receive input of a first inference feature vector to generate intermediate joint data, and receive input of a second inference feature vector to generate second joint data. The joint embedding method is as described in FIG. 14, so a description thereof is omitted.

The motion analysis device 2000 includes a root inverse embedding model 2160, and may perform root inverse embedding on an inference feature vector by using this model. For example, the root inverse embedding model 2160 may receive input of a first inference feature vector to generate intermediate root data, and receive input of a second inference feature vector to generate second root data. The root embedding method is as described in FIG. 14, so a description thereof is omitted.

In a case where a plurality of inference models is used, the first inference model 2111 may be designed to receive input of a first point feature vector obtained by performing embedding on first point cloud data as well as a second point feature vector obtained by performing embedding on second point cloud data, and output a first inference feature vector corresponding to intermediate motion data. The second inference model 2112 may be designed to receive input of a first point feature vector obtained by performing embedding on first point cloud data as well as a second point feature vector obtained by performing embedding on second point cloud data, and output a second inference feature vector corresponding to second motion data. Thereafter, intermediate motion data may be generated by performing inverse embedding on the first inference feature vector, and second motion data may be generated by performing inverse embedding on the second inference feature vector.

Meanwhile, the tokenization method described above may also be performed in the enhanced motion inferring method. Specifically, in a case where an inference model 2110 infers intermediate motion data by using point cloud data and motion data for a plurality of time points, input data may be corrected so as to allow the inference model 2110 to take into account the correlation of pieces of data for the same time point and the order between the time points.

For example, the inference model 2110 may infer the intermediate motion data and second motion data by using the first to nth past point cloud data, the first to nth past joint data, the first to nth root data, and the second point cloud data.

Here, the first to nth past point cloud data are n pieces of point cloud data selected from among the point cloud data obtained before a time point at which the second point cloud data is obtained. In this case, the first past point cloud data refers to the first point cloud data, which is point cloud data obtained at a time point that is one scan cycle previous from a time point at which the second point cloud data is obtained.

The preset time may be, for example, 2 seconds or less, 1.5 seconds or less, 1 second or less, 0.95 seconds or less, 0.9 seconds or less, 0.85 seconds or less, 0.8 seconds or less, 0.75 seconds or less, 0.7 seconds or less, 0.65 seconds or less, 0.6 seconds or less, 0.55 seconds or less, 0.5 seconds or less, 0.45 seconds or less, 0.4 seconds or less, 0.35 seconds or less, 0.3 seconds or less, 0.25 seconds or less, 0.2 seconds or less, 0.15 seconds or less, 0.1 second or less, or 0.05 seconds or less.

The first to nth past joint data refer to joint data corresponding to the first to nth past point cloud data, respectively. In addition, the first to nth past root data refer to root data corresponding to the first to nth past point cloud data, respectively.

The data corresponding to respective time points may be combined into one combined token and input into the inference model 2110. Specifically, as described in FIG. 16, a first combined token may be generated by using the first past point cloud data, the first past joint data, and the first past root data. Similarly, an nth combined token may be generated by using the nth past point cloud data, the nth past joint data, and the nth past root data.

The inference model 2110 may receive input of the first to nth combined tokens and the second point token, and output intermediate motion data and second motion data. Here, the second point token may be identical to the second point cloud data. Alternatively, the second point token may be data obtained by processing the second point cloud data.

The first to nth combined tokens and the second point token may be processed by using a temporal positional encoding vector and then input into the inference model 2110.

Specifically, values different from each other and representing a temporal order may be respectively added to the first to nth combined tokens and the second point token by the temporal positional encoding vector, and accordingly, the inference model 2110 may infer the intermediate motion data and the second motion data by further considering the temporal order.

Meanwhile, the tokenization process may be performed after the embedding process is performed. For example, the combined tokens may be generated by using a past point feature vector obtained by performing embedding on past point cloud data, a past joint feature vector obtained by performing embedding on past joint data, and a past root feature vector obtained by performing embedding on past root data. In addition, the second point token may be generated by using a second point feature vector obtained by performing embedding on the second point cloud data. The inference model 2110 may receive input of the first to nth combined tokens and the second point token, and output a first inference feature vector and a second inference feature vector. Inverse embedding may be performed on the first inference feature vector to generate intermediate motion data, and inverse embedding may be performed on the second inference feature vector to generate second motion data.

The inference model 2110 may infer intermediate motion data and second motion data by using data at all time points at which point cloud data is obtained.

The inference model 2110 may use data including: first to nth past point cloud data; m_1st to m_kth past point cloud data (where m is a natural number from 1 to n), which are obtained at time points between n pieces of past point cloud data; and motion data corresponding to each point cloud data. The same content described in FIG. 17 may be applied to data available to the inference model 2110.

The inference model 2110 may generate the first to nth combined tokens as described in FIG. 18. As described above, the inference model 2110 may receive input of the first to nth combined tokens and the second point token, and output the intermediate motion data and the second motion data. The first to nth combined tokens and the second point token may be processed by using a temporal positional encoding vector and then may be input: into the inference model 2110. The tokenization process may be performed after the embedding process is performed.

The inference model 2110 may infer intermediate motion data and second motion data by using data at all time points at which point cloud data is obtained and by using past intermediate motion data already inferred.

The inference model 2110 may use data including: first to nth past point cloud data; m_1st to m_kth past point cloud data (where m is a natural number from 1 to n), which are obtained at time points between n pieces of past point cloud data; first to nth past motion data corresponding to respective past point cloud data; m_1st to m_kth past motion data; and m_1st to m_pth past intermediate motion data corresponding to time points in between m_1st past motion data to m_kth past motion data. Here, a value of p is determined based on the amount of intermediate motion data inferred at one time in the inference model 2110.

The past motion data and past intermediate motion data may be data generated by performing the enhanced motion inferring method at time points when respective past point cloud data is obtained. For example, first past motion data and first past intermediate motion data may be inferred by using the second past point cloud data, the first past point cloud data, and the second past motion data. The past motion data and past intermediate data may be stored in the analysis device memory module 2100.

The motion analysis device 2000 may generate a past motion token by using past motion data. Specifically, the motion analysis device 2000 may generate second representative past joint data or a second representative past joint feature vector by using second past joint data, 2_1st to 2_kth past joint data, and 2_1st to 2_pth past intermediate joint data. In addition, the motion analysis device 2000 may generate second representative past root data or a second representative past root feature vector by using second past root data, 2_1st to 2_kth past root data, and 2_1st to 2_pth past intermediate root data. Thereafter, the motion analysis device 2000 may generate a second past motion token by using the second representative past joint data and the second representative past root data. Alternatively, the motion analysis device 2000 may generate the second past motion token by using the second representative past joint feature vector and the second representative past root feature vector.

The motion analysis device 2000 may generate a second past point token by using the second past point cloud data. Alternatively, the motion analysis device 2000 may generate a second past point feature vector from the second past point cloud data and generate the second past point token by using the second past point feature vector.

The motion analysis device 2000 may generate a second combined token by using the second past motion token and the second past point token. The motion analysis device 2000 may generate third to nth combined tokens in the same manner.

The motion analysis device 2000 may generate a first past motion token by using first past joint data and first past root data. Alternatively, the motion analysis device 2000 may generate the first past motion token by using a first past joint feature vector extracted from the first past joint data and a first past root feature vector extracted from the first past root data. The motion analysis device 2000 may generate a first past point token by using the first past point cloud data. Alternatively, the motion analysis device 2000 may extract a first past point feature vector from the first past point cloud data and generate the first past point token by using the first past point feature vector. The motion analysis device 2000 may generate a first combined token by using the first past motion token and the first past point token.

As described above, the inference model 2110 may receive input of the first to nth combined tokens and the second point token and output intermediate motion data and second motion data. The first to nth combined tokens and the second point token may be processed by using a temporal positional encoding vector and then may be input into the inference model 2110. When an embedding process is performed prior to a tokenization process, the inference model 2110 outputs a first inference feature vector and a second inference feature vector, and inverse embedding may be performed on each of these output vectors, whereby intermediate motion data and second motion data may be obtained.

5. Exemplary Embodiment of Enhanced Motion Inferring Method

As described above, input/output variables of an inference model 2110 may be determined in various ways according to some exemplary embodiments of an enhanced motion inferring method, and the form thereof may also be variously transformed in a case where there are an embedding process and an inverse embedding process.

Hereinafter, an exemplary embodiment of a motion analysis device 2000 configured to perform the enhanced motion inferring method described above is described with reference to FIGS. 27 to 31.

5.1 Third Exemplary Embodiment

An objective of a motion analysis device 2000 according to a third exemplary embodiment is to receive point cloud data generated by a LiDAR device 1000 that photographs an object at each scan cycle and infers motion data corresponding thereto as quickly as possible when the point cloud data is received, while inferring intermediate motion data as well corresponding to a time point between time points at which the point cloud data is received.

Here, when motion data and intermediate motion data are inferred, the motion analysis device 2000 uses point cloud data obtained for a preset time of one second based on a first past time point, which is a time point at which the point cloud data is obtained immediately before a present time point to be inferred, and the motion data inferred by using respective point clouds. In addition, the motion analysis device 2000 selects six pieces of point cloud data obtained for one second, determines the selected data as data (i.e., first past point cloud data to sixth past point cloud data), and processes the motion data already inferred based on the selected point cloud data, so as to input the processed data into the inference model 2110.

In addition, here, the motion analysis device 2000 infers two pieces of intermediate motion data, and this means that motion data three times a frequency at which point cloud data is obtained per unit time (=a frame rate of a LiDAR device 1000, where 20 fps is assumed) is inferred so that the movement of an object may be expressed more accurately and smoothly.

It is noted in advance that the above-described frame rate (i.e., 20 fps), the preset time (i.e., 1 second), the number of pieces of point cloud data selected (i.e., 6), and the number of pieces of intermediate motion data to be inferred (i.e., 2) are not always fixed values and may be changed depending on the performance of a device being used, the accuracy to be secured, the data processing speed to be secured, etc.

Figure 27:
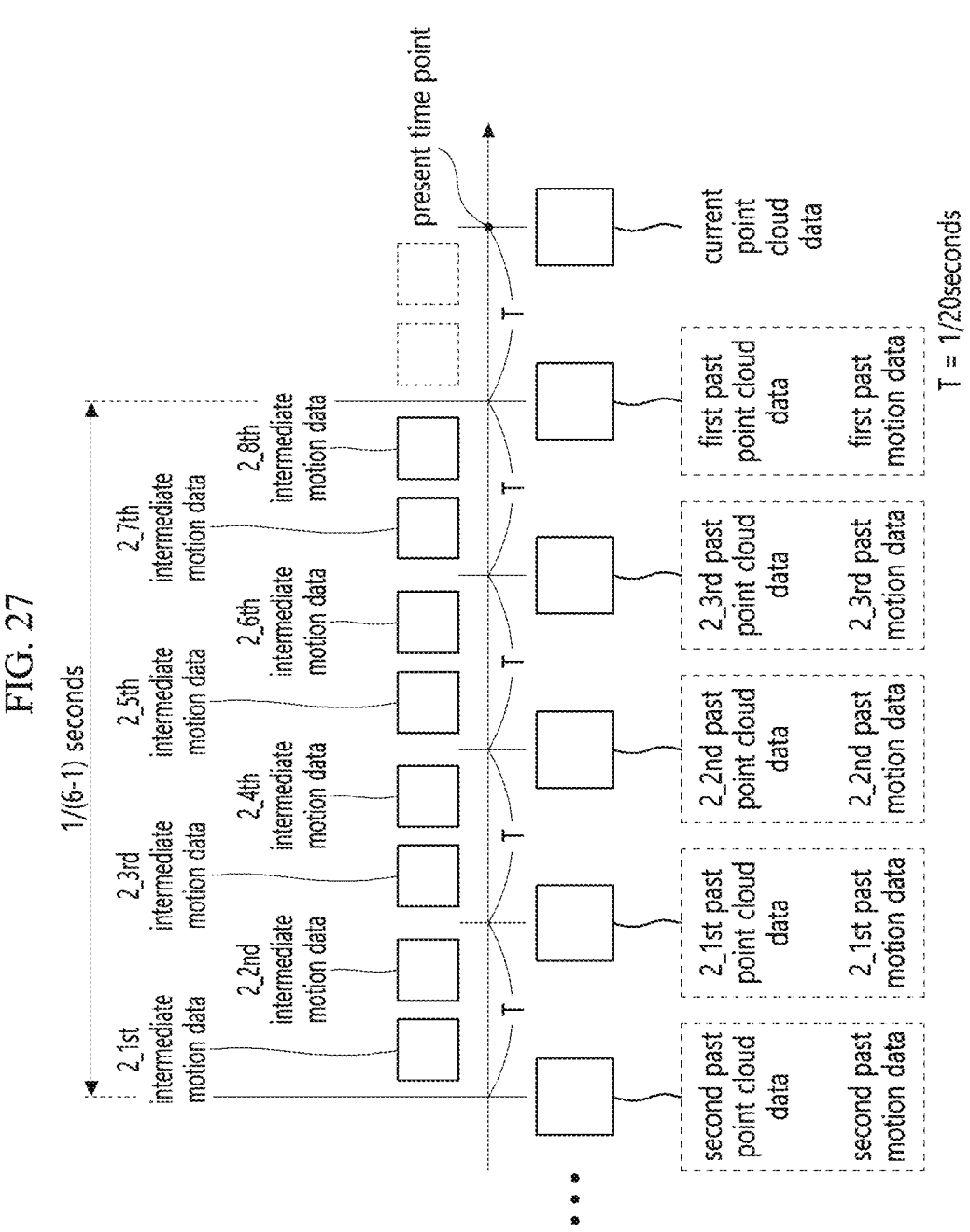
FIG. 27 is a view illustrating data usable by a motion analysis device according to a third exemplary embodiment.

FIG. 27 is a view illustrating data available by the motion analysis device 2000 according to the third exemplary embodiment.

Referring to FIG. 27, at a present time point at which current point cloud data is obtained, the motion analysis device 2000 may use data including: first past point cloud data to sixth past point cloud data; and m_1st past point cloud data to m_3rd past point cloud data, which are obtained at time points between a m_1st time point at which the m_1st past point cloud data is obtained and a mth time point when mth past point cloud data is obtained (where m is a natural number from 2 to 6), and (in FIG. 23, only second past point cloud data is shown based on the present time point).

In addition, the motion analysis device 2000 may use: the first past motion data inferred for the first past point cloud data to the sixth past motion data inferred for the sixth past point cloud data; and the m_1st past motion data inferred for the m_1st past point cloud data to the m_kth past motion data inferred for the m_kth past point cloud data.

In addition, the motion analysis device 2000 may use m_1st intermediate motion data to m_8th intermediate motion data corresponding to time points between the m_1st time point and the mth time point where point cloud data are not obtained.

The first past motion data to the sixth past motion data, the m_1st past motion data to the m_3rd past motion data, and the m_1st intermediate motion data to the m_8th intermediate motion data are data obtained by the motion analysis device 2000 that infers the same by using the method to be described below before the present time. Each motion data includes joint data and root data. The corresponding data may be stored in the analysis device memory module 2100.

Figure 28:
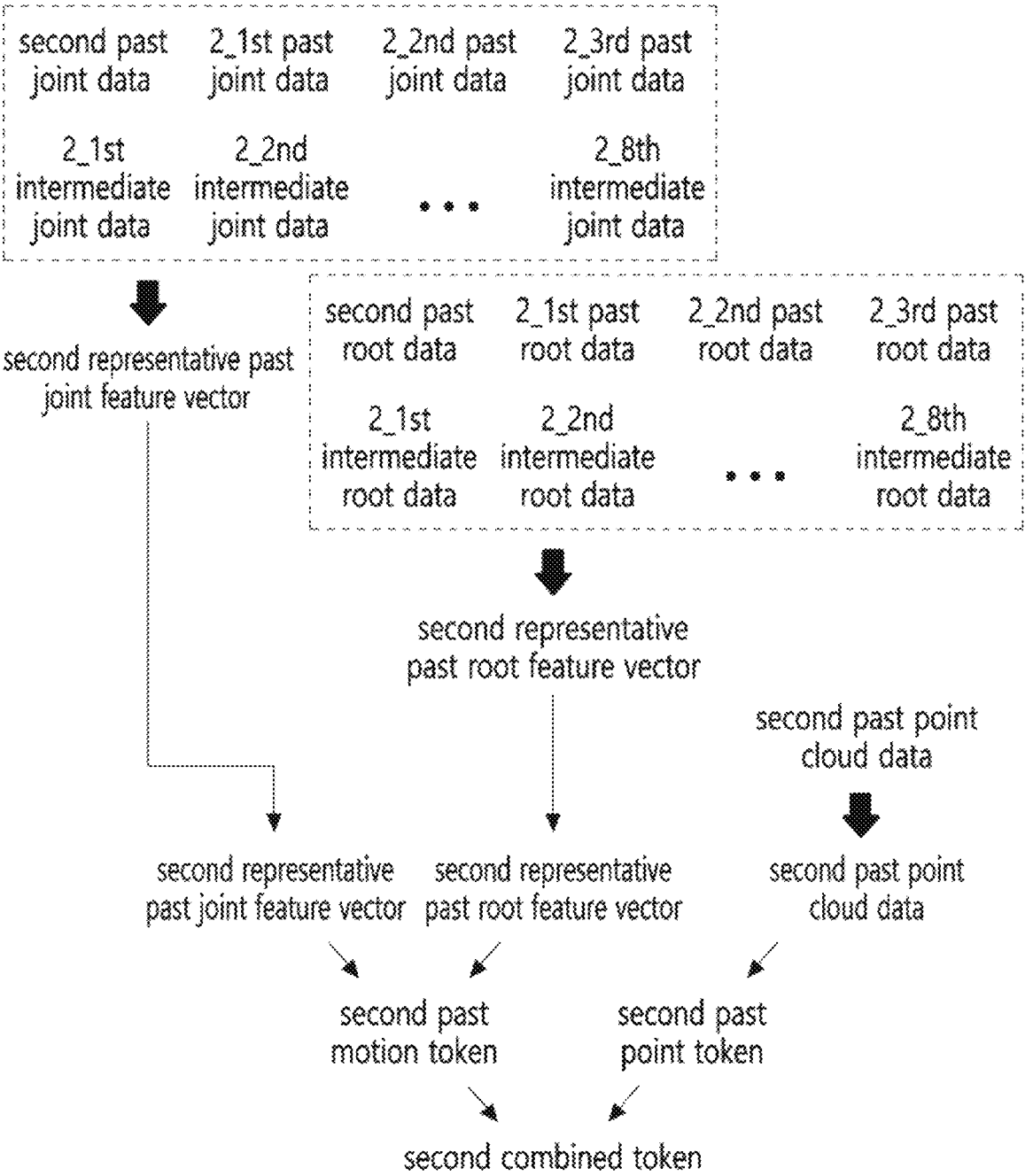
FIG. 28 is a view illustrating a process in which the motion analysis device generates a combined token according to the third exemplary embodiment.

FIG. 28 is a view illustrating a process in which a motion analysis device 2000 generates a combined token according to the third exemplary embodiment.

Referring to FIG. 28, by using a joint embedding model 2130, the motion analysis device 2000 may extract a second past joint feature vector, 2_1st to 2_3rd past joint feature vectors, and 2_1st to 2_8th intermediate joint feature vectors respectively from second past joint data, 2_1st to 2_3rd past joint data, and 2_1st to 2_8th intermediate joint data, and may generate a second representative past joint feature vector by averaging on these extracted vectors.

An ST-GCN model may be used as the joint embedding model 2130.

By using a root embedding model 2140, the motion analysis device 2000 may extract a second past root feature vector, 2_1st to 2_3rd past root feature vectors, and 2_1st to 2_8th intermediate root feature vectors respectively from second past root data, 2_1st to 2_3rd past root data, and 2_1st to 2_8th intermediate root data, and may generate a second representative past root feature vector by averaging on these extracted vectors.

A one-dimensional convolutional model may be used as the root embedding model 2140.

The motion analysis device 2000 may perform body-patch embedding on the second past point cloud data by using the point embedding model 2120, so as to generate a second past point feature vector and a center point positional encoding vector. Here, the center point positional encoding vector may mean a vector reflecting positions of local central points selected from second past point cloud data.

The motion analysis device 2000 may generate a second past motion token by using the second representative past joint feature vector and the second representative past root feature vector. The second past motion token may be generated by vector. concatenating the second representative past joint feature vector and the second representative past root feature vector. Here, the concatenating of these two vectors means synthesizing these two vectors into one vector. In a case where these two vectors are combined to form a composite vector, a dimension of the composite vector is the sum of dimensions of respective vectors.

Alternatively, the second past motion token may be generated by concatenating the second representative past joint feature vector and the second representative past root feature vector, adding the above-described spatial joint encoding vector to each.

The motion analysis device 2000 may generate a second past point token by using the second past point feature vector. The second past point token may be generated by adding the center point positional encoding vector to the second past point feature vector.

The motion analysis device 2000 may generate a second combined token by using the second past motion token and the second past point token. Specifically, the motion analysis device 2000 may generate the second combined token by concatenating the second past motion token and the second past point token.

The motion analysis device 2000 may generate third to sixth combined tokens by using the method of generating the second combined token described above.

Figure 29:
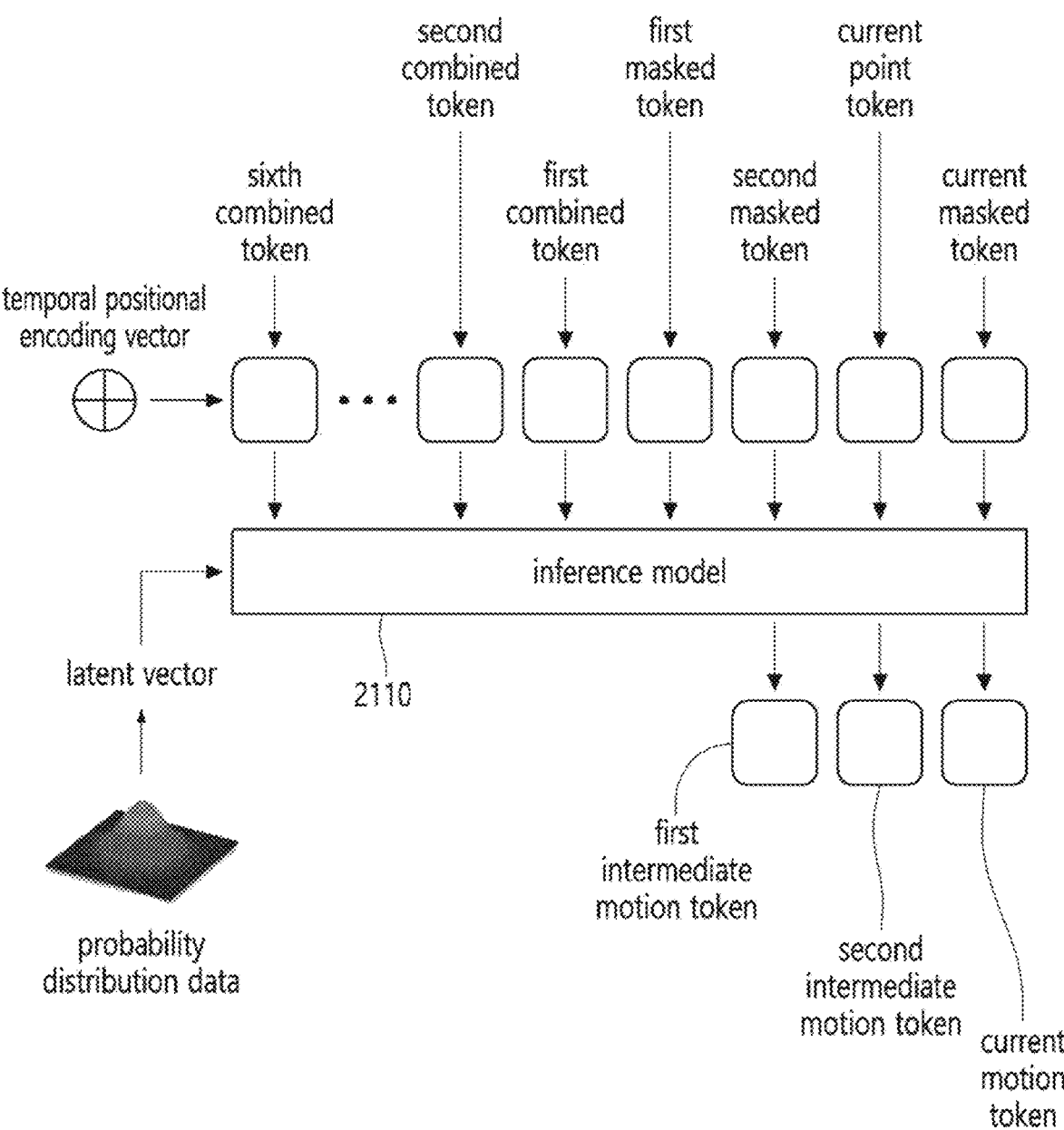
FIG. 29 is a view illustrating input/output variables of an inference model of the motion analysis device according to the third exemplary embodiment.

FIG. 29 is a view illustrating input/output variables of an inference model 2110 of a motion analysis device 2000 according to the third exemplary embodiment.

Referring to FIG. 29, the motion analysis device 2000 may obtain a first intermediate motion token, a second intermediate motion token, and a current motion token by inputting first to sixth combined tokens, a current point token, a first masked token, a second masked token, a present masked token, and a latent vector into the inference model 2110.

The current point token may be generated by using current point cloud data. Specifically, the motion analysis device 2000 may perform body-patch embedding on the current point cloud data to generate a current point feature vector and a center point positional encoding vector. The motion analysis device 2000 may generate the current point token by adding the center point positional encoding vector to the current point feature vector. In this case, the motion analysis device 2000 may use a point embedding model 2120, and a Mini-PointNet model may be used as the point embedding model 2120.

Before being input to the inference model 2110, the first to sixth combined tokens, the current point token, the first masked token, the second masked token, and the present masked token may be processed by using a temporal positional encoding vector. Specifically, values different from each other and representing a temporal order may be respectively added to the sixth to first combined tokens, the first masked token, the second masked token, the current point token, and the present masked token by the temporal positional encoding vector. Meanwhile, the current point token and the present masked token have the same temporal order, so the same value may be added to both.

The first masked token is a vector input to the inference model 2110 in order to infer a first intermediate motion token. The first masked token is the vector input to identify a position that the inference model 2110 should infer, and may be input to the inference model 2110 after a value corresponding to the position between the first combined token and the second masked token is added by the temporal positional encoding vector. The first masked token may have an arbitrary value, or a specific value including 0.

The second masked token is a vector input to the inference model 2110 in order to infer a second intermediate motion token. The second masked token is the vector input to identify a position that the inference model 2110 should infer, and may be input to the inference model 2110 after a value corresponding to the position between the first masked token and the current point token is added by the temporal positional encoding vector. The second masked token may have an arbitrary value, or a specific value including 0.

The present masked token is a vector input to the inference model 2110 in order to infer a current motion token. The present masked token is the vector input to recognize a position that the inference model 2110 should infer, and may be input to the inference model 2110 after a value corresponding to the position between the second masked token and the current point token is added by the temporal positional encoding vector. Alternatively, the present masked token may be input into the inference model 2110 after adding the value corresponding to the position of the current point token by the temporal positional encoding vector. Alternatively, the present masked token may be input to the inference model 2110 after adding a value corresponding to a position after the position of the current point token by the temporal positional encoding vector. The present masked token may have an arbitrary value, or a specific value including 0.

The latent vector may be sampled from pre-stored probability distribution data. Specifically, the probability distribution data is stored in advance in the analysis device memory module 2100 of the motion analysis device 2000, and when the enhanced motion inferring method is performed, the motion analysis device 2000 may obtain the latent vector from the probability distribution data. A process by which the probability distribution data is obtained is described in detail in FIG. 27.

The first intermediate motion token refers to an inferred token corresponding to a first intermediate time point between a present time point and a first past time point. The first intermediate motion token may include a first intermediate joint feature vector and a first intermediate root feature vector.

The second intermediate motion token refers to an inferred token corresponding to a second intermediate time point between the present time point and the first past time point. The second intermediate motion token may include a second intermediate joint feature vector and a second intermediate root feature vector.

The first intermediate time point may be earlier than the second intermediate time point. The first intermediate time point and the second intermediate time point may be time points that divide an interval between the first past time point and the present time point into three equal parts.

The current motion token refers to an inferred token corresponding to a present time point. The current motion token may include a current joint feature vector and a current root feature vector.

As to be described below, the motion analysis device 2000 may obtain first intermediate motion data, second intermediate motion data, and current motion data by performing inverse embedding on the first intermediate motion token, the second intermediate motion token, and the current motion token.

The inference model 2110 may be a transformer-based artificial intelligence model. For example, the inference model 2110 may be a vision transformer model and may include a multi-headed self-attention layer and a feed forward network (FFN).

FIG. 30 is a view illustrating an inverse embedding process performed in the motion analysis device 2000 according to the third exemplary embodiment.

Referring to FIG. 30, the motion analysis device 2000 may perform inverse embedding by using a joint inverse embedding model 2150 and a root inverse embedding model 2160. The joint inverse embedding model 2150 may have an inverse structure of the joint embedding model 2130 used in the motion analysis device 2000 according to the third exemplary embodiment. The root inverse embedding model 2160 may have an inverse structure of the root embedding model 2140 used in the motion analysis device 2000 according to the third exemplary embodiment.

The motion analysis device 2000 may generate first intermediate joint data by inputting the first intermediate motion token into the joint inverse embedding model 2150. Alternatively, the motion analysis device 2000 may generate the first intermediate joint data by inputting the first intermediate joint feature vector of the first intermediate motion token into the joint inverse embedding model 2150.

The motion analysis device 2000 may generate first intermediate root data by inputting the first intermediate motion token into the root inverse embedding model 2160. Alternatively, the motion analysis device 2000 may generate the data first intermediate root by inputting the first intermediate root feature vector of the first intermediate motion token into the root inverse embedding model 2160.

The motion analysis device 2000 may generate second intermediate joint data by inputting the second intermediate motion token into the joint inverse embedding model 2150. Alternatively, the motion analysis device 2000 may generate the second intermediate joint data by inputting the second intermediate joint feature vector of the second intermediate motion token into the joint inverse embedding model 2150.

The motion analysis device 2000 may generate second intermediate root data by inputting the second intermediate motion token into the root inverse embedding model 2160. Alternatively, the motion analysis device 2000 may generate the second intermediate root data by inputting the second intermediate root feature vector of the second intermediate motion token into the root inverse embedding model 2160.

The motion analysis device 2000 may generate current joint data by inputting the current motion token into the joint inverse embedding model 2150. Alternatively, the motion analysis device 2000 may generate the current joint data by inputting the current joint feature vector of the current motion token into the joint inverse embedding model 2150.

The motion analysis device 2000 may generate current root data by inputting the current motion token into the root inverse embedding model 2160. Alternatively, the motion analysis device 2000 may generate the current root data by inputting the current root feature vector of the current motion token into the root inverse embedding model 2150.

Figure 31:
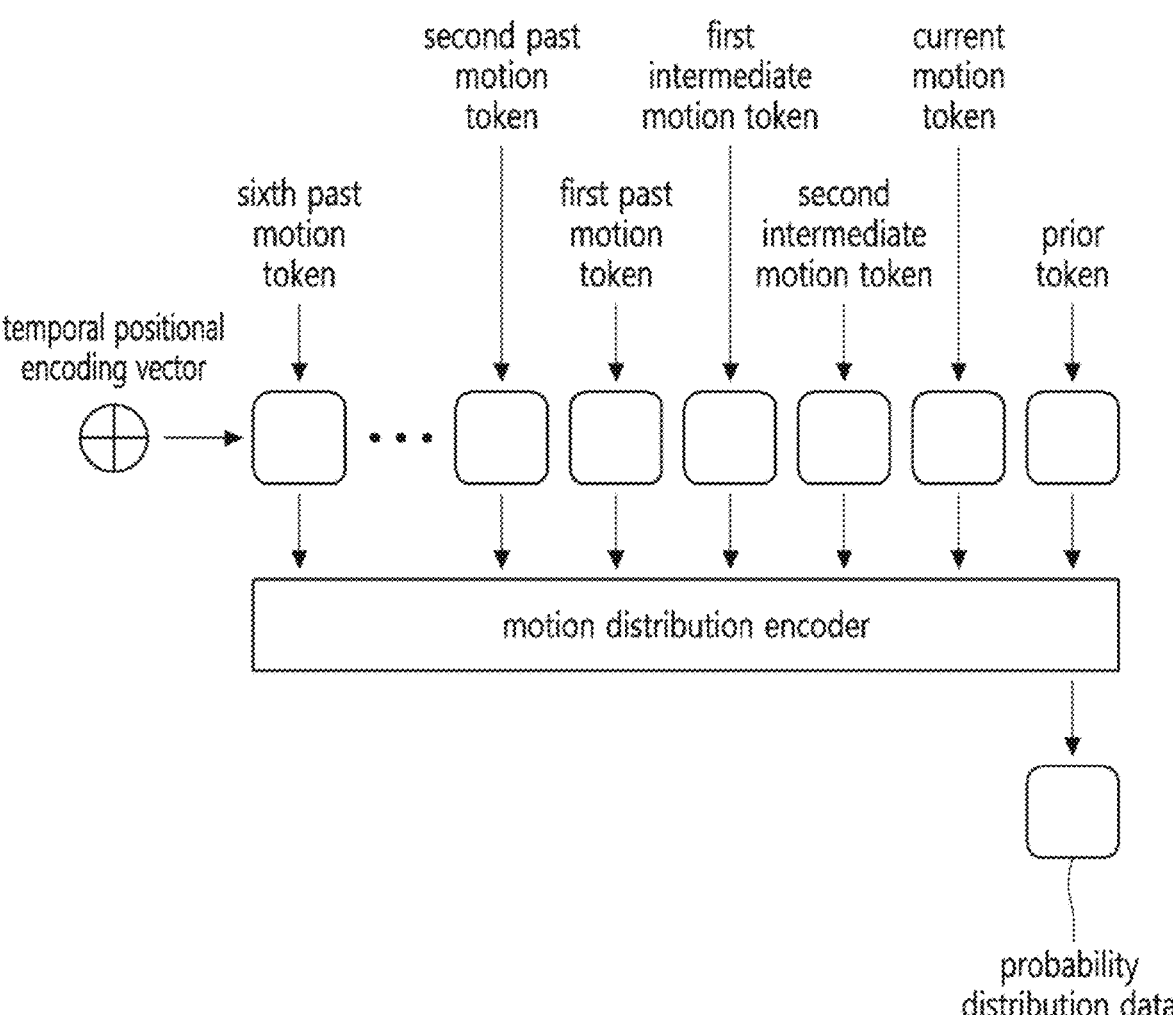
FIG. 31 is a view illustrating a process of generating probability distribution data used in the inference model according to the third exemplary embodiment.

FIG. 31 is a view illustrating a process of generating probability distribution data used in an inference model 2110 according to the third exemplary embodiment. The probability distribution data may be generated by a motion analysis device 2000 or may also be generated by another device and then provided to the motion analysis device 2000. Hereinafter, a case where the probability distribution data is generated by the motion analysis device 2000 is described, but the method of generating the probability distribution data may also be used in the same way in other devices as well.

The probability distribution data may be generated by using a motion distribution encoder before the enhanced motion inferring method is performed. More specifically, point cloud data and motion data may be obtained by capturing the movement of an object, and a training data set may be generated by using the obtained data. When the motion distribution encoder is trained with the generated training data set, the weights in the motion distribution encoder are adjusted, and after the training is completed, an arbitrary value may be input to obtain the probability distribution data.

Referring to FIG. 31, the motion distribution encoder may be trained, so as to receive input of first to sixth past motion tokens, a first intermediate motion token, a second intermediate motion token, a current motion token, and a prior token, and output probability distribution data.

The motion distribution encoder may be trained by a training server, which is further included in the motion analysis device 2000 or the motion capture system 100. Hereinafter, although it is described that the motion distribution encoder is trained by the training server, but the technical idea of the present disclosure is not limited thereto.

The training server may obtain current point cloud data, first to sixth past point cloud data, m_1st to m_3rd past point cloud data (where m is a natural number from 2 to 6), first to sixth past motion data, m_1st to m_3rd past motion data, m_1st to m_8th intermediate motion data, first intermediate motion data, second intermediate motion data, and current motion data, which are related to the arbitrary movement of an object.

Here, the point cloud data may be obtained by using a LiDAR device 1000. In addition, the motion data may be obtained by using an inertial sensor (or an optical sensor). The specific process is as follows.

First, a LiDAR device 1000 and an inertial sensor (or an optical sensor) are operated simultaneously for the arbitrary movement of an object, so as to obtain point cloud data and motion data.

Thereafter, using a time point as a reference point, the point cloud data corresponding to the reference point is obtained as current point cloud data, and the motion data corresponding to the reference point is obtained as current motion data.

Point cloud data corresponding to a first past time point that is earlier by a scan cycle of the LiDAR device 1000 than the reference time point is obtained as first past point cloud data, and motion data corresponding to the first past time point is obtained as first past motion data.

From among the point cloud data obtained from a first past time point as a reference up to a time point one second ago, five pieces of point cloud data having uniform time intervals are obtained as second to sixth past point cloud data.

Motion data corresponding to the first to sixth past point cloud data are obtained as first to sixth past motion data.

Motion data between the past motion data are obtained as m_1st to m_3rd past motion data, and motion data between the m_1st to m_3rd past motion data are obtained as m_1st to m_8th intermediate motion data.

Motion data between the first past time point and the present time point are obtained as first intermediate motion data and second intermediate motion data.

Motion data corresponding to the present time point is obtained as current motion data.

Here, in a case of an inertial sensor (or an optical sensor), the sensor having a higher frame rate than that of the LiDAR device 1000 is used, thereby allowing intermediate motion data to be obtained between time points at which point cloud data is obtained.

The training server may generate first to sixth past motion tokens by using first to sixth past motion data, m_1st to m_3rd past motion data, and m_1st to m_8th intermediate motion data. The method of generating past motion tokens is as described in FIG. 17, so a description thereof is omitted.

The training server may generate a first intermediate motion token by using the first intermediate motion data. Specifically, the training server may obtain a first intermediate joint feature vector by performing embedding on first intermediate joint data of the first intermediate motion data, obtain a first intermediate root feature vector by performing embedding on first intermediate root data of the first intermediate motion data, and then generate the first intermediate motion token by concatenating the first intermediate joint feature vector and the first intermediate root feature vector.

The training server may generate a second intermediate motion token by using the second intermediate motion data. Specifically, the training server may obtain a second intermediate joint feature vector by performing embedding on second intermediate joint data of the second intermediate motion data, obtain a second intermediate root feature vector by performing embedding on second intermediate root data of the second intermediate motion data, and then generate the second intermediate motion token by concatenating the second intermediate joint feature vector and the second intermediate root feature vector.

The training server may generate a current motion token by using the current motion data. Specifically, the training server may obtain a current joint feature vector by performing embedding on current joint data of the current motion data, obtain a current root feature vector by performing embedding on current root data of the current motion data, and then generate the current motion token by concatenating the current joint feature vector and the current root feature vector.

The prior token is a vector input to a motion distribution encoder in order to infer probability distribution data. The prior token may have an arbitrary value, or a specific value including 0.

The training server may obtain point cloud data and motion data regarding various movements of an object, and prepare a large amount of training data sets by repeating the above-described process. The training server may train the motion distribution encoder with the large amount of prepared training data, input arbitrary values s into the motion distribution encoder after completing the training, and then generate probability distribution data. The training server may provide the generated probability distribution data to the motion analysis device 2000.

6. Implementation Aspect and Operation of Motion Capture System

Hereinafter, an aspect in which a motion capture system 100 is implemented and a process by which data is processed in the motion capture system 100 are described.

6.1 Implementation Aspect of Motion Capture System

When the motion capture system 100 is implemented as a product to be provided to a user, a LiDAR device 1000 and a motion analysis device 2000 may be provided as a single integrated apparatus. Specifically, the LiDAR device 1000 and the motion analysis device 2000 may be built into the single apparatus. Accordingly, a volume of the apparatus may be reduced compared to that of the case where the LiDAR device 1000 and the motion analysis device 2000 are provided separately, whereby it is possible to save space and improve portability. Meanwhile, the LiDAR device 1000 and the motion analysis device 2000 may be provided as separate devices.

Meanwhile, an electronic device 3000 may also be provided together with the LiDAR device 1000 and the motion analysis device 2000, but is a user's terminal in general. The electronic device 3000 may receive inferred motion data through data communication with the motion analysis device 2000, and execute an editing program for editing and visualizing the received motion data and/or a content driving program for providing content using the motion data.

Here, the editing program or the content driving program may be provided together with the LiDAR device 1000 and the motion analysis device 2000.

For example, the editing program or the content driving program may be provided in a form downloadable through online. For another example, the editing program or the content driving program may be driven on a cloud server, and the motion analysis device 2000 may provide inferred motion data to the cloud server. A user may access the cloud server via an electronic device 3000 to be able to edit the motion data or receive content using the motion data.

For a yet another example, the editing program or the content driving program may be stored on a storage medium such as a USB, and the storage medium may be provided.

Meanwhile, the motion capture system 100 may not include an electronic device 3000. In this case, the motion capture system 100 is implemented for the purpose of obtaining point cloud data and providing inferred motion data by using the obtained point cloud data.

6.2 Operation of Motion Capture System

Hereinafter, a process of operating a motion capture system 100 is described with reference to FIGS. 32 to 34.

Figure 32:
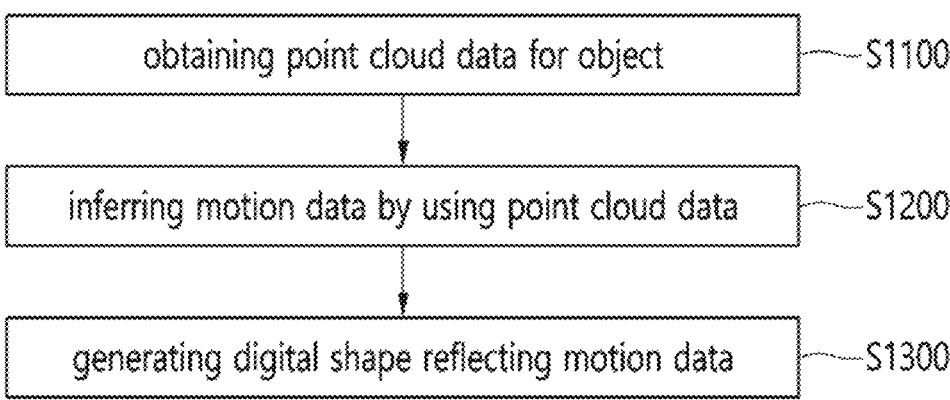
FIG. 32 is a flowchart illustrating a motion capture method performed in the motion capture system according to the exemplary embodiment.

FIG. 32 is a flowchart illustrating a motion capture method performed in the motion capture system 100 according to the exemplary embodiment.

Referring to FIG. 32, the motion capture method may include: step S1100 of obtaining point cloud data for an object; step S1200 of inferring motion data by using the point cloud data; and step S1300 of generating a digital shape reflecting the motion data.

Hereinafter, each step is described in detail. In describing each step below, the content of components, functions, motion inferring method, motion data utilization method, etc. of the motion capture system 100 described above may be applied, so a detailed description of overlapping content will be omitted.

In step S1100, a LiDAR device 1000 may obtain point cloud data for an object. The LiDAR device 1000 may obtain the point cloud data by scanning a sensing area at each preset scan cycle.

The LiDAR device 1000 may provide the obtained point cloud data to a motion analysis device 2000.

Meanwhile, the point cloud data may also be obtained from other sensors other than the LiDAR device 1000.

In step S1200, the motion analysis device 2000 may infer motion data by using the point cloud data. The motion analysis device 2000 may obtain current point cloud data corresponding to a present time point from the LiDAR device 1000 and perform a motion inferring method or an enhanced motion inferring method on the obtained current point cloud data, so as to infer current motion data. In this case, the motion analysis device 2000 may use past point cloud data obtained before the present time point when inferring the motion data. In addition, the motion analysis device 2000 may further use the past motion data inferred and stored for the past point cloud data before the present time point.

The motion analysis device 2000 may provide the inferred motion data to an electronic device 3000.

In step S1300, the electronic device 3000 may generate a digital shape reflecting the motion data. The electronic device 3000 may obtain the motion data from the motion analysis device 2000, and generate and output the digital shape by using the motion data. For example, the electronic device 3000 may use joint data included in the motion data to generate modeling data including reference points representing the digital shape, line segments connecting the reference points, and surfaces surrounding the line segments. In addition, the electronic device 3000 may set a display position, an orientation direction, etc. by using root data included in the motion data when displaying the digital shape in a virtual space.

The electronic device 3000 may correct the obtained motion data before generating the digital shape. For example, the electronic device 3000 may perform a filtering operation on the obtained motion data in order to reduce unnecessary vibrations or jittering phenomenon in the digital shape generated by using the motion data. Meanwhile, such a filtering operation may also be performed in the motion analysis device 2000, and in this case, the electronic device 3000 may generate a digital shape by receiving the corrected motion data.

The electronic device 3000 may provide a tool capable of modifying an output digital shape, and a user is able to modify the shape or motion of the digital shape by using the tool.

Alternatively, the electronic device 3000 may use the digital shape generated by using the motion data when executing a program for providing specific content.

Meanwhile, in a case where the motion capture system 100 does not include an electronic device 3000, step S1300 of generating the digital shape reflecting the motion data in the motion capture method may be changed to a step of providing the motion data inferred in step S1200 to an external device.

Figure 33:
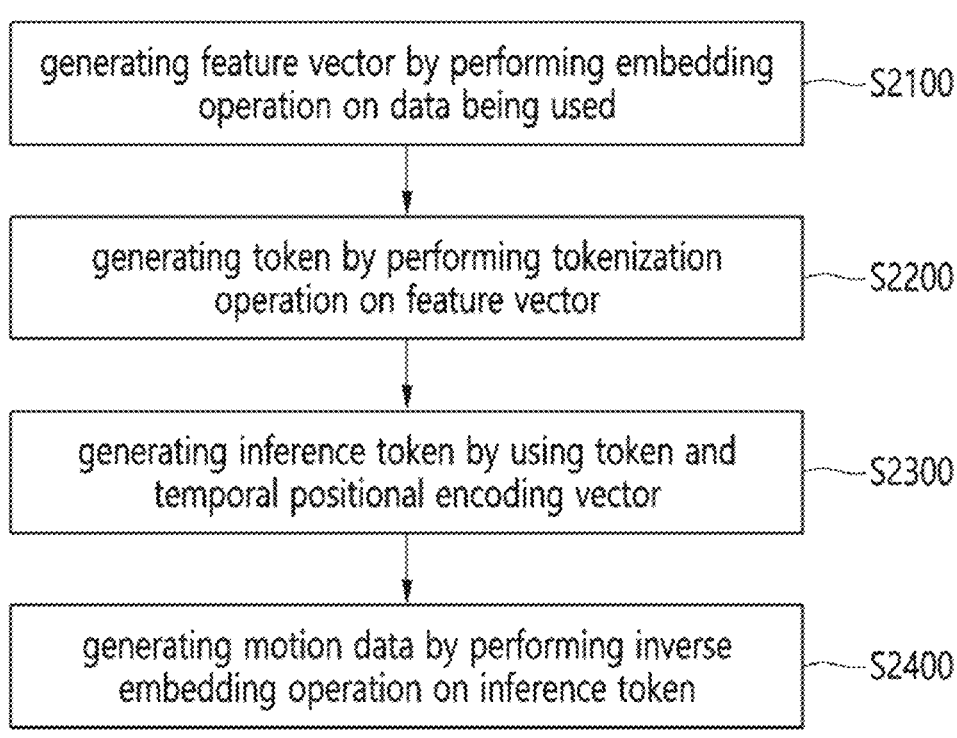
FIG. 33 is a flowchart illustrating a motion inferring method or an enhanced motion inferring method performed in the motion analysis device according to the exemplary embodiment.

FIG. 33 is a flowchart illustrating the motion inferring method or the enhanced motion inferring method, which is performed in the motion analysis device 2000 according to the exemplary embodiment.

Referring to FIG. 33, the motion inferring method or the enhanced motion inferring method may include: step S2100 of performing an embedding operation on data being used, so as to generate a feature vector; step S2200 of performing a tokenization operation on the feature vector to generate a token; step S2300 of using the token and a temporal positional encoding vector to generate an inference token; and step S2400 of performing an inverse embedding operation on the inference token to generate motion data.

Hereinafter, each step is described in detail. In describing each step below, the content of the components, functions, motion inferring method, etc. of the motion analysis device 2000 described above may be applied, so a detailed description of overlapping content will be omitted.

In step S2100, the motion analysis device 2000 may perform an embedding operation on data being used, so as to generate a feature vector. The motion analysis device 2000 may perform the embedding operation on motion data and point cloud data used to infer the motion data, so as to generate the feature vector.

The point cloud data being used refers to point cloud data obtained at a present time point and one or more point cloud data obtained at one or more time points prior to the present time point. The motion data being used refers to motion data inferred prior to the present time point, and may include joint data and root data.

The embedding operation may be performed by a point embedding model 2120, a joint embedding model 2130, and a root embedding model 2140. A point feature vector for the point cloud data, and a joint feature vector and root feature vector for the motion data may be obtained by the embedding operation.

In step S2200, the motion analysis device 2000 may perform a tokenization operation on the feature vector to generate a token. The motion analysis device 2000 may generate a past motion token by using the joint feature vector and root feature vector, which are obtained in step S2100, generate a current point token and a past point token by using the point feature vector obtained in step S2100, and generate a combined token by combining the past motion token and the past point token.

In step S2300, the motion analysis device 2000 may generate an inference token by using the tokens and a temporal positional encoding vector. The motion analysis device 2000 may infer the inference token by inputting the combined token and a current point token obtained in step S2200 into an inference model 2110 together with the temporal positional encoding vector. Here, the inference model 2110 may consider a temporal order of the input tokens by the temporal positional encoding vector.

The generated inference token may include an inference joint feature vector and an inference root feature vector.

In step S2400, the motion analysis device 2000 may generate motion data by performing an inverse embedding operation on the inference token. The motion analysis device 2000 may generate joint data by performing inverse embedding on the inferred joint feature vector included in the inferred token. The motion analysis device 2000 may generate root data by performing inverse embedding on the inference root feature vector included in the inference token.

The inverse embedding operation may be performed by a joint inverse embedding model 2150 and a root inverse embedding model 2160.

Meanwhile, the motion inferring method or the enhanced motion inferring method may not perform a tokenization operation. In this case, step S2200 may be omitted, step S2300 may be changed to a step of generating an inference feature vector by using feature vectors, and step S2400 may be changed to a step of generating motion data by performing an inverse embedding operation on the inference feature vector.

Figure 34:
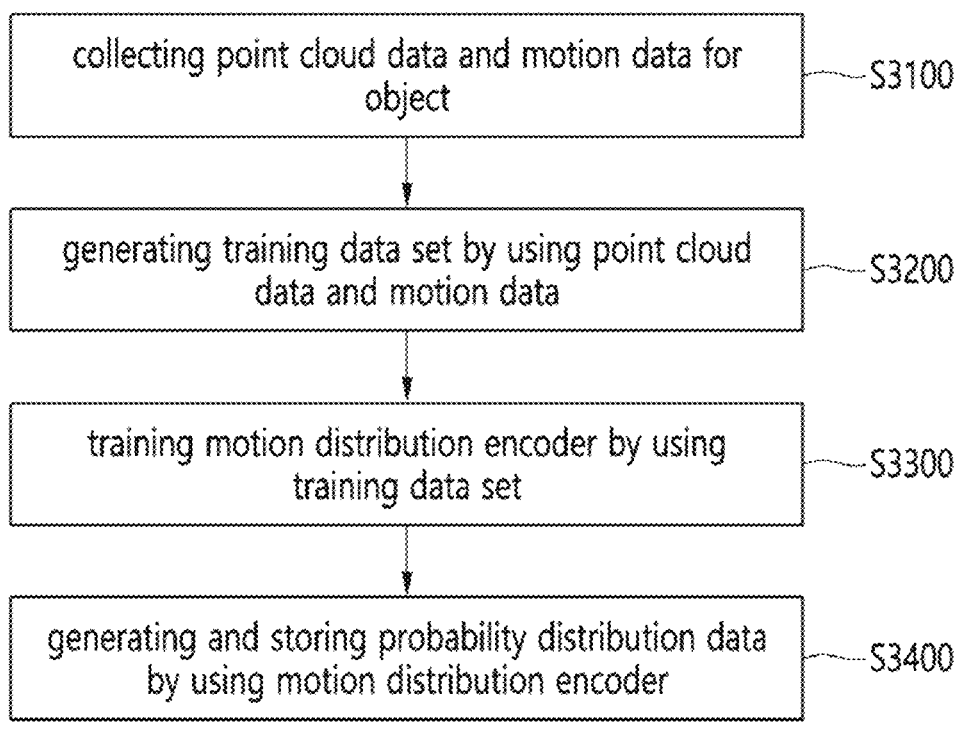
FIG. 34 is a flowchart illustrating a method of generating probability distribution data according to the exemplary embodiment.

FIG. 34 is a flowchart illustrating a method of generating probability distribution data according to the exemplary embodiment. The Probability distribution data refers to data for extracting latent vector used when the motion inferring method or the enhanced motion inferring method is performed. The probability distribution data may be generated from a device external to the motion analysis device 2000 and then be provided to the motion analysis device 2000. Accordingly, the method of generating the probability distribution data may be performed in the device external to the motion analysis device 2000.

Hereinafter, the method of generating the probability distribution data is described as being performed in the motion analysis device 2000, but the same method may be applied when performed in a device external to the motion analysis device 2000.

Referring to FIG. 34, a method of generating and using latent vector may include: step S3100 of collecting point cloud data and motion data for an object; step S3200 of generating a training data set by using the point cloud data and the motion data; step S3300 of training a motion distribution encoder by using the training data set; and step S3400 of generating and storing probability distribution data by using the motion distribution encoder.

Hereinafter, each step is described in detail. In describing each step below, the content of the components, functions, motion inferring method, etc. of the motion analysis device 2000 described above may be applied, so a detailed description of overlapping content will be omitted.

In step S3100, a motion analysis device 2000 may collect point cloud data and motion data for an object. First, each of the point cloud data and the motion data may be obtained by using a LiDAR device 1000 and an optical sensor (or an inertial sensor) at the same time point for the movement of the object. The motion analysis device 2000 may receive and store the obtained point cloud data and motion data.

The motion analysis device 2000 may generate a training data set by using the point cloud data and the motion data. Here, the training data set is used to train a motion distribution encoder to be described below, and may be configured to match an input data format of the motion distribution encoder. For example, as illustrated in FIG. 19, in a case where the motion distribution encoder receives input of a point feature vector, a past joint feature vector, a current joint feature vector, a past root feature vector, and a current root feature vector, the training data set may also include a training point feature vector, a training past joint feature vector, a training current joint feature vector, a training past root feature vector, and a training current root feature vector. For another example, as illustrated in FIG. 29, in a case where a motion distribution encoder receives input of n past motion tokens and n current motion tokens, the training data set may include n training past motion tokens and n training current motion tokens.

The motion analysis device 2000 may generate various training data sets for arbitrary movements of the arbitrary object.

In step S3300, the motion analysis device 2000 may train a motion distribution encoder by using the training data sets. When the motion analysis device 2000 trains the motion distribution encoder with the training data sets generated in step S2300, weights within the motion distribution encoder may be adjusted.

The motion distribution encoder may be a transformer-based artificial intelligence model, an autoencoder model, or a variational autoencoder model. The motion distribution encoder may be designed in a form of receiving input of a prior token together with input data and outputting data representing the probability distribution such as an average and a standard deviation.

In step S3400, the motion analysis device 2000 may generate and store probability distribution data by using the motion distribution encoder. The motion analysis device 2000 may obtain the probability distribution data by inputting arbitrary values into the motion distribution encoder for which the training has been completed in step S3300. The motion analysis device 2000 may store the obtained probability distribution data in an analysis device memory module 2100. The motion analysis device 2000 may utilize latent vector extracted from the probability distribution data when performing the motion inferring method and the enhanced motion inferring method.

In the above, features, structures, effects, etc. described in the above exemplary embodiments are included in at least one embodiment of the present specification, and are not necessarily limited to only one embodiment. Furthermore, the features, structures, effects, etc. illustrated in each embodiment may be implementable by way of combinations or modifications for other embodiments by those skilled in the art to which the embodiments belong. Accordingly, the content related to such combinations and modifications should be interpreted as being included in the scope of the present specification.

In addition, in the above, the present disclosure has been described focusing on the embodiments, but these are only examples and do not limit the technical idea of the present specification, and thus those skilled in the art to which this specification pertains will appreciate that various modifications and applications not exemplified above are possible without departing from the essential characteristics of the present embodiments. That is, each component specifically shown in the embodiments may be implemented by modifications. In addition, differences related to such modifications and applications should be construed as being included in the scope of the present specification defined in the appended claims.

What is claimed is:

1. A method of obtaining a motion of an object according to a frame rate of a Light Detection And Ranging (LiDAR) sensor based on a point cloud data output from the LiDAR sensor, the method comprising:

obtaining, via a processor of a motion analysis device that controls an artificial intelligence (AI) based inference model which is stored in a memory, at least two first point cloud data related to the object at time points from a first time point to a second time point and second point cloud data related to the object at a third time point, wherein the third time point is later than the first time point and the second time point, and a time gap between adjacent two time points from the first time point to the third time point is determined according to the frame rate of the LiDAR sensor; and inferring, via the processor of the motion analysis device, present joint data and present orientation information for the object corresponding to the third time point by inputting data obtained from the at least two first point cloud data, the second point cloud data, at least two past orientation information corresponding to the time points from the first time point to the second time point, and at least two past joint data corresponding to time points from the first time point to the second time point to the AI based inference model, wherein the present joint data and the at least two past joint data each comprises at least one of position information, angle information, velocity information, and angular velocity information of each predetermined reference joint, corresponding to one of the time points from the first time point to the third time point, wherein the position information comprises relative position of the each predetermined reference joint with respect to a corresponding parent joint, wherein the angle information comprises a rotated angle of the each predetermined reference joint with respect to a corresponding parent joint, wherein the velocity information is calculated by dividing a change in position of each predetermined reference joint in a past frame and a present frame by a time interval between the past frame and the present frame, wherein the angular velocity information is calculated by dividing a change in angle information of the each predetermined reference joint in the past frame and the present frame by the time interval between the past frame and the present frame, wherein the present orientation information and the at least two past orientation information each indicates a direction in which the object faces within a sensing area of the LiDAR sensor, wherein the direction in which the object faces is obtained based on a relative relationship between a reference axis defining a reference direction in the sensing area of the LiDAR sensor and an orientation axis defined at a representative point of the object, wherein the AI based inference model is a pre-trained model that is trained by using a set of previous-frame point cloud data, current-frame point cloud data, previous-frame joint data, previous-frame orientation information, and first current-frame joint data and first current-frame orientation information, wherein the current-frame joint data and the current-frame orientation information are ground-truth to compare with second current-frame joint data and second current-frame orientation information each inferred using the AI based inference model which is training and to training the AI based inference model using the compare result, wherein the current-frame joint data and the current-frame orientation information are obtained by at least one predetermined sensor operating while a LiDAR sensor that obtains the previous-frame point cloud data and the current-frame point cloud data is operating, and wherein the AI based inference model is configured to, by using the at least two past joint data, the at least two past orientation information, the at least two first point cloud data, and the second point cloud data, distinguish and infer a joint that is overlapped with or hidden by another body part by considering a change of the at least two past joint data, a change of the at least two past orientation information and a change of the at least two first point cloud data and the second point cloud data that is continuous in time series between the first time point and the third time point.

2. The method of claim 1, wherein, in response to the LiDAR sensor capturing a front side of the object to obtain point cloud data, the present orientation information corresponding to the third time point inferred by the motion analysis device has a first angle value, wherein, in response to the LiDAR sensor capturing a back side of the object to obtain point cloud data, the present orientation information corresponding to the third time point inferred by the motion analysis device has a second angle value, and wherein the second angle value is between (a+180°) and (a+360°) when the first angle value is between a° and (a+180)°, herein a is an integer.

3. The method of claim 1, wherein a time duration between the first time point and the third time point is equal to or shorter than 1 second.

4. The method of claim 1, wherein, in response to the at least two past orientation information being not pre-inferred, the motion analysis device is characterized by inferring the present joint data and the present orientation information using one of the at least two first point cloud data, the second point cloud data, and pre-stored default orientation information.

5. The method of claim 1, wherein the motion analysis device is characterized by inferring further at least one of position information of a predetermined representative point, velocity information of the predetermined representative point, and angular velocity information of the predetermined representative point corresponding to the third time point, together with the present joint data and the present orientation information corresponding to the third time point, by using at least the at least two first point cloud data, the second point cloud data, and the at least two past orientation information.

6. The method of claim 1, wherein the motion analysis device further infers joint foot-contact information corresponding to the third time point together with the present joint data and the present orientation information corresponding to the third time point, by using at least the at least two past point cloud data, the at least two point cloud data, and the at least two past orientation information, wherein the foot-contact information includes a value indicating whether a foot contacts a ground, and wherein the value included in the foot-contact information differs according to whether a velocity value of a foot joint corresponding to the foot among predetermined reference joints is less than or equal to a threshold value.

7. The method of claim 1, wherein the motion analysis device infers the present joint data and the present orientation information by using at least the at least two point cloud data, the second point cloud data, the at least two past orientation information, and a reference value, and wherein the reference value is generated by using probability distribution data generated by using joint data and orientation information at a plurality of arbitrary time points.

8. The method of claim 7, wherein the probability distribution data is probability density function having an average and standard deviation, wherein the reference value is a value randomly extracted from the probability density function, and wherein the average and the standard deviation are obtained by using a transformer-based encoder model and joint data and orientation information at the plurality of arbitrary time points.

9. The method of claim 1, wherein the motion analysis device infers the present joint data and the present orientation information by using at least the at least two point cloud data, the second point cloud data, the at least two past orientation information, and a reference value, and wherein the reference value is generated by using probability distribution data generated by using joint data, orientation information, and point cloud data at a plurality of arbitrary time points.

10. The method of claim 9, wherein the probability distribution data is probability density function having an average and standard deviation, wherein the reference value is a value randomly extracted from the probability density function, and wherein the average and the standard deviation are obtained by using a transformer-based encoder model and joint data, orientation information, and the point cloud data at the plurality of arbitrary time points.

11. The method of claim 1, wherein inferring the present joint data and the present orientation information via the motion analysis device comprises, obtaining, via a first embedding model, at least two first point feature vectors from the at least two first point cloud data, a second point feature vector from the second point cloud data;

obtaining, via a second embedding model, at least two first root feature vectors by using the at least two past orientation information;

obtaining, via the AI based inference model, an inferred feature vector from at least the at least two first point feature vectors, the second point feature vector, and the at least two first root feature vectors; and obtaining, by using inverse embedding model, the present joint data and the present orientation information from the inferred feature vector.

12. The method of claim 11, wherein the obtaining, through the AI based inference model, the inferred feature vector from at least the at least two first point feature vectors, the second point feature vector, and the at least two first root feature vectors comprises, generating at least two first motion tokens by using at least two first joint feature vectors extracted for the at least two past joint data and the at least two first root feature vectors;

generating at least two first point tokens by using the at least two first point feature vectors;

generating at least two first combined tokens by using the at least two first motion tokens and the at least two first point tokens;

generating a second point token by using the second point feature vector; and obtaining the inferred feature vector by inputting the at least two first combined tokens, the second point token, and a masked token into the AI based inference model.

13. The method of claim 1, wherein the time gap is n (n is a natural number equal to or greater than 1) times a reciprocal of the frame rate.

14. The method of claim 1, wherein the present joint data and the present orientation information are used in generating digital shape corresponding to the object, and wherein a direction in which the digital shape is oriented is determined by the present orientation information.

\* \* \* \* \*